United States Patent
Nishikawa et al.

(10) Patent No.: US 6,332,719 B1
(45) Date of Patent: Dec. 25, 2001

(54) OPTICAL TRANSMITTER/RECEIVER APPARATUS, METHOD FOR FABRICATING THE SAME AND OPTICAL SEMICONDUCTOR MODULE

(75) Inventors: Tohru Nishikawa, Osaka; Tomoaki Uno, Hyogo; Genji Tohmon, Osaka; Masahiro Mitsuda, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/129,872

(22) Filed: Aug. 6, 1998

Related U.S. Application Data

(63) Continuation-in-part of application No. 09/103,553, filed on Jun. 24, 1998.

(30) Foreign Application Priority Data

Jun. 25, 1997 (JP) .................................... 9-168684
Sep. 9, 1997 (JP) .................................... 9-243898

(51) Int. Cl.[7] .............................. G02B 6/36; G01B 11/00
(52) U.S. Cl. ............................................. 385/88; 356/401
(58) Field of Search ........................ 385/88–92; 356/401

(56) References Cited

U.S. PATENT DOCUMENTS

| | | | |
|---|---|---|---|
| 5,276,756 | * 1/1994 | Chambers et al. | ...................... 385/90 |
| 5,633,962 | 5/1997 | Kurata . | |
| 5,666,446 | * 9/1997 | Kragl | ........................................ 385/2 |
| 5,671,315 | * 9/1997 | Tabuchi et al. | ....................... 385/147 |

FOREIGN PATENT DOCUMENTS

| 0410067 | 7/1989 | (EP) . |
|---|---|---|
| 0844503 | 8/1996 | (EP) . |

OTHER PUBLICATIONS

Inoue Y et al: Fulter–Embedded Wavelength–Division Multiplexer for Hybrid–Integrated Transceiver Based on Silica––Based PLC; Electronics Letters, vol. 32, No. 9, Apr. 25, 1996, p. 847/848.

Tsuji S et al: "Passive Coupling of a Single Mode Optical Waveguide and a Laser Diode/Waveguide Photodiode for a WDM Transceiver Module" IEICE Transactions on Communications, vol. F79–B, No. 7, Jul. 1996, pp. 943–945.

* cited by examiner

*Primary Examiner*—Jon Henry
(74) *Attorney, Agent, or Firm*—McDermott, Will & Emery

(57) ABSTRACT

The optical transmitter/receiver apparatus of the invention includes: an optical fiber for transmitting/receiving an optical signal therethrough; and a first base including mutually spaced optical signal transmitting and receiving regions and a fiber end supporting region located between the optical signal transmitting and receiving regions. A semiconductor laser device for emitting the optical signal to be transmitted is secured to the optical signal transmitting region of the first base. A fiber end supporting portion for supporting one end of the optical fiber, to which the optical signal emitted from the semiconductor laser device is incident, is formed in the fiber end supporting region of the first base. A second base for supporting the body of the optical fiber is secured to the optical signal receiving region of the first base. A reflective filter for transmitting the optical signal to be transmitted, emitted from the semiconductor laser device, and for reflecting the optical signal to be received, incident through the other end of the optical fiber, is supported by being inserted into the second base and the body of the optical fiber. A light-receiving device for receiving the optical signal to be received, reflected by the reflective filter, is secured to the second base.

4 Claims, 38 Drawing Sheets

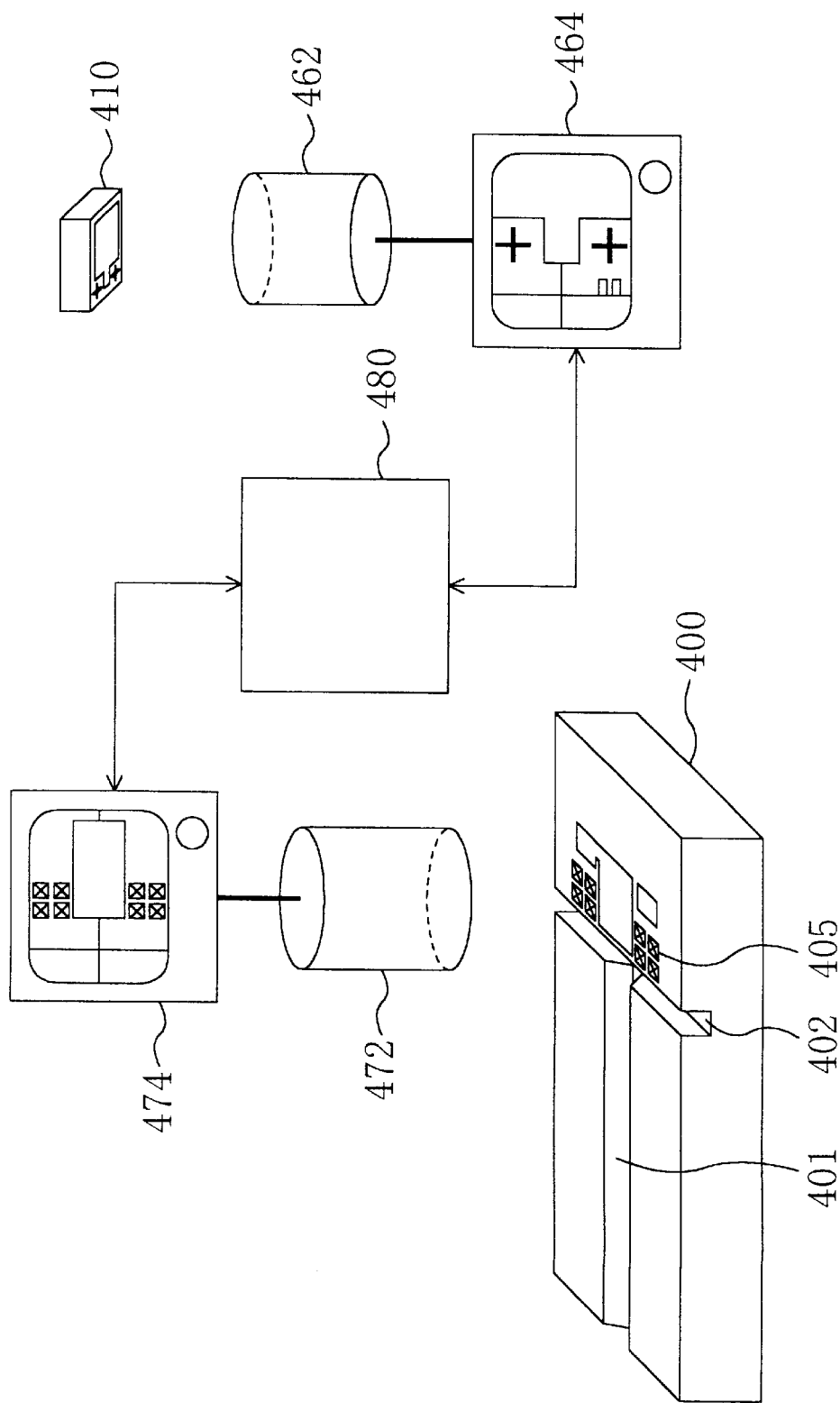

411R  413

413   411L

OPTICAL TRANSMITTER/RECEIVER APPARATUS, METHOD FOR FABRICATING THE SAME AND OPTICAL SEMICONDUCTOR MODULE

This is a continuation-in-part of application Ser. No. 09/103,553, filed Jun. 24, 1998.

This application is a continuation-in-part of U.S. patent application Ser. No. 09/103,553, filed by Tohru Nishikawa et al. on Jun. 24, 1998 and entitled "OPTICAL TRANSMITTER/RECEIVER APPARATUS, METHOD FOR FABRICATING THE SAME AND OPTICAL SEMICONDUCTOR MODULE", the contents of which are incorporated herein by reference.

BACKGROUND OF THE INVENTION

The present invention relates to an optical transmitter/receiver apparatus with integrated hybrid functions of optical reception and transmission for use in optical fiber communication for transmitting an optical signal, which has been output from a semiconductor laser device, through an optical fiber, and also relates to a method for fabricating the same. The present invention further relates to an optical semiconductor module formed by optically coupling a semiconductor laser device to an optical fiber.

In recent years, a fiber-to-the-user system for transmitting data and multi-channel image information from a center station to a home user by using an optical fiber has been proposed and the implementation of such a system is now under consideration. Such a fiber-to-the-user system requires a plurality of optical receiver apparatuses for simultaneously receiving dissimilar optical signals transmitted by wavelength division multiplexing to the terminal device of a home user and an optical transmitter apparatus for transmitting requests, data and the like from the user's terminal device to the center station.

In an optical transmitter apparatus or optical receiver apparatus used for a fiber-to-the-user system, various types of passive alignment mounting techniques are often employed for the purposes of coupling the apparatus to an optical fiber without operating a light-emitting device or a light-receiving device and thereby reducing the costs thereof.

In order to further reduce the size of such an apparatus and further enhance the performance thereof, technology for integrating optical receiver apparatus and optical transmitter apparatus in a compact package is now in great demand.

In response to such demand, an optical transmitter/receiver apparatus, in which an optical receiver apparatus and an optical transmitter apparatus are integrated in a compact package as shown in FIGS. 37(a) and 37(b), has been suggested (see, for example, 1996 Annual Convention of Institute of Electronics, Information and Communication Engineers in Japan, SC-2-5).

Hereinafter, the conventional optical transmitter/receiver apparatus will be described with reference to FIGS. 37(a) and 37(b).

FIG. 37(a) shows a planar structure of the conventional optical transmitter/receiver apparatus, while FIG. 37(b) shows the cross-sectional structure thereof taken along the line A—A of FIG. 37(a). The conventional optical transmitter/receiver apparatus includes a fiber block 10 and a PLC (planar lightwave circuit) substrate 20 that are joined with each other. The fiber block 10 supports one end of a first optical fiber 11 for transmitting/receiving an optical signal therethrough and one end of a second optical fiber 12 for receiving an optical signal therethrough. On the other hand, the PLC substrate 20 supports: a semiconductor laser device 21 for outputting light on a wavelength band of 1.3 $\mu$m; a monitoring light-receiving device 22 for monitoring the output of the semiconductor laser device 21; a first light-receiving device 23 for signal reception for receiving light on the wavelength band of 1.3 $\mu$m; and a WDM (wavelength division multiplexed) filter 24 for transmitting light on the wavelength band of 1.55 $\mu$m and reflecting light on the wavelength band of 1.3 $\mu$m. An optical waveguide 25 is formed inside the PLC substrate 20. A second light-receiving device 13 for signal reception for receiving light on the wavelength band of 1.55 $\mu$m and outputting image information is connected to the other end of the second optical fiber 12 for reception.

The fiber block 10 and the PLC substrate 20 are optically coupled to each other at an output port 26 and a common port 27. The light to be transmitted on the wavelength band of 1.3 $\mu$m, which has been output from the semiconductor laser device 21, is passed through a Y-shaped branch 25a of the optical waveguide 25, the WDM filter 24 and the common port 27 so as to be output through the other end of the first optical fiber 11. Light on the wavelength band of 1.3 $\mu$m and light on the wavelength band of 1.55 $\mu$m are input to be received through the other end of the first optical fiber 11. The former light, i.e., light on the wavelength band of 1.3 $\mu$m, is passed through the common port 27, the WDM filter 24 and the Y-shaped branch 25a of the optical waveguide 25 so as to be received by the first light-receiving device 23. The latter light, i.e., light on the wavelength band of 1.55 $\mu$m, is reflected by the WDM filter 24 and passed through the output port 26 so as to be received by the second light-receiving device 13.

In the conventional optical transmitter/receiver apparatus, the entire coupling, except for the coupling between the first and second optical fibers 11 and 12 (which are external transmission lines) and the PLC substrate 20, is realized by passive alignment.

The conventional optical transmitter/receiver apparatus shown in FIGS. 37(a) and 37(b) uses the PLC substrate 20 as an optical platform. However, if a PLC substrate 20 made of silica material is used, shortening of the length of the PLC substrate 20 is restricted by the minimum bend radius of the waveguide 25. Thus, since the PLC substrate 20 becomes rather long in the direction in which light travels, downsizing of such an optical transmitter/receiver apparatus is hard to realize. That is to say, the waveguide 25 of the PLC substrate 20 has a minimum bend radius, over which loss is caused because of difference in refractive indices between a waveguide layer and a cladding layer. If the difference between the refractive indices is increased, then the minimum bend radius can be decreased. However, in actuality, even when the difference between the refractive indices is increased up to 0.75% (which is the maximum value considering the internal loss of the waveguide and the loss resulting from the coupling with the optical fiber), the minimum bend radius cannot be decreased less than about 5 mm. Thus, in the optical transmitter/receiver apparatus shown in FIGS. 37(a) and 37(b), the required minimum length of the PLC substrate 20 in the optical axis direction is as long as about 15 mm. Since the optical transmitter/receiver apparatus further requires the fiber coupling portion, the resulting length of the apparatus in the optical axis direction becomes 20 mm or more.

Also, in the conventional optical transmitter/receiver apparatus, the light to be received on the wavelength band of 1.55 $\mu$m, which has been input into the waveguide 25 of the PLC substrate 20, is output through the output port 26 of the PLC substrate 20 into the second optical fiber 12 and then received by the second light-receiving device 13. Accordingly, cost reduction and downsizing of the optical transmitter/receiver apparatus are adversely restricted.

During the assembly process of this apparatus, a cut recess is provided for the PLC substrate 20 by using a dicing saw, the WDM filter 24 is inserted into the recess, and position and angle of the WDM filter 24 are adjusted. However, since it is difficult to mount the WDM filter 24 with high accuracy, the loss of the light, which is incident through the common port 27 and then travels toward the output port 26, disadvantageously increases.

In addition, when the fiber block 10 is joined with the PLC substrate 20, the first optical fiber 11 and the second optical fiber 12 need to be simultaneously connected to the common port 27 and the output port 26 with high efficiency. Thus, since these parts should be aligned through active alignment, the assembly process is adversely complicated.

Furthermore, mounting process steps requiring high accuracy should be performed when the semiconductor laser device 21 is mounted onto the PLC substrate 20, when the first light-receiving device 23 is mounted onto the PLC substrate 20, when the monitoring light-receiving device 22 is located near the semiconductor laser device 21 and when the first and second optical fibers 11 and 12 are mounted into the PLC substrate 20. Since the number of process steps requiring high accuracy is large, cost reduction is difficult to realize.

In an optical semiconductor module used as an optical transmitter apparatus, a concave groove having a V-shaped cross section and extending in the optical axis direction is formed in a base made of silicon and an optical fiber is installed in the concave groove. In such a manner, the optical fiber can now be mounted on the base with high accuracy.

However, as for mounting of a semiconductor laser device, it is difficult to mount the semiconductor laser device onto the base with high accuracy. This is because electrodes are formed on the semiconductor laser device and the base and the size of the semiconductor laser device is small.

Thus, technology for accurately mounting a semiconductor laser device onto a base by passive alignment is now required. A method for fabricating an optical semiconductor module such as that shown in FIG. 38 is suggested by T. Hashimoto et al., MOC '95, D5, 1995.

As shown in FIG. 38, a concave groove 31, extending in the optical axis direction, for positioning a fiber and a cut recess 32 extending vertically to the optical axis are formed in a base 30 made of silicon. A wiring pattern 33 formed of an Au layer and base marks 34, formed of an Au layer, for alignment are also provided for the base 30. On the other hand, on the reverse surface of a semiconductor laser device 40, a surface electrode (not shown) formed of an Au layer and laser marks 41, formed of an Au layer, for alignment, are also formed. In such a case, the wiring pattern 33 and the base marks 34 of the base 30 are formed during the same process step. Similarly, the surface electrode and the laser marks 41 of the semiconductor laser device 40 are also formed during the same process step. Thus, no special processing is required for passive alignment.

The base 30 is aligned with the semiconductor laser device 40 by making a CCD camera 52 receive infrared rays 51, which have been emitted from an infrared light source 50 and then transmitted through the base 30 and the semiconductor laser device 40, and recognize the base marks 34 of the base 30 and the laser marks 41 of the semiconductor laser device 40 as images.

By installing a singlemode optical fiber 60 in the concave groove 31, the position of the fiber 60 on a plane vertical to the optical axis is determined. And when the fiber 60 comes into contact with a stopper wall of the cut recess 32 (i.e., a wall face closer to the semiconductor laser device 40), the position thereof in the optical axis direction is determined.

However, the conventional optical semiconductor module shown in FIG. 38 has the following problems.

First, a mask for forming the base marks 34 should be aligned with the concave groove 31 of the base 30 such that the base marks 34 and the concave groove 31 are located at the same position in the direction vertical to the optical axis on the plane parallel to the surface of the base 30. However, when the mask alignment is performed, the mask always deviates to some degree. As a result, some misalignment is always caused between the base marks 34 and the concave groove 31. Since the semiconductor laser device 40 is positioned by using the base marks 34 that are already out of alignment with the concave groove 31, the semiconductor laser device 40 is very likely to deviate twofold with respect to the concave groove 31.

In addition, when the CCD camera 52 receives the infrared rays 51 emitted from the infrared light source 50 and recognizes the marks as images, the CAD camera 52 simultaneously observes the base marks 34 and the laser marks 41, which are located away from the CAD camera 52 by mutually different distances. Thus, the image of either mark is adversely defocused and recognized as a blurred image.

The finer the base marks 34 and the laser mark 41 are, the more accurate and precise alignment is realized. However, since the base marks 34 and the laser mark 41 are formed through metal vapor deposition technique, the edges of the base marks 34 and the laser marks 41 are variable on the order of microns. Thus, the image recognition cannot be performed with satisfactorily high precision.

Furthermore, the relative distance between the emission end face of the semiconductor laser device 40 and the laser marks 41 is variable on the order of several microns depending upon the cleavage precision. In the same way, the relative distance between the stopper wall face of the cut recess 32 of the base 30 and the base mark 34 is also variable on the order of several microns depending upon the formation precision of the cut recess 32.

Moreover, according to the conventional image recognition method, mechanical adjustment is performed by recognizing the superposed pattern of the base marks 34 and the laser marks 41 as an image by the use of the infrared rays 51 emitted from the infrared light source 50. Thus, the conventional image recognition method cannot suppress the variation in the relative position between the emission end face and the laser marks 41 of the semiconductor laser device 40 and the variation in the position where the cut recess 32 of the base 30 is formed.

Because of the various problems described above, in the conventional optical semiconductor module, a large degree of misalignment is likely to be caused between the optical axis of the semiconductor laser device and t he optical axis of the optical fiber and the distance between the emission end face of the semiconductor laser device and the incidence end face of the optical fiber is also variable to a large extent.

SUMMARY OF THE INVENTION

In view of the above-described conventional problems, a first object of the present invention is to accomplish cost reduction, downsizing and performance enhancement of an optical transmitter/receiver apparatus by providing a highly integrated optical transmitter/receiver apparatus that can be assembled easily. A second object of the present invention is to reduce the misalignment between the optical axes of a semiconductor laser device and an optical fiber and to suppress the variation in distance between the emission end face of the semiconductor laser device and the incidence end face of the optical fiber.

In order to accomplish the first object, a first optical transmitter/receiver apparatus of the present invention includes: an optical fiber for transmitting an optical signal to be transmitted and receiving an optical signal to be received therethrough; a first base including mutually spaced optical signal transmitting and receiving regions and a fiber end supporting region located between the optical signal transmitting and receiving regions; a semiconductor laser device, secured to the optical signal transmitting region of the first base, for emitting the optical signal to be transmitted; fiber end supporting means, formed in the fiber end supporting region of the first base, for supporting one end of the optical fiber, the optical signal to be transmitted that has been emitted from the semiconductor laser device being incident onto the end of the optical fiber; a second base, secured to the optical signal receiving region of the first base, for supporting the body of the optical fiber; a reflective filter, supported by being inserted into the second base and the body of the optical fiber, for transmitting the optical signal to be transmitted that has been emitted from the semiconductor laser device, and for reflecting the optical signal to be received that has been incident through the other end of the optical fiber; and a light-receiving device, secured to the second base, for receiving the optical signal to be received that has been reflected by the reflective filter.

In the first optical transmitter/receiver apparatus, the second base, supporting the body of the optical fiber, the light-receiving device and the reflective filter inserted into the body of the optical fiber, is secured to the first base, to which the semiconductor laser device has been secured and which supports one end of the optical fiber via the fiber end supporting means. Thus, it is possible to secure the second base to the first base after the second base supporting the body of the optical fiber, the light-receiving device and the reflective filter and the first base supporting the semiconductor laser device and the one end of the optical fiber have been separately formed. As a result, the assembly process can be simplified as compared with a structure in which semiconductor laser device, one end and body of an optical fiber, reflective filter and light-receiving device are all secured to a single base.

In the first optical transmitter/receiver apparatus, when the semiconductor laser device and one end of the optical fiber are secured to the first base, only the positional relationship therebetween should be considered. Similarly, when the reflective filter and the light-receiving device are secured to the second base, only the positional relationship therebetween should be considered. Thus, the semiconductor laser device and one end of the optical fiber can be secured easily, while accurately defining the positional relationship therebetween. In the same way, the reflective filter and the light-receiving device can also be secured easily, while accurately defining the positional relationship therebetween. Consequently, in the first optical transmitter/receiver apparatus, the optical axis can be adjusted on the order of sub-microns through passive alignment.

In order to accomplish the first object, a second optical transmitter/receiver apparatus according to the present invention includes: a package; an optical fiber for transmitting an optical signal to be transmitted and receiving an optical signal to be received therethrough; a first base, being secured to a bottom of the package, including an optical signal transmitting region and an optical signal receiving region that are spaced from each other, and further including a fiber end supporting region located between the optical signal transmitting region and the optical signal receiving region; a semiconductor laser device, secured to the optical signal transmitting region of the first base, for emitting the optical signal to be transmitted; fiber end supporting means, formed in the fiber end supporting region of the first base, for supporting one end of the optical fiber, the optical signal to be transmitted that has been emitted from the semiconductor laser device being incident onto the end of the optical fiber; a second base, secured to the bottom of the package, for supporting a body of the optical fiber; a reflective filter, supported by being inserted into the second base and the body of the optical fiber, for transmitting the optical signal to be transmitted that has been emitted from the semiconductor laser device, and for reflecting the optical signal to be received that has been incident through the other end of the optical fiber; and a light-receiving device, secured to the second base, for receiving the optical signal to be received that has been reflected by the reflective filter.

In the second optical transmitter/receiver apparatus, it is possible to secure the second base to the package after the first base supporting th e semiconductor laser device and the one end of the optical fiber and the second base supporting the body of the optical fiber, the reflective filter and the light-receiving device have been separately formed. As a result, the assembly process can be simplified as compared with a structure in which semiconductor laser device, one end and body of an optical fiber, reflective filter and light-receiving device are all secured to a single base.

In the second optical transmitter/receiver apparatus, when the semiconductor laser device and one end of the optical fiber are secured to the first base, only the positional relationship therebetween should be considered. Similarly, when the reflective filter and the light-receiving device are secured to the second base, only the positional relationship therebetween should be considered. Thus, the semiconductor laser device and one end of the optical fiber can be secured easily, while accurately defining the positional relationship therebetween. In the same way, the reflective filter and the light-receiving device can also be secured easily, while accurately defining the positional relationship therebetween. Consequently, in the second optical transmitter/receiver apparatus, the optical axis can be adjusted on the order of sub-microns through passive alignment.

In addition, since the second base supporting the body of the optical fiber can be secured to the package after the semiconductor laser device, supported by the first base secured to the package, has been subjected to an output test, the loss caused when an optical fiber is connected to a defective semiconductor laser device can be reduced.

In the first or second optical transmitter/receiver apparatus, the first base preferably includes optical-axis-direction positioning means for regulating a position of the one end of the optical fiber in an optical axis direction.

In such a case, it is possible to regulate the position of the one end of the optical fiber in the optical axis direction and the distance between the semiconductor laser device secured to the first base and the one end of the optical fiber. As a result, the coupling efficiency of the light emitted from the semiconductor laser device can be improved at the one end of the optical fiber.

In the first or second optical transmitter/receiver apparatus, the fiber end supporting means preferably includes on-vertical-plane positioning means for regulating a position of the one end of the optical fiber on a plane vertical to the optical axis.

In such a case, it is possible to regulate the position of the one end of the optical fiber on the plane vertical to the optical axis. As a result, the coupling efficiency of the light emitted from the semiconductor laser device can be improved at the one end of the optical fiber.

In the first or second optical transmitter/receiver apparatus, the on-vertical-plane positioning means preferably includes: a concave groove being formed in the fiber end supporting region of the first base so as to extend in an optical axis direction, having a pair of walls coming closer to each other in a direction from an opening to a bottom, and supporting the one end of the optical fiber; and a pressing member, secured over the concave groove of the first base, for pressing the one end of the optical fiber supported by the concave groove onto the pair of walls of the concave grooves.

In such a case, the one end of the optical fiber can be supported at three contact points, i.e., points on the pair of walls of the concave groove and on the pressing member. Thus, it is possible to accurately regulate the position of the one end of the optical fiber on the plane vertical to the optical axis.

In the first or second optical transmitter/receiver apparatus, the fiber end supporting means preferably includes: a concave groove, formed in the fiber end supporting region of the first base so as to extend in an optical axis direction, for supporting the one end of the optical fiber; and a resin-introducing groove, formed in the fiber end supporting region of the first base so as to extend in a direction intersecting the concave groove and to communicate with the concave groove, for introducing a supplied resin into the concave groove.

In such a case, since the resin can be introduced with certainty through the resin-introducing groove into the concave groove, the optical fiber can be secured to the concave groove with certainty.

In the first or second optical transmitter/receiver apparatus, the fiber end supporting means preferably includes: a concave groove, formed in the fiber end supporting region of the first base so as to extend in an optical axis direction, for supporting the one end of the optical fiber; and a resin-draining groove, formed in the fiber end supporting region of the first base so as to extend in a direction intersecting the concave groove and to communicate with the concave groove, for draining a resin supplied to the concave groove to the outside.

In such a case, the residual, redundant resin supplied to the concave groove and used for securing the optical fiber to the groove can be drained through the resin-draining groove to the outside. Thus, it is possible to prevent the overflowing resin from reaching the vicinity of the semiconductor laser device. As a result, the deterioration in characteristics of the semiconductor laser device can be prevented.

Preferably, the first or second optical transmitter/receiver apparatus further includes a reflective film, formed between the reflective filter and the light-receiving device, for reflecting the optical signal to be transmitted that has been emitted from the semiconductor laser device.

In such a case, it is possible to prevent the optical signal to be transmitted, which has been emitted from the semiconductor laser device, from being incident onto the light-receiving device. Thus, even when the light-receiving device is disposed in the vicinity of the semiconductor laser device, it is possible to prevent noise from being generated because of the optical signal to be transmitted.

Preferably, the first or second optical transmitter/receiver apparatus further includes: a wavelength selecting reflective filter, supported by being inserted into the body of the optical fiber and the second base at a position closer to the other end of the optical fiber than the reflective filter is, for transmitting the optical signal to be transmitted that has been emitted from the semiconductor laser device and for selectively reflecting an optical signal to be received on a predetermined wavelength band among a plurality of optical signals to be received on a plurality of wavelength bands, the optical signals having been incident through the other end of the optical fiber; and a second light-receiving device, secured to the second base, for receiving the optical signal to be received that has been reflected by the wavelength selecting reflective filter.

In such a case, the optical signal to be received on a predetermined wavelength band among a plurality of optical signals to be received on a plurality of wavelength bands, which have been incident through the other end of the optical fiber, is reflected by the wavelength selecting reflective filter. The reflected optical signal to be received on the predetermined wavelength band can be received by the second light-receiving device. Thus, a plurality of optical signals to be received on a plurality of wavelength bands, which have been transmitted from a center station, can be received separately.

In such an embodiment, it is more preferable to form a filter for selectively transmitting the optical signal to be received on the predetermined wavelength band between the wavelength selecting reflective filter and the second light-receiving device.

Then, it is possible to prevent noise from being generated from the optical signal to be transmitted and incident onto the second light-receiving device and from the optical signals to be received on the wavelength bands other than the predetermined wavelength band.

In the first or second optical transmitter/receiver apparatus, the semiconductor laser device is preferably secured to the first base such that an optical axis of light emitted from the semiconductor laser device is inclined with respect to an optical axis of the optical fiber by a predetermined tilt angle.

In such a case, the light emitted from the semiconductor laser device and reflected by the incident portion of the optical fiber is very less likely to be incident onto the active layer region of the semiconductor laser device again. Thus, sufficient return loss can be ensured.

In this embodiment, the predetermined tilt angle is preferably in the range from 2 to 3 degrees.

Then, sufficient return loss can be ensured and, at the same time, the decrease in coupling efficiency can be prevented.

In order to accomplish the first object, a third optical transmitter/receiver apparatus of the present invention includes: an optical fiber for transmitting an optical signal to be transmitted and receiving an optical signal to be received therethrough; a base including mutually spaced optical signal transmitting and receiving regions and a fiber end supporting region located between the optical signal transmitting and receiving regions; a semiconductor laser device, secured to the optical signal transmitting region of the base, for emitting the optical signal to be transmitted; optical-axis-direction positioning means, formed in the optical signal transmitting region of the base, for regulating a position of one end of the optical fiber in an optical axis direction, the optical signal to be transmitted that has been emitted from the semiconductor laser device being incident onto the one end; fiber end supporting means, formed in the fiber end supporting region of the base, for supporting the one end of the optical fiber, while regulating a position of the one end of the optical fiber on a plane vertical to the optical axis; fiber body supporting means, formed in the optical signal receiving region of the base, for supporting the body of the optical fiber; a reflective filter, supported by being inserted into the fiber body supporting means and the optical fiber, for transmitting the optical signal to be transmitted that has been emitted from the semiconductor laser device, and for reflecting the optical signal to be received that has been incident through the other end of the optical fiber; and a light-receiving device, secured to the optical signal receiving region of the base, for receiving the optical signal to be received that has been reflected by the reflective filter.

In the third optical transmitter/receiver apparatus, since the optical-axis-direction positioning means for regulating a position of one end of the optical fiber in an optical axis direction is formed in the optical signal transmitting region of the base, it is possible to regulate with certainty the position of the one end of the optical fiber in the optical axis direction and the distance between the semiconductor laser device secured to the first base and the one end of the optical fiber. In addition, since the fiber end supporting means for supporting the one end of the optical fiber, while regulating a position of the one end of the optical fiber on a plane vertical to the optical axis is formed in the fiber end supporting region of the base, it is possible to regulate with certainty the position of the one end of the optical fiber on the plane vertical to the optical axis.

Thus, in the third optical transmitter/receiver apparatus, it is possible to regulate the distance between the semiconductor laser device secured to the first base and the one end of the optical fiber and the position of the one end of the optical fiber on the plane vertical to the optical axis. As a result, the coupling efficiency of the light emitted from the semiconductor laser device can be improved at the one end of the optical fiber.

In the third optical transmitter/receiver apparatus, the fiber end supporting means preferably includes: a concave groove being formed in the base so as to extend in the optical axis direction, having a pair of walls coming closer to each other in a direction from an opening to a bottom, and supporting the optical fiber; and a pressing member, secured over the concave groove in the fiber end supporting region of the base, for pressing the one end of the optical fiber supported by the concave groove onto the pair of walls.

In such a case, the one end of the optical fiber can be supported at three contact points, i.e., points on the pair of walls of the concave groove and on the pressing member. Thus, it is possible to precisely regulate the position of the one end of the optical fiber on the plane vertical to the optical axis.

The method for fabricating an optical transmitter/receiver apparatus according to the present invention is provided for fabricating an optical transmitter/receiver apparatus including an optical fiber for transmitting an optical signal to be transmitted and receiving an optical signal to be received therethrough. The method includes the steps of: forming a optical fiber end supporting concave groove in a fiber end supporting region of a first base, the first base having mutually spaced optical signal transmitting and receiving regions and the fiber end supporting region located between the optical signal transmitting and receiving regions, the concave groove having such a cross-sectional shape as to support one end of the optical fiber and extending in an optical axis direction; securing a semiconductor laser device, emitting the optical signal to be transmitted, onto the optical signal transmitting region of the first base; forming an optical fiber body supporting concave groove in a second base, the optical fiber body supporting concave groove having such a cross-sectional shape as to support the body of the optical fiber and extending in the optical axis direction; securing the body of the optical fiber inside the optical fiber body supporting concave groove; forming a cut recess in the second base and the body of the optical fiber, the cut recess extending in a direction vertical to the optical axis; securing a reflective filter inside the cut recess, the reflective filter transmitting the optical signal to be transmitted that has been emitted from the semiconductor laser device and incident onto the one end of the optical fiber, and reflecting the optical signal to be received that has been incident through the other end of the optical fiber; securing a light-receiving device above the optical fiber body supporting concave groove in the second base, the light-receiving device receiving the optical signal to be received that has been reflected by the reflective filter; securing the one end of the optical fiber onto the optical fiber end supporting concave groove of the first base; and securing the second base onto the optical signal receiving region of the first base, the body of the optical fiber, the reflective filter and the light-receiving device having been secured to the second base.

In the method for fabricating an optical transmitter/receiver apparatus of the present invention, either one of the step of forming the optical fiber end supporting concave groove and the step of securing the laser may precede the other.

In accordance with the method for fabricating an optical transmitter/receiver apparatus of the present invention, the second base, onto which the body of the optical fiber, the reflective filter and the light-receiving device have already been secured, is secured to the first base. Thus, the second base may be secured to the first base after the first and second bases have been formed separately. Accordingly, the assembly process can be simplified as compared with a manufacturing method in which semiconductor laser device, one end and body of the optical fiber, reflective filter and light-receiving device are secured to a single base. Consequently, an optical transmitter/receiver apparatus, allowing for the adjustment of the optical axis on the order of sub-microns through passive alignment, can be fabricated more easily and accurately.

In this method, the cut recess extending in a direction vertical to the optical axis is formed in the second base and the body of the optical fiber secured to the optical fiber body supporting concave groove of the second base, and then the reflective filter is secured into the cut recess. Thus, the reflective filter can be secured to the optical path of the optical fiber with certainty.

The reflective filter is first secured to the second base and then the light-receiving device is secured over the optical fiber body supporting concave groove of the second base. Thus, the positional relationship between the reflective filter and the light-receiving device can be regulated precisely.

The semiconductor laser device is first secured to the first base and then one end of the optical fiber is secured to the optical fiber end supporting concave groove formed in the first base. Thus, the positional relationship between the semiconductor laser device and the one end of the optical fiber can also be regulated precisely.

In the method for fabricating an optical transmitter/receiver apparatus of the present invention, the step of securing the second base preferably includes the step of securing the second base onto the optical signal receiving region of the first base, while regulating a position of the one end of the optical fiber in the optical axis direction and a position of the optical fiber on a plane vertical to the optical axis.

In such a case, it is possible to regulate the distance between the semiconductor laser device secured to the first base and the one end of the optical fiber and the position of the one end of the optical fiber on the plane vertical to the optical axis. As a result, it is possible to fabricate an optical transmitter/receiver apparatus exhibiting excellent coupling efficiency of the light emitted from the semiconductor laser device at the one end of the optical fiber.

In the method for fabricating an optical transmitter/receiver apparatus of the present invention, the step of forming the concave groove preferably includes the step of forming a resin-introducing groove in the fiber end supporting region of the first base, the resin-introducing groove extending in a direction crossing the optical fiber end supporting concave groove and communicating with the optical fiber end supporting concave groove. The step of securing the one end of the optical fiber preferably includes the step of securing the one end of the optical fiber onto the optical fiber end supporting concave groove of the first base with a resin, the resin being supplied through the resin-introducing groove into the optical fiber end supporting concave groove.

In such a case, the resin can be introduced into the optical fiber end supporting concave groove with certainty. Thus, the optical fiber can be secured with certainty.

In order to accomplish the second object, a first optical semiconductor module of the present invention includes: a base including a concave groove extending in an optical axis direction and a cut recess extending in a direction vertical to the optical axis; a semiconductor laser device, secured to the base, for emitting semiconductor laser light; an optical fiber for transmitting the laser light emitted by the semiconductor laser device therethrough, the optical fiber being installed in the concave groove of the base with an incidence end face of the optical fiber in contact with a wall of the cut recess, the wall being closer to the semiconductor laser device; and an alignment mark, formed on the base, for aligning a position of the semiconductor laser device with a position of the base. The alignment mark is formed through the same photolithography and etching processes as processes applied to the concave groove.

In the first optical semiconductor module, the alignment mark is formed through the same photolithography and etching processes as those applied to the concave groove. Thus, since no positional misalignment is caused between the alignment mark and the concave groove that are both formed on the base, the positional misalignment between the semiconductor laser device positioned using the alignment mark and the optical fiber installed in the concave groove can be reduced to a large degree. As a result, the coupling efficiency of the laser light to the optical fiber can be improved.

In the first optical semiconductor module, the alignment mark preferably include a pair of side alignment marks, the side alignment marks being formed on both sides of a region of the base, to which region the semiconductor laser device is secured, so as to be symmetrically disposed with respect to the optical axis.

In such a case, the positional misalignment between the semiconductor laser device and the base in the direction vertical to the optical axis can be reduced within a plane parallel to the surface of the base. Thus, the positional misalignment between the laser light emitted from the semiconductor laser device and the optical fiber in the direction vertical to the optical axis can be reduced within a plane parallel to the surface of the base. As a result, the coupling efficiency of the laser light to the optical fiber can be increased to a large degree.

In the first optical semiconductor module, the alignment mark preferably includes a base edge alignment mark formed on an edge portion of the wall of the cut recess of the base, the wall being closer to the semiconductor laser device.

In such a case, since the positional misalignment between the semiconductor laser device and the base in the optical axis direction and the variation in distance between the emission end face of the semiconductor laser device and the incidence end face of the optical fiber can be reduced, the distance between the emission end face of the semiconductor laser device and the incidence end face of the optical fiber can be shortened. As a result, the coupling efficiency of the laser light to the optical fiber can be increased to a large degree.

In the first optical semiconductor module, the alignment mark preferably includes: a pair of side alignment marks, the side alignment marks being formed on both sides of a region of the base, to which region the semiconductor laser device is secured, so as to be symmetrically disposed with respect to the optical axis; and a base edge alignment mark formed on an edge portion of the wall of the cut recess of the base, the wall being closer to the semiconductor laser device.

In such a case, since the positional misalignment between the laser light emitted from the semiconductor laser device and the optical fiber in the direction vertical to the optical axis can be reduced within a plane parallel to the surface of the base. In addition, the variation in distance between the emission end face of the semiconductor laser device and the incidence end face of the optical fiber can also be reduced. As a result, the coupling efficiency of the laser light to the optical fiber can be increased to an even larger degree.

Preferably, the first optical semiconductor module further includes a laser edge alignment mark, formed on an edge portion of a bottom surface of the semiconductor laser device, for aligning a position of the semiconductor laser device with a position of the base, the edge portion of the bottom surface being closer to the optical fiber.

In such a case, since the positional misalignment between the semiconductor laser device and the base in the optical axis direction and the variation in distance between the emission end face of the semiconductor laser device and the incidence end face of the optical fiber can be reduced, the distance between the emission end face of the semiconductor laser device and the incidence end face of the optical fiber can be shortened. As a result, the coupling efficiency of the laser light to the optical fiber can be increased to a large degree.

In this embodiment, the alignment mark of the base preferably includes a base edge alignment mark formed on an edge portion of the wall of the cut recess of the base, the wall being closer to the semiconductor laser device.

In such a case, since the variation in distance between the emission end face of the semiconductor laser device and the incidence end face of the optical fiber can be further reduced, the distance between the emission end face of the semiconductor laser device and the incidence end face of the optical fiber can be further shortened. As a result, the coupling efficiency of the laser light to the optical fiber can be increased to an even larger degree.

In order to accomplish the second object, a second optical semiconductor module of the present invention includes: a base including a concave groove extending in a direction of an optical axis; a semiconductor laser device having a double channel structure, being secured to a base and emitting semiconductor laser light; an optical fiber, installed in the concave groove of the base, for transmitting the laser light emitted by the semiconductor laser device therethrough; and an alignment mark, formed on the base, for aligning a position of the semiconductor laser device with a position of the base. The alignment mark includes a convex alignment mark having a convex portion and existing between a pair of grooves each having a V-shaped cross section, the grooves being formed at positions symmetric to the optical axis in a region of the base, to which region the semiconductor laser device is secured.

In the second optical semiconductor module of the present invention, the alignment mark includes a convex alignment mark having a convex portion and existing between a pair of grooves each having a V-shaped cross section that are formed at positions symmetric to the optical axis on the base. Accordingly, the positional misalignment between the semiconductor laser device and the base in the direction vertical to the optical axis can be reduced within a plane parallel to the surface of the base. Thus, the positional misalignment between the laser light emitted from the semiconductor laser device and the optical fiber in the direction vertical to the optical axis can be reduced within a plane parallel to the surface of the base. As a result, the coupling efficiency of the laser light to the optical fiber can be increased to a large degree. In this case, since the semiconductor laser device has a double channel structure and no electrode needs to be formed in the region of the base in which the pair of grooves each having the V-shaped cross section are formed, the pair of grooves each having the V-shaped cross section can be formed.

In the second optical semiconductor module, the pair of grooves on both sides of the convex portion are formed through the same photolithography and etching processes as processes applied to the concave groove.

In such a case, since no positional misalignment is caused between the convex alignment mark and the concave groove, the positional misalignment between the semiconductor laser device located using the convex alignment mark and the optical fiber installed in the concave groove can be reduced to a large degree. As a result, the coupling efficiency of the laser light to the optical fiber can be considerably improved.

BRIEF DESCRIPTION OF THE DRAWINGS

FIG. 1(a) is a cross-sectional view thereof taken along the line Ia—Ia of FIG. 1(b); and FIG. 1(b) is a plan view thereof.

FIG. 2(a) is a cross-sectional view thereof taken along the line IIa—IIa of FIG. 1(a); and FIG. 2(b) is a cross-sectional view thereof taken along the line IIb—IIb of FIG. 1(a).

FIG. 3(a) is a cross-sectional view thereof taken along the line IIIa—IIIa of FIG. 3(b); and FIG. 3(b) is a plan view thereof.

FIG. 6(a) is a cross-sectional view thereof taken along the line VIa—VIa of FIG. 6(b); and FIG. 6(b) is a plan view thereof.

FIG. 9(a) is a cross-sectional view thereof taken along the line IXa—IXa of FIG. 8; FIG. 9(b) is a plan view illustrating a resin-draining groove of the optical transmitter/receiver apparatus of the third embodiment; and FIG. 9(c) is a perspective view illustrating the resin-draining groove.

FIG. 10(a) is a cross-sectional view thereof; and FIG. 10(b) is a cross-sectional view thereof taken along the line Xb—Xb of FIG. 10(a).

FIGS. 12(a) and 12(e) are plan views thereof; and FIGS. 12(b) through 12(d) are side views thereof.

FIG. 13(a) is a plan view thereof; FIGS. 13(b) and 13(c) are side views thereof; and FIG. 13(d) is a cross-sectional view thereof.

FIGS. 15(a) and 15(c) are cross-sectional views thereof; and FIG. 15(b) is a plan view thereof.

FIGS. 19(a) through 19(c) are cross-sectional views thereof; and FIG. 19(d) is a perspective view thereof.

FIGS. 20(a) and 20(b) are plan views thereof; and FIG. 20(c) is a cross-sectional view taken along the line XX—XX of FIGS. 20(a) and 20(b).

FIG. 26 is a schematic representation illustrating a step of mounting the semiconductor laser device onto the base in the method for fabricating the optical semiconductor module in the seventh embodiment.

FIG. 29(a) is a front view thereof; and FIG. 29(b) is a perspective view thereof.

FIG. 37(a) is a schematic plan view thereof; and FIG. 37(b) is a cross-sectional view thereof taken along the line A—A of FIG. 37(a).

DETAILED DESCRIPTION OF THE INVENTION

Embodiment 1

Hereinafter, an optical transmitter/receiver apparatus of the first embodiment will be described with reference to FIGS. 1(a) and 1(b) and FIGS. 2(a) and 2(b).

In the optical transmitter/receiver apparatus of the first embodiment, a first base 110, made of silicon, for performing optical transmission function and a second base 120, made of GaAs, for performing optical reception function are integrated.

Figure 1A:
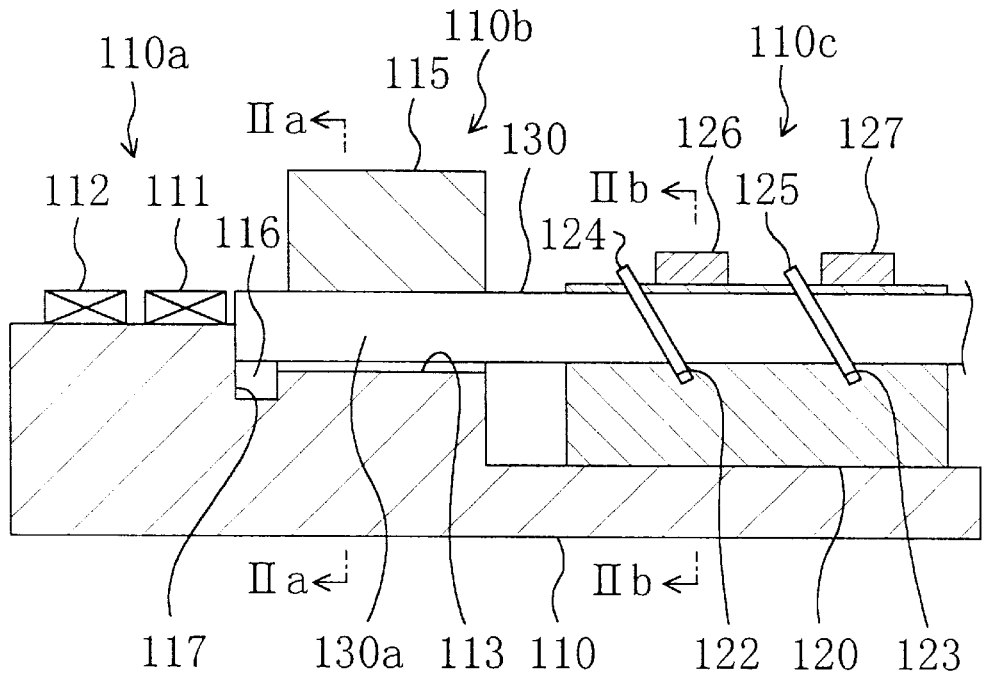
FIGS. 1(a) and 1(b) illustrate an optical transmitter/receiver apparatus of the first embodiment.
Figure 1B:
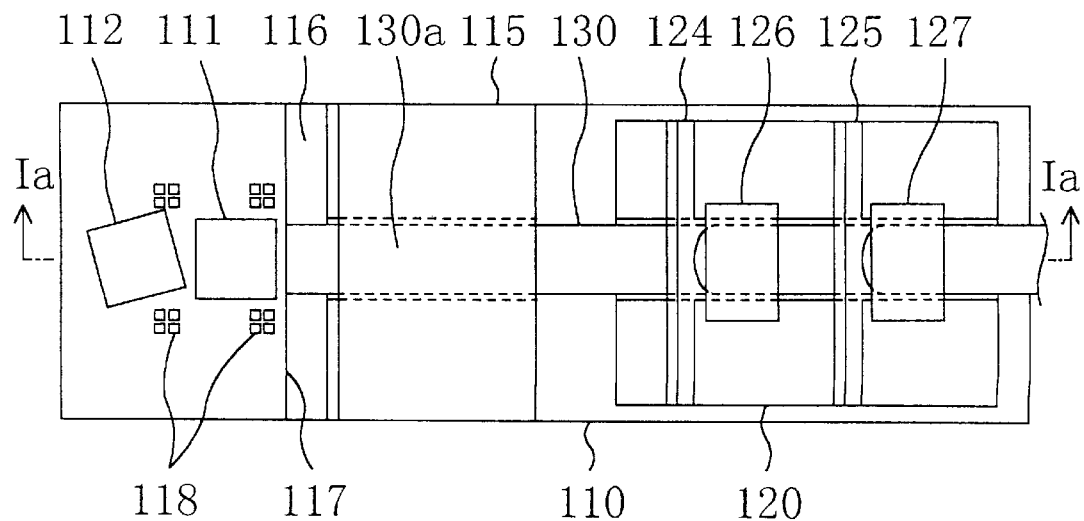

On an optical signal transmitting region 110a provided on the left-hand side of the first base 110 shown in FIGS. 1(a) and 1(b), a semiconductor laser device 111 for emitting light on the wavelength band of 1.3 $\mu$m, for example, and a monitoring light-receiving device 112 (e.g., a photodiode) for monitoring the intensity of the light emitted from the semiconductor laser device 111 are mounted. In view of the applications for fiber-to-the-user systems and the like, the wavelength of the light emitted from the semiconductor laser device 111 is preferably on the band of 1.3 $\mu$m. Preferably, the monitoring light-receiving device 112 is of a side face incident type and exhibits sufficiently high linear light receiving sensitivity on the wavelength band of the light emitted by the semiconductor laser device 111.

As shown in FIG. 1(b), the monitoring light-receiving device 112 is disposed to be inclined at a certain angle with respect to the optical axis so that the light reflected by the light-receiving plane of the monitoring light-receiving device 112 is not incident onto the active layer region of the semiconductor laser device 111 again.

Figure 2A:
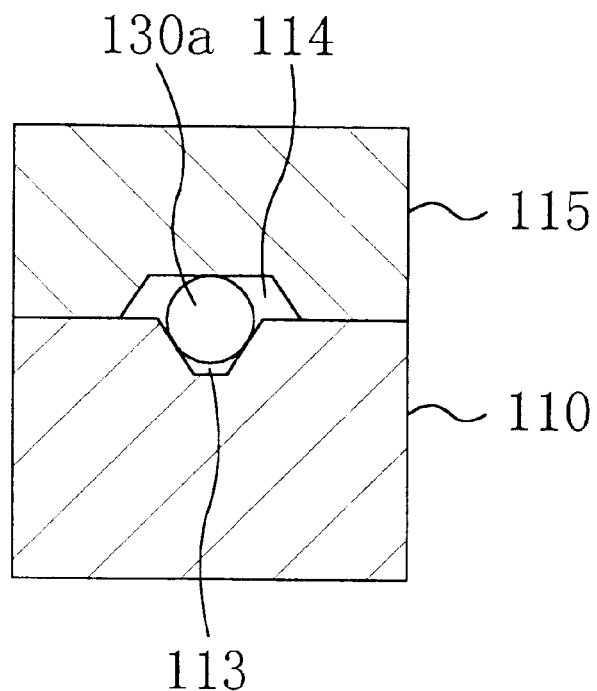
FIGS. 2(a) and 2(b) illustrate the optical transmitter/receiver apparatus of the first embodiment.

In the upper surface of optical fiber end supporting region 110b provided on the right hand side of the optical signal transmitting region 110a of the first base 110, a first concave groove 113, having a trapezoidal cross section as shown in FIG. 2(a), is formed so as to extend in the optical axis direction. An incident portion 130a of a singlemode optical fiber 130 is installed in the first concave groove 113.

The optical fiber 130 preferably has an incident end face subjected to an antireflection treatment in order to suppress the return loss of the light emitted by the semiconductor laser device 111 at a sufficiently low level. The mode field diameter of the optical fiber 130 is preferably set at an approximately equal value to the spot diameter of the semiconductor laser device 111 (enabling range is from 1.5 $\mu$m to 4.5 $\mu$m) so that the light emitted from the semiconductor laser device 111 couples at the incident end face of the optical fiber 130 at a high coupling efficiency.

Also, the distance between the semiconductor laser device 111 and the optical fiber 130 is preferably as short as possible in order that the light emitted from the semiconductor laser device 111 couples at the incident end face of the optical fiber 130 at an even higher coupling efficiency. It is noted that, in order to shorten the optical distance between the semiconductor laser device 111 and the optical fiber 130, resin or oil having a matched refractive index may be filled between the semiconductor laser device 111 and the optical fiber 130 though not shown.

A fiber-pressing member 115 having a second concave groove 114, the base of which is longer than that of the first concave groove 113, is attached onto the center portion of the first base 110. Thus, the incident portion 130a of the optical fiber 130 is supported at three contact points, i.e., points on both wall faces of the first concave groove 113 and on the base of the second concave groove 114. In this case, the fiber-pressing member 115 is made of a photocurable resin or a thermosetting resin having some shrinkage force. Accordingly, when the member 115 is attached to the first base 110, the incident portion 130a of the optical fiber 130 receives the approaching force of the fiber-pressing member 115 toward the first base 110 and is supported with certainty at the three points on both wall faces of the first concave groove 113 and on the base of the second concave groove 114. It is noted that the second concave groove 114 of the fiber-pressing member 115 may be formed by etching or by some mechanical working with a dicing saw or the like.

On the right hand side of the optical signal transmitting region 110a of the first base 110, a notch portion 116 extending vertically to the optical axis is formed. The incident end face of the optical fiber 130 is in contact with a fiber stopper 117, which is the wall face of the notch portion 116 closer to the optical signal transmitting region 110a. The distance between the semiconductor laser device 111 and the incident end face of the optical fiber 130 is regulated by this fiber stopper 117.

Since the incident portion 130a of the optical fiber 130 is supported at the three points and the incident end face of the optical fiber 130 is in contact with the fiber stopper 117, the optical axis can be adjusted on the order of sub-microns through passive alignment.

The semiconductor laser device 111 and the monitoring light-receiving device 112 need to be secured to the first base 110 and be accurately aligned with respect to the center line of the first concave groove 113 and to the fiber stopper 117. In order to improve the accuracy, alignment marks 118 are provided in the optical signal transmitting region 110a of the first base 110.

Figure 2B:
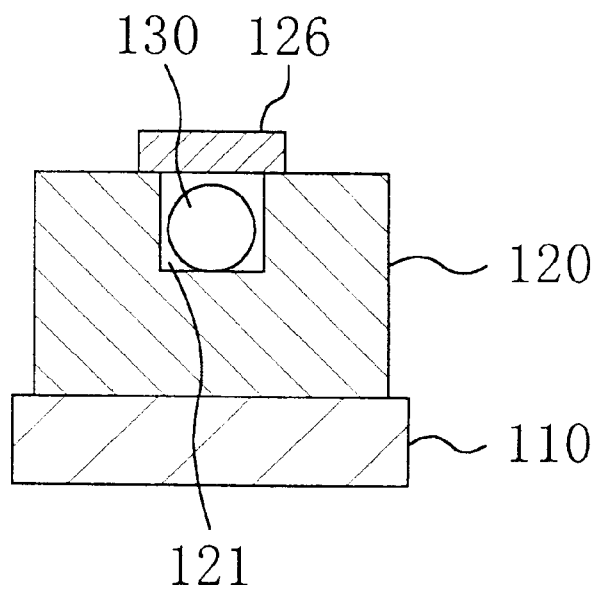

The second base 120 is secured onto an optical signal receiving region 110c provided on the right hand side of the optical fiber end supporting region 110b of the first base 110. In the upper surface of the second base 120, a third concave groove 121 having a square cross section is formed as shown in FIG. 2(b). The optical fiber 130 is installed in the third concave groove 121 and secured onto the bottom of the third concave groove 121 with a resin filled into the third concave groove 121. In this case, the optical fiber 130 is secured to the bottom of the third concave groove 121 such that some gap is produced between the optical fiber end supporting region 110b of the first base 110 and the second base 120 when the incident end face of the optical fiber 130 comes into contact with the wall face of the notch portion 116. As will be described later, since the optical fiber 130 is used for performing both optical transmission and reception functions, the optical axis height of the optical fiber 130 needs to be controlled accurately. Thus, the optical fiber 130 is secured to come into contact with the bottom of the third concave groove 121 over the entire length.

A first cut recess 122 being inclined with respect to the optical axis at a predetermined angle and extending vertically to the optical axis is formed in the left part of the second base 120. A half mirror 124 for transmitting the light on the wavelength band of 1.3 μm, which is incident from the left of the optical fiber 130, and for reflecting upward the light on the wavelength band of 1.3 μm, which is incident from the right of the optical fiber 130, is interposed into the first cut recess 122. On the other hand, a second cut recess 123 being inclined with respect to the optical axis at a predetermined angle and extending vertically to the optical axis is formed in the right part of the second base 120. A WDM filter 125 for transmitting the light on the wavelength band of 1.3 μm and for reflecting upward the light on the wavelength band of 1.55 μm is interposed into the second cut recess 123.

On the upper surface of the left part of the second base 120, a first light-receiving device 126 for signal reception of a bottom face incident type (e.g., a photodiode) for receiving the light on the wavelength band of 1.3 μm that has been reflected by the half mirror 124 is secured. On the upper surface of the right part of the second base 120, a second light-receiving device 127 for signal reception of a bottom face incident type (e.g., a photodiode) for receiving the light on the wavelength band of 1.55 μm that has been reflected by the WDM filter 125 is secured. In this case, the optical paths should be designed such that the light reflected by the half mirror 124 is accurately incident onto the first light-receiving device 126 and that the light reflected by the WDM filter 125 is accurately incident onto the second light-receiving device 127. Thus, after the optical fiber 130 has been secured onto the bottom of the third concave groove 121, the first and second cut recesses 122, 123 are provided by dicing cutting with accurate angles and positioning accuracy. Then, the half mirror 124 and the WDM filter 125 are secured into the first and second cut recesses 122 and 123 with a resin, respectively. The first and second light-receiving devices 126 and 127 preferably exhibit sufficiently high sensitivity with respect to the wavelength band of the incident light and excellent radio frequency signal characteristics.

In the optical transmitter/receiver apparatus of the first embodiment, since the optical fiber 130 functioning as a waveguide is linear, the optical fiber 130 need not be bent unlike the conventional optical transmitter/receiver apparatus described above. In other words, no limitation is imposed on the radius of curvature of the optical fiber. In addition, the optical path of the optical signal to be received is changed by the reflective half mirror 124 and WDM filter 125. Thus, the length of the optical transmitter/receiver apparatus in the optical axis direction is determined based on the thicknesses of the half mirror 124 and the WDM filter 125 and the bottom surface areas of the first and second light-receiving devices 126 and 127. Thus, the length of the optical transmitter/receiver apparatus in the optical axis direction may be about 10 mm to about 12 mm, which is approximately one half as compared with the case of using a PLC substrate.

In an optical transmitter/receiver apparatus using a PLC substrate, since the function of receiving an optical signal on the wavelength band of 1.55 μm needs to be provided outside of the apparatus, the overall size of the apparatus is adversely large and an additional process step of connecting a redundant fiber needs to be performed. By contrast, in the first embodiment, since the function of receiving an optical signal on the wavelength band of 1.55 μm can also be incorporated into the body of the apparatus, the overall apparatus can be downsized.

Figure 37A:
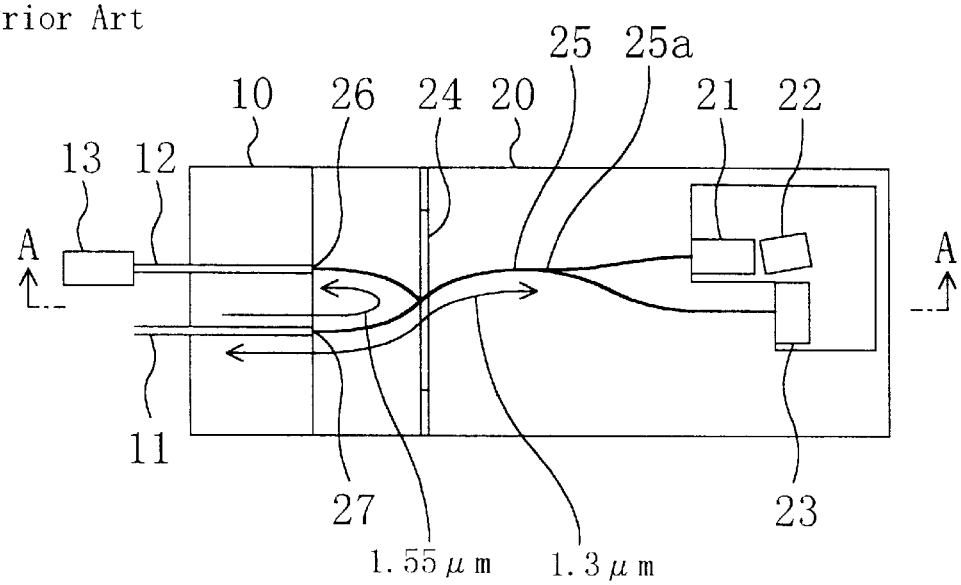
FIGS. 37(a) and 37(b) illustrate a conventional optical transmitter/receiver apparatus.
Figure 37B:
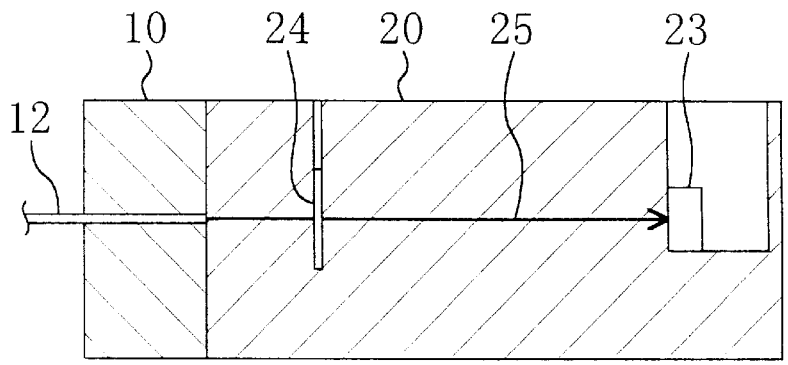
Figure 38:
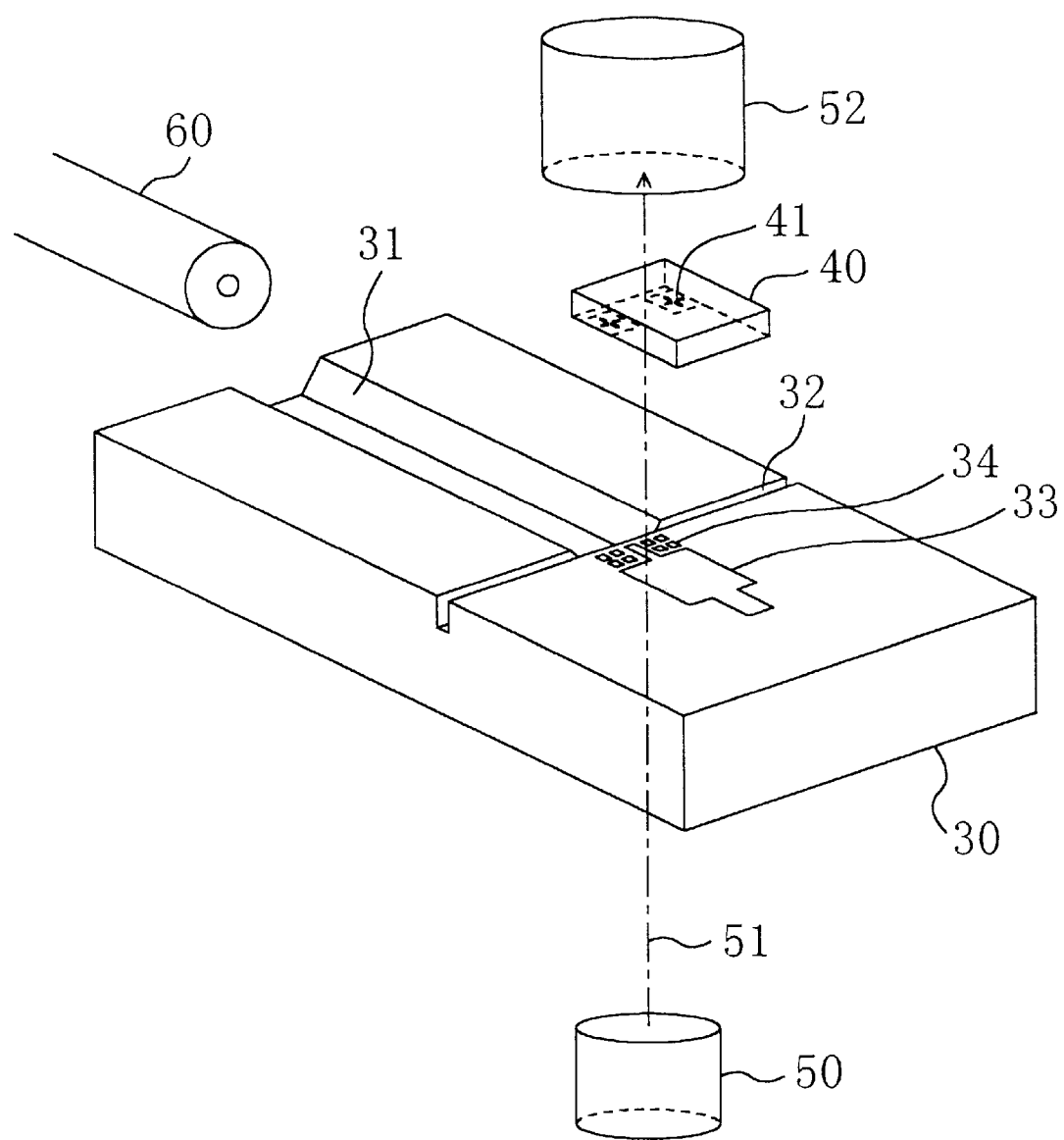
FIG. 38 is a perspective view illustrating an alignment step in a conventional method for fabricating an optical semiconductor module.

In addition, the optical transmitter/receiver apparatus using a PLC substrate requires a port for inputting an optical signal and a port for outputting an optical signal on the wavelength band of 1.55 μm as shown in FIGS. 37(a) and 37(b). Thus, the PLC substrate should be connected to the optical fibers at two points. On the other hand, in the first embodiment, since the sections for performing both optical signal reception and transmission functions are provided over a single continuous optical fiber, no optical fiber connection portion exists within the apparatus and the process step of connecting the optical fiber is no longer necessary.

Both the optical transmitter/receiver apparatus using a PLC substrate and the optical transmitter/receiver apparatus of the first embodiment, however, use a WDM filter for separating an optical signal to be received into light on the wavelength band of 1.3 µm and light on the wavelength band of 1.55 µm. Thus, the separation precision of the optical signal depends on the size of the receiving plane, to which the reflected light is incident, to a large degree. Since the optical transmitter/receiver apparatus using a PLC substrate has a structure in which the light reflected by the WDM filter is incident onto the PLC substrate, the size (i.e., the length of a side) of the rectangular receiving plane is as small as about 4 to 8 µm. Accordingly, since the WDM filter needs to be mounted such that the positional misalignment of the reflected light is not more than ±1 to 2 µm, high accuracy is required for the angle of the WDM filter and the position thereof in the optical axis direction. By contrast, in the first embodiment, the diameter of the receiving plane of the light-receiving device is as large as about 80 µm. Thus, even when the spread of the reflected light and the mounting accuracy (of about ±5 µm) of the light-receiving device are taken into consideration, far less strict mounting accuracy is required for the WDM filter.

Moreover, in the optical transmitter/receiver apparatus using a PLC substrate, the mounting accuracy values of the respective parts are as follows: the mounting accuracy between the waveguide of the PLC substrate and the semiconductor laser device is equal to or less than ±1 µm; the mounting accuracy between the semiconductor laser device and the monitoring light-receiving device is equal to or less than ±5 µm; the mounting accuracy between the waveguide of the PLC substrate and the light-receiving device is equal to or less than ±5 µm; and the mounting accuracy between the waveguide of the PLC substrate and the two optical fibers is equal to or less than ±2 µm. The accuracy required for the cut recess to which the WDM filter is inserted is as follows: the recess width accuracy is equal to or less than ±3 µm; the positioning accuracy in the optical axis direction is about ±3 µm; and the angular accuracy with respect to the optical axis about ±1 degree. By contrast, in the first embodiment, the mounting accuracy between the optical fiber and the semiconductor laser device is equal to or less than ±1 µm; the mounting accuracy between the semiconductor laser device and the monitoring light-receiving device is equal to or less than ±5 µm; and the positioning accuracy of each light-receiving device is equal to or less than ±5 µm. The accuracy required for the cut recess to which the WDM filter is inserted is as follows: the recess width accuracy is equal to or less than ±3 µm; the positioning accuracy in the optical axis direction is about +5 to 10 µm; and the angular accuracy with respect to the optical axis about ±3 degrees.

As described above, the optical transmitter/receiver apparatus of the first embodiment needs a smaller number of parts requiring high positioning accuracy and less strict positioning accuracy than the optical transmitter/receiver apparatus using a PLC substrate. Accordingly, the optical transmitter/receiver apparatus of the first embodiment is very advantageous in view of the mass productivity thereof.

In the first embodiment, the wavelength of the light emitted from the semiconductor laser device 111 is on the band of 1.3 µm. Alternatively, the light may be on the wavelength band of 1.55 µm or on any other wavelength band.

Also, the semiconductor laser device 111 may be a laser device having a narrow emission angle or a laser device having a spot size conversion function so as to realize even higher coupling efficiency at the incident end face of the optical fiber 130.

A silicon substrate is used as the first base 110. Alternatively, a glass substrate or a ceramic substrate may also be used so that the first concave groove 113 is worked with higher precision. In the case of using a glass substrate or a ceramic substrate, however, the film thickness of an electrode wiring layer formed on the glass substrate or the ceramic substrate is preferably set at a large value so that the semiconductor laser device 111 is radiated efficiently. The area of the electrode wiring layer is generally larger than the bottom surface area of the semiconductor laser device 111, and the electrode wiring layer laterally expands from the bottom of the semiconductor laser device 111. Thus, the electrode wiring layer has radiation function. Accordingly, if the film thickness of the electrode wiring layer is increased, then the cross sectional area of the heat radiation path is also increased. As a result, the semiconductor laser device 111 can be radiated more efficiently.

A GaAs substrate is used as the second base 120. Alternatively, a glass substrate or a ceramic substrate having excellent insulating properties may be used instead.

Variation 1 of Embodiment 1

Figure 3A:
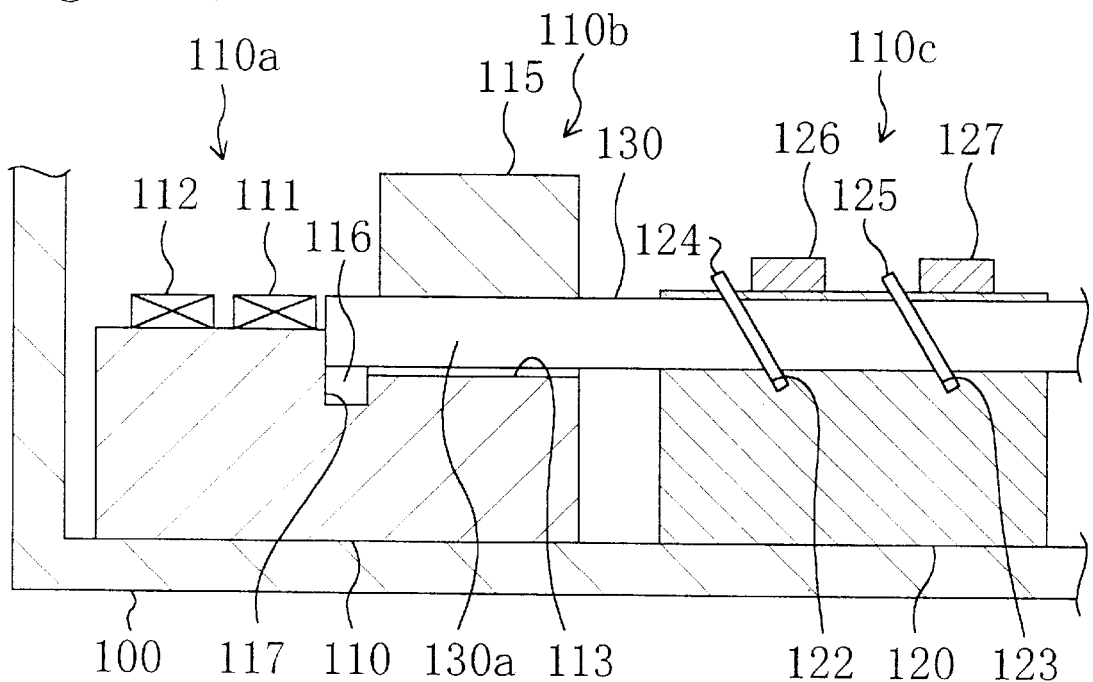
FIGS. 3(a) and 3(b) illustrate an optical transmitter/receiver apparatus in the first variation of the first embodiment.
Figure 3B:
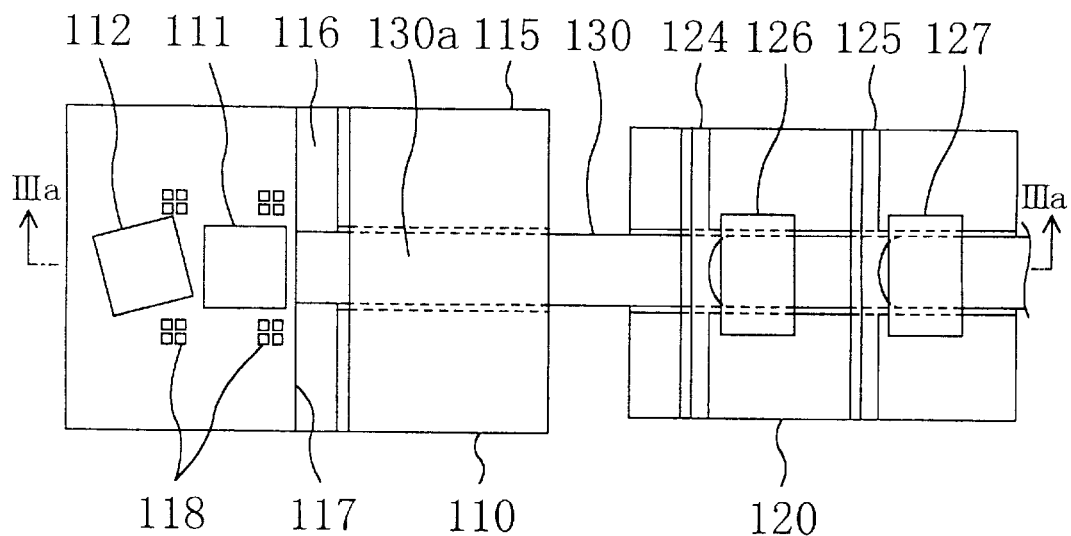

Hereinafter, an optical transmitter/receiver apparatus in the first variation of the first embodiment will be described with reference to FIGS. 3(a) and 3(b). In FIGS. 3(a) and 3(b), the same components as those of the first embodiment shown in FIGS. 1(a) and 1(b) will be identified by the same reference numerals and the description thereof will be omitted herein.

The first variation is characterized in that the first base 110 and the second base 120 are both secured to the bottom of a package 100. In the same way as in the first embodiment, a semiconductor laser device 111 and a monitoring light receiving device 112 are mounted on an optical signal transmitting region 110a of the first base 110. A notch portion 116 is provided for the first base 110. The incident end face of an optical fiber 130 comes into contact with a fiber stopper 117, i.e., the wall face of the notch portion 116 closer to the optical signal transmitting region 110a, whereby the distance between the semiconductor laser device 111 and the incident end face of the optical fiber 130 is regulated.

Also, in the same way as in the first embodiment, the optical fiber 130 is installed inside a third concave groove (not shown) formed in the upper surface of the second base 120, and is secured with a resin filled in the third concave groove.

In this first variation, the second base 120 supporting the optical fiber 130 can be secured to the package 100 after the semiconductor laser device 111, supported by the first base 110 secured to the package 100, has been subjected to an output test. Thus, the loss caused when the optical fiber 130 is connected to a defective semiconductor laser device 111 can be reduced.

Variation 2 of Embodiment 1

Figure 4:
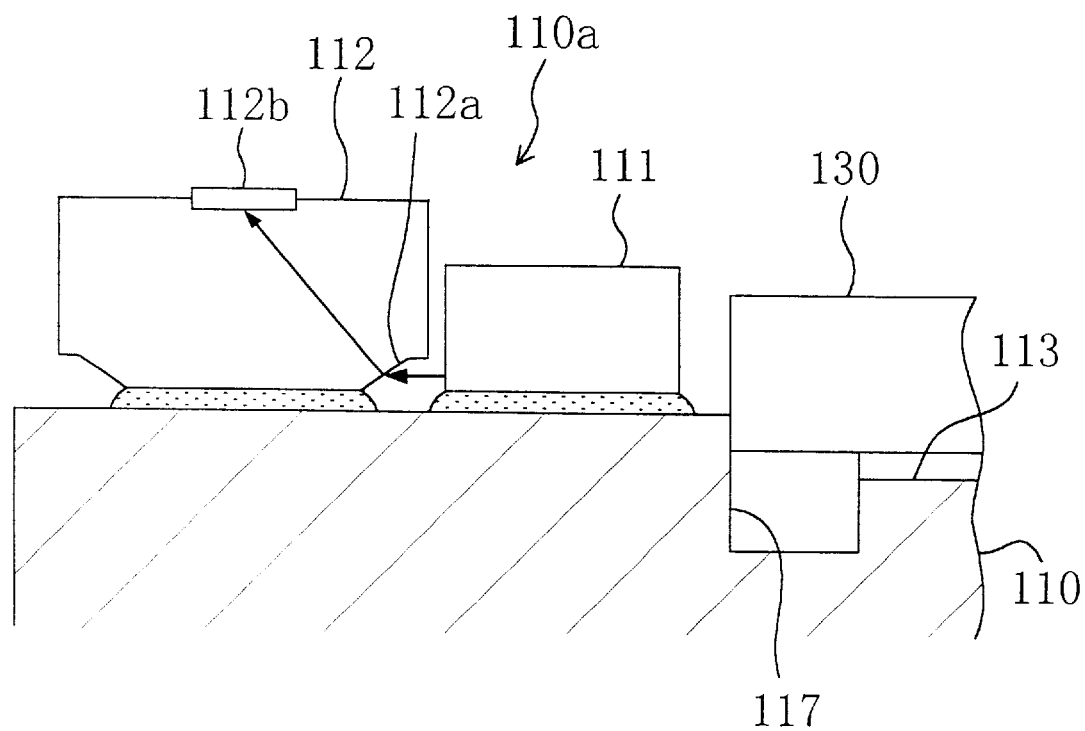
FIG. 4 is a partial cross-sectional view of an optical transmitter/receiver apparatus in the second variation of the first embodiment.

Hereinafter, an optical transmitter/receiver apparatus in the second variation of the first embodiment will be described with reference to FIG. 4. In FIG. 4, the same components as those of the first embodiment shown in FIGS. 1(a) and 1(b) will be identified by the same reference numerals and the description thereof will be omitted herein.

The second variation is characterized in that the monitoring light receiving device 112 is a chamfer incident type.

More specifically, the light emitted from the semiconductor laser device 111 is reflected upward by a light upturning mirror 112a formed at the lower end of the monitoring light receiving device 112, and then incident onto a light-receiving portion 112b formed on the upper surface of the monitoring light receiving device 112.

In this second variation, the light, which has been emitted through the left side of the semiconductor laser device 111 and then reflected by the right side of the monitoring light receiving device 112, is very less likely to be incident onto the active layer region of the semiconductor laser device 111 again. Thus, unlike the first embodiment, it is no longer necessary to dispose the monitoring light receiving device 112 to be inclined with respect to the optical axis. As a result, the mounting tolerance increases and the semiconductor laser device 111 and the monitoring light receiving device 112 can be mounted more easily.

Variation 3 of Embodiment 1

Figure 5:
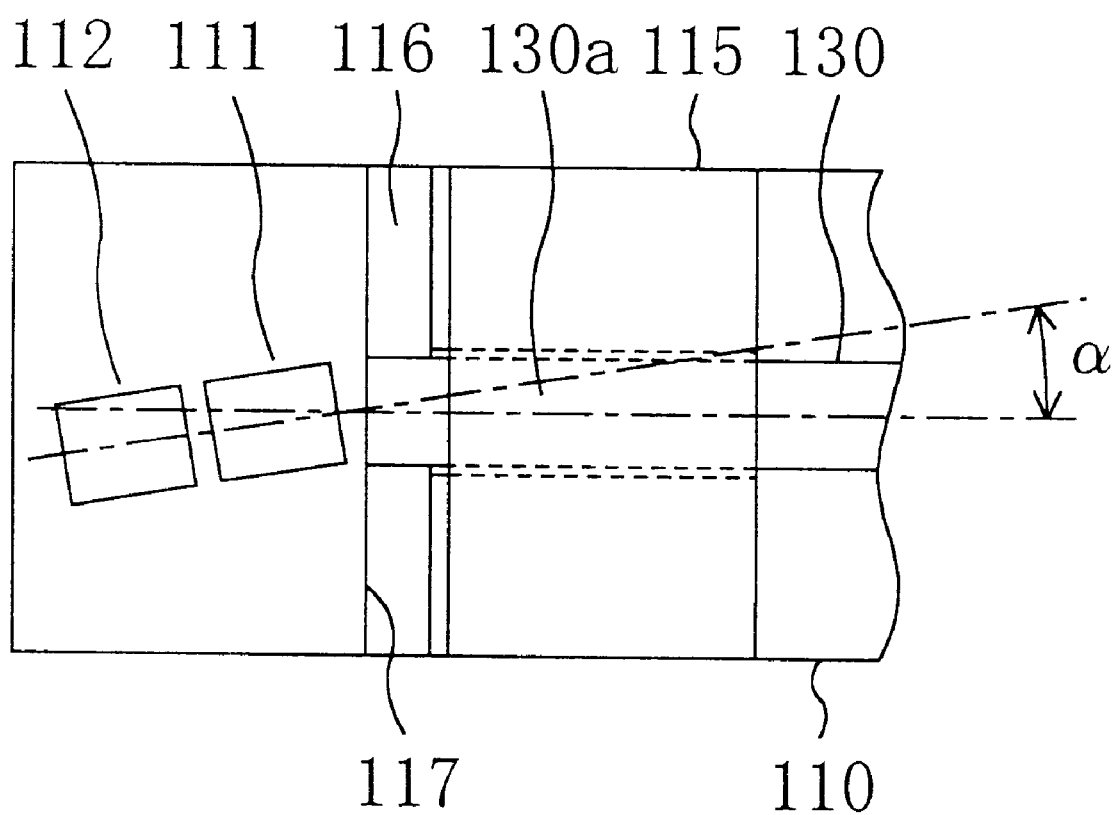
FIG. 5 is a partial plan view of an optical transmitter/receiver apparatus in the third variation of the first embodiment.

Hereinafter, an optical transmitter/receiver apparatus in the third variation of the first embodiment will be described with reference to FIG. 5. In FIG. 5, the same components as those of the first embodiment shown in FIGS. 1(a) and 1(b) will be identified by the same reference numerals and the description thereof will be omitted herein.

The third variation is characterized in that the semiconductor laser device 111 and the monitoring light receiving device 112 are secured to the first base 110 so as to be inclined with respect to the optical axis on the plane by a predetermined tilt angle α.

In the third variation, the light, which has been incident into the optical transmitter/receiver apparatus from the optical fiber 130, is attenuated and reflected inside the optical transmitter/receiver apparatus so as to be incident onto the optical fiber 130 again. The loss of the reflected light (i.e., the return loss) considerably affects the amount of noise generated from an optical network system using such an optical transmitter/receiver apparatus. In particular, the return loss of the light on the same wavelength band as that of the light emitted from the semiconductor laser device 111 affects the system most seriously.

Also, the return loss of the light on the same wavelength band as that of the light emitted from the semiconductor laser device 111 greatly depends on the loss of an optical coupling portion between the semiconductor laser deice 111 and the optical fiber 130.

In this third variation, since the semiconductor laser device 111 has the tilt angle α, the coupling efficiency of the light, which has been emitted through the end face of the optical fiber 130, reflected by the semiconductor laser device 111 and then incident onto the optical fiber 130 again, can be reduced. As a result, sufficient return loss can be ensured.

Figure 33:
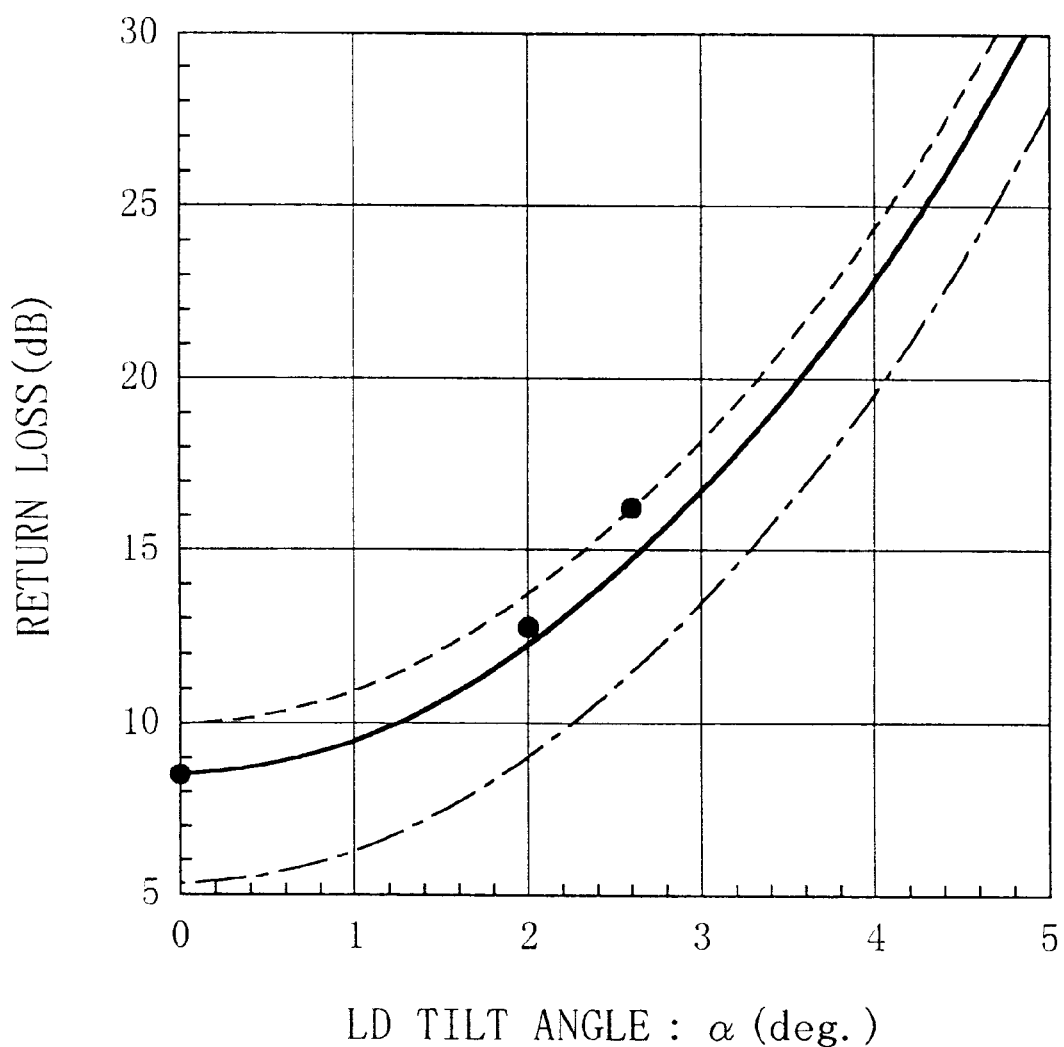
FIG. 33 is a characteristic diagram representing the relationship between the tilt angle α of a semiconductor laser device and the return loss in a connection between the semiconductor laser device and an optical fiber in the optical transmitter/receiver apparatus in the third variation of the first embodiment.

FIG. 33 illustrates the relationships between the return loss of the light, which has been externally incident into the optical transmitter/receiver apparatus through an optical fiber 130 having a mode field diameter φ of 10 μm, and the tilt angle α of the semiconductor laser device 111 in the optical coupling portion (i.e., the portion at which the semiconductor laser device 111 is coupled to the optical fiber 130). In FIG. 33, the one-dot chain represents the values calculated where no antireflection means is provided for the emission end face of the semiconductor laser device 111 (having a reflectivity of 30% at the emission end face). The solid line represents the values calculated where an antireflective resin is filled to the gap between the semiconductor laser deice 111 (having a reflectivity of 14% at the emission end face) and the optical fiber 130. The broken line represents the values calculated where an AR coating is provided for the emission end face of the semiconductor laser device 111 (having a reflectivity of 10% at the emission end face). And solid circles indicate the averages of the values obtained by the experiments each performed using 5 samples by filling in an antireflective resin between the semiconductor laser device 111 (having a reflectivity of 14% at the emission end face) and the optical fiber 130. The experiments are performed by setting the tilt angles α at 0 degrees, 2 degrees and 2.6 degrees, respectively. In these values obtained by experiments, the variation in return loss is within ±1 dB. As can be understood from the comparison between the two cases represented by the solid circles and the solid line (the reflectivity is set at 14% in both cases) in FIG. 33, very good approximation is attained between the calculated values and the values obtained by experiments.

Figure 34:
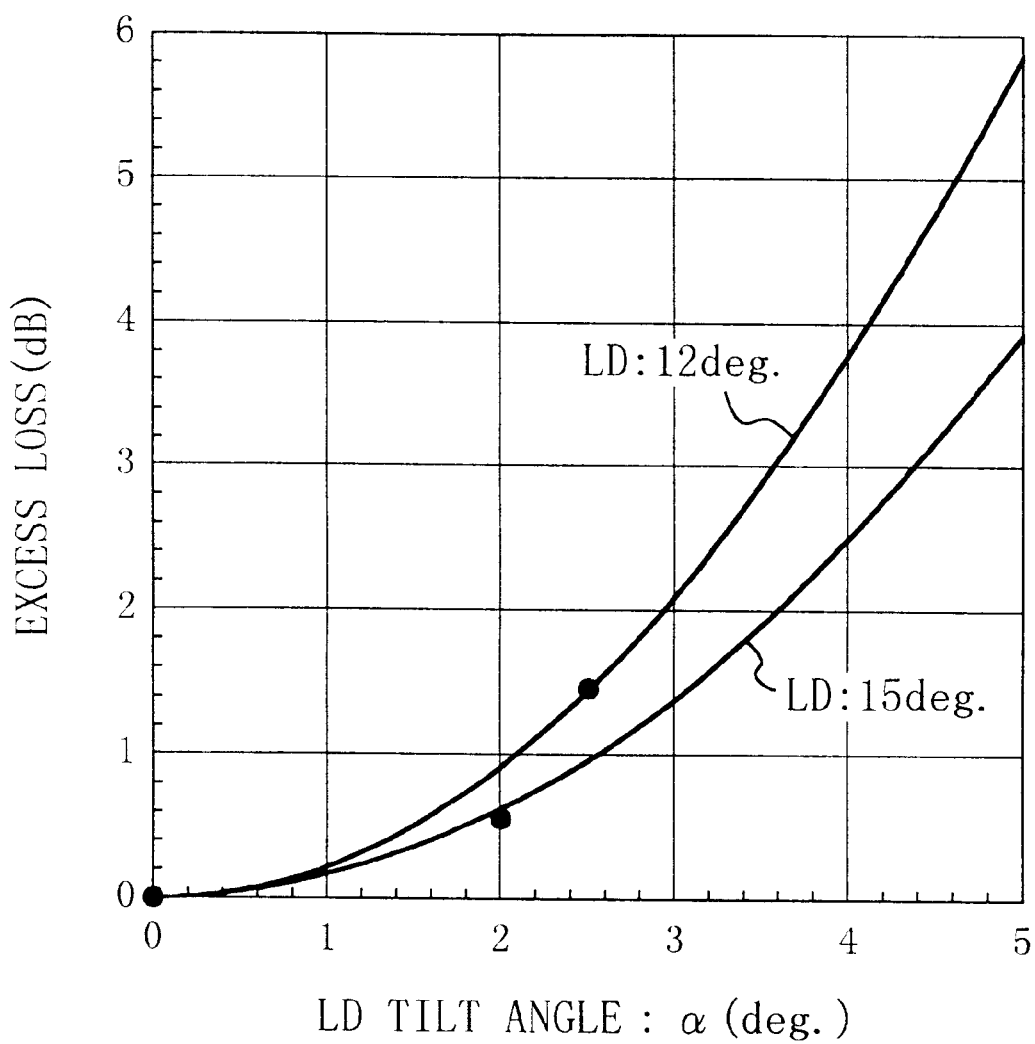
FIG. 34 is a characteristic diagram representing the relationship between the tilt angles of semiconductor laser devices and the excess loss in the optical transmitter/receiver apparatus in the third variation of the first embodiment.

FIG. 34 illustrates the relationships between the tilt angles α of the semiconductor laser device 111 and the excess loss (i.e., decrease in coupling efficiency at the incidence portion of an optical fiber) for the cases where the emission angles (spread angles) of the light emitted from the semiconductor laser device 111 are 15 degrees (the line identified by LD:15deg in FIG. 34) and 12 degrees (the line identified by LD:12deg in FIG. 34).

As can be understood from FIG. 33, if the tilt angle α is set at 2 degrees, then the return loss can be increased by about 3.5 dB. If the tilt angle α is set at 3 degrees, then the return loss can be increased by about 8.0 dB. However, when the semiconductor laser device 111 is inclined with respect to the optical axis in such a manner, the coupling efficiency of the light emitted from the semiconductor laser device 111 at the incidence portion 130a of the optical fiber 130 decreases.

Nevertheless, as can be understood from FIG. 34, when the emission angle of the semiconductor laser device 111 is 15 degrees, the excess loss is about 0.5 dB for the tilt angle α of 2 degrees and about 1.0 dB for the tilt angle α of 3 degrees. Thus, if the coupling efficiency corresponding to the tilt angle α of zero degrees is set at a sufficiently large value, the excess loss, resulting when the tilt angle α is set in the range from about 2 to about 3 degrees, can be suppressed to a negligible level. Because of the above-described reasons, if the tilt angle α is set in the range from about 2 to about 3 degrees, sufficient return loss can be obtained and, at the same time, decrease in coupling efficiency can be reduced.

Embodiment 2

Hereinafter, an optical transmitter/receiver apparatus of the second embodiment will be described with reference to FIGS. 6(a) and 6(b) and FIG. 7.

In the optical transmitter/receiver apparatus of the second embodiment, sections for performing optical transmission and reception functions are mounted on a base 200 made of silicon. That is to say, the base 200 has a LD/PD integrated monolithic structure.

Figure 6A:
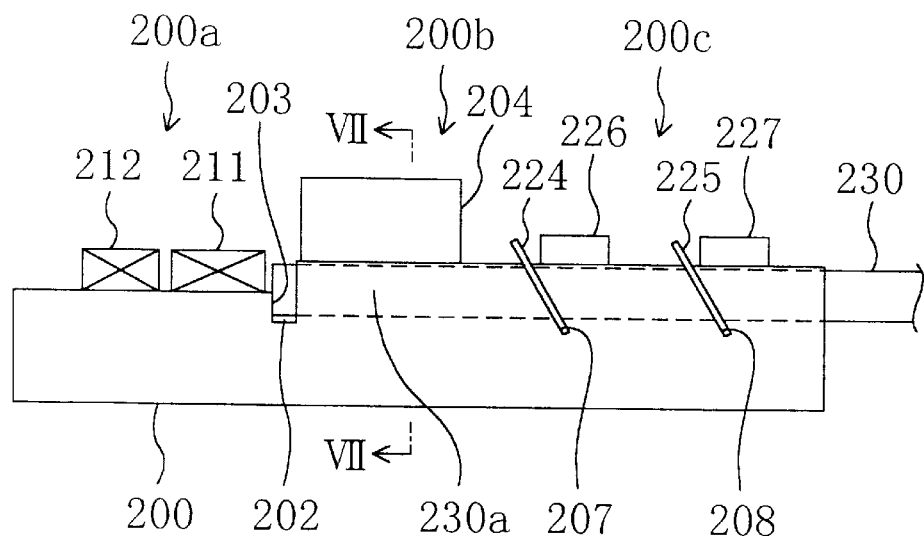
FIGS. 6(a) and 6(b) illustrate an optical transmitter/receiver apparatus of the second embodiment.
Figure 6B:
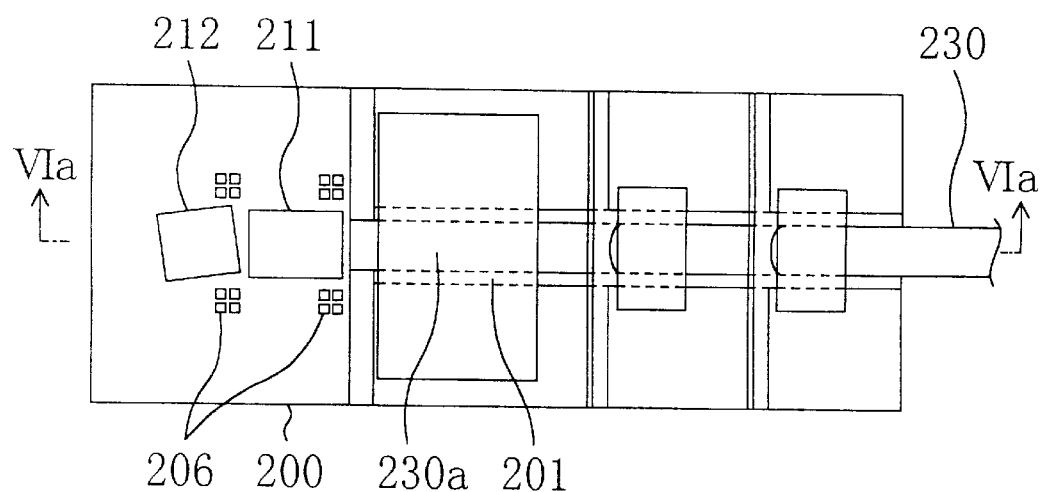

In the left-hand part of the base 200, an optical signal transmitting region 200a is formed at a level lower than the other regions of the base 200 by one step, as shown in FIGS. 6(a) and 6(b). On the optical transmitting region 200a, a semiconductor laser device 211 for emitting light on the wavelength band of 1.3 μm, for example, and a monitoring light-receiving device 212 (e.g., a photodiode) for monitoring the intensity of the light emitted from the semiconductor laser device 211 are mounted. In view of the applications for fiber-to-the-user systems and the like, the wavelength of the light emitted from the semiconductor laser device 211 is preferably on the band of 1.3 μm. Preferably, the monitoring light-receiving device 212 is of a side face incident type and exhibits sufficiently high linear light-receiving sensitivity on the wavelength band of the light emitted by the semiconductor laser device 211.

The optical fiber 230 preferably has an incident end face subjected to an antireflection treatment in order to suppress the return loss of the light emitted by the semiconductor laser device 211 at a sufficiently low level. The mode field diameter of the optical fiber 230 is preferably set at an approximately equal value to the spot diameter of the semiconductor laser device 211 (enabling range is from 1.5 $\mu$m to 4.5 $\mu$m) so that the light emitted from the semiconductor laser device 211 couples at the incident end face of the optical fiber 230 at a high coupling efficiency.

Also, the distance between the semiconductor laser device 211 and the optical fiber 230 is preferably as short as possible in order that the light emitted from the semiconductor laser device 211 couples at the incident end face of the optical fiber 230 at an even higher coupling efficiency. It is noted that, in order to shorten the optical distance between the semiconductor laser device 211 and the optical fiber 230, resin or oil having a matched refractive index may be filled between the semiconductor laser device 211 and the optical fiber 230 though not shown.

As shown in FIG. 6(b), the monitoring light-receiving device 212 is disposed to be inclined at a certain angle with respect to the optical axis so that the light reflected by the light-receiving plane of the monitoring light-receiving device 212 is not incident onto the active layer region of the semiconductor laser device 211 again.

On the part of the base 200 on the right-hand side of the optical signal transmitting region 200a, an optical fiber end supporting region 200b and an optical signal receiving region 200c, which are at a level higher than that of the optical signal transmitting region 200a by one step, are provided. All through the optical fiber end supporting region 200b and the optical signal receiving region 200c, a concave groove 201 having a cross section in the shape of a pentagon consisting of an upper square part and a lower triangular part, extends in the optical axis direction shown in FIG. 7. A singlemode optical fiber 230 is installed in the concave groove 201.

On the right hand side of the optical signal transmitting region 200a of the base 200, a notch portion 202 extending vertically to the optical axis is formed. The incident end face of the optical fiber 230 is in contact with a fiber stopper 203, which is the wall surface of the notch portion 202 closer to the optical signal transmitting region 200a. The distance between the semiconductor laser device 211 and the incident end face of the optical fiber 230 is regulated by this fiber stopper 203.

Figure 7:
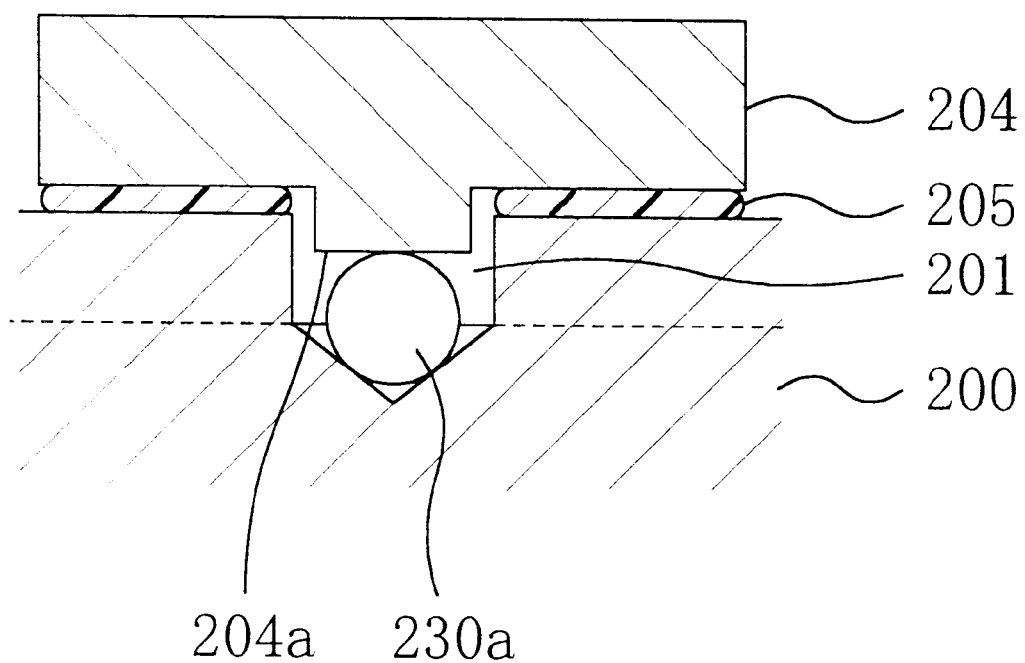
FIG. 7 is a cross-sectional view of the optical transmitter/receiver apparatus of the second embodiment taken along the line VII—VII of FIG. 6(a).

As shown in FIG. 7, a fiber-pressing member 204 having a convex portion 204a on the lower surface thereof is secured onto the optical fiber end supporting region 200b of the base 200 via a photocurable or thermosetting resin 205 having some shrinkage force. The incident portion 230a of the optical fiber 230 is pressed against both wall faces of the triangular part of the concave groove 201 by the bottom surface of the convex portion 204a of the fiber-pressing member 204. Thus, the incident portion 230a of the optical fiber 230 is supported at three contact points, i.e., points on both wall faces of the triangular part of the concave groove 201 and on the bottom of the convex portion 204a of the fiber-pressing member 204. In this case, since the fiber-pressing member 204 is secured to the base 200 via the resin 205 having some shrinkage force, the incident portion 230a of the optical fiber 230 receives the approaching force of the fiber-pressing member 204 toward the base 200 and is supported with certainty at the three points on both walls of the triangular part of the concave groove 201 and on the bottom of the convex portion 204a of the fiber-pressing member 204.

It is noted that the convex portion 204a of the fiber-pressing member 204 may be formed by etching a silicon substrate or working the substrate using a dicing saw. Alternatively, the portion may also be formed by subjecting a glass material to high temperature press working using high-precision mold or working the glass material using a dicing saw.

Since the incident portion 230a of the optical fiber 230 is supported at the three points and the incident end face of the optical fiber 230 is in contact with the fiber stopper 203, the optical axis can be adjusted on the order of sub-microns through passive alignment. In addition, since the optical fiber 230 is secured to the concave groove 201 continuously extending through the optical fiber end supporting region 200b and the optical signal receiving region 200c, the height of the optical axis of the optical fiber 230 can be precisely controlled in a self aligning manner.

The semiconductor laser device 211 and the monitoring light-receiving device 212 need to be secured to the base 200 and be accurately aligned with respect to the center line of the concave groove 201 and to the fiber stopper 203. In order to improve the accuracy, alignment marks 206 are provided in the optical signal transmitting region 200a of the base 200.

A first cut recess 207 being inclined with respect to the optical axis at a predetermined angle and extending vertically to the optical axis is formed in the left part of the optical signal receiving region 200c of the base 200. A half mirror 224 for transmitting the light on the wavelength band of 1.3 $\mu$m, which comes from the incident portion of the optical fiber 230, and for reflecting upward the light on the wavelength band of 1.3 $\mu$m, which comes from the emission portion of the optical fiber 230, is interposed into the first cut recess 207. On the other hand, a second cut recess 208 being inclined with respect to the optical axis at a predetermined angle and extending vertically to the optical axis is formed in the right part of the optical signal receiving region 200c of the base 200. A WDM filter 225 for transmitting the light on the wavelength band of 1.3 $\mu$m and for reflecting upward the light on the wavelength band of 1.55 $\mu$m is interposed into the second cut recess 208.

On the upper surface of the left part of the optical signal receiving region 200c of the base 200, a first light-receiving device 226 of a bottom face incident type (e.g., a photodiode) for receiving the light on the wavelength band of 1.3 $\mu$m that has been reflected by the half mirror 224 is secured. On the upper surface of the right part of the optical signal receiving region 200c of the base 200, a second light-receiving device 227 of a bottom face incident type (e.g., a photodiode) for receiving the light on the wavelength band of 1.55 $\mu$m that has been reflected by the WDM filter 225 is secured. In this case, the optical paths should be designed such that the light reflected by the half mirror 224 is accurately incident onto the first light-receiving device 226 and that the light reflected by the WDM filter 225 is accurately incident onto the second light-receiving device 227. Thus, after the optical fiber 230 has been secured onto the bottom of the concave groove 201, the first and second cut recesses 207, 208 are provided by dicing cutting with accurate angles and positioning accuracy. Then, the half mirror 224 and the WDM filter 225 are secured into the first and second cut recesses 207 and 208 with a resin, respectively. The first and second light-receiving devices 226 and 227 preferably exhibit sufficiently high sensitivity with respect to the wavelength band of the incident light and excellent radio frequency signal characteristics.

In the same way as in the first embodiment, since the optical transmitter/receiver apparatus of the second embodiment needs a smaller number of parts requiring high positioning accuracy and less strict positioning accuracy than the optical transmitter/receiver apparatus using a PLC substrate, the optical transmitter/receiver apparatus is very advantageous in view of the mass productivity thereof.

In the second embodiment, the wavelength of the light emitted from the semiconductor laser device 211 is on the band of 1.3 μm. Alternatively, the light may be on the wavelength band of 1.55 μm or on any other wavelength band.

Also, the semiconductor laser device 211 may be a laser device having a narrow emission angle or a laser device having a spot size conversion function so as to realize even higher coupling efficiency at the incident end face of the optical fiber 230.

A silicon substrate is used as the base 200. Alternatively, a glass substrate or a ceramic substrate may also be used so that the concave groove 201 is worked with higher precision. In the case of using a glass substrate or a ceramic substrate, however, the film thickness of an electrode wiring layer formed on the glass substrate or the ceramic substrate is preferably set at a large value so that the semiconductor laser device 211 is radiated efficiently.

Embodiment 3

Hereinafter, an optical transmitter/receiver apparatus of the third embodiment will be described with reference to FIG. 8 and FIGS. 6(a) through 6(c).

The third embodiment relates to a modified structure for securing the optical fiber 130 to the first base 110 and the second base 120 as being applicable to the first embodiment or for securing the optical fiber 230 to the base 200 as being applicable to the second embodiment.

Figure 8:
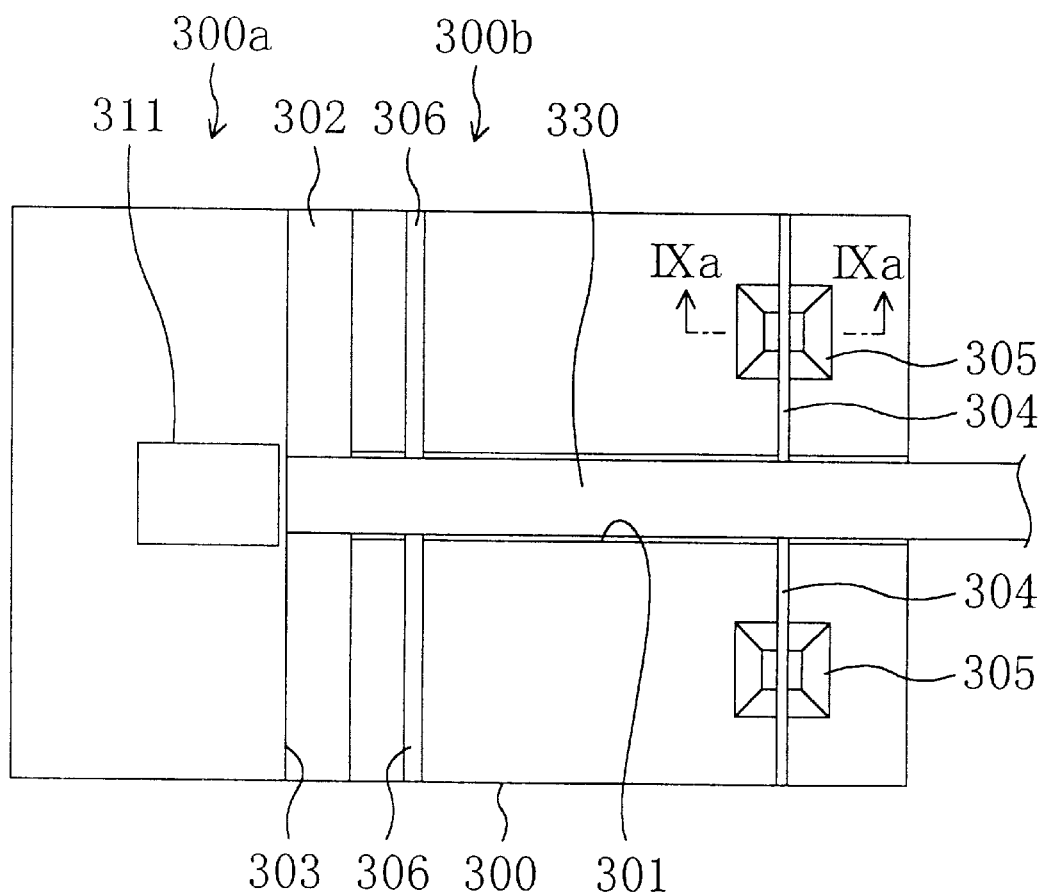
FIG. 8 is a plan view of an optical transmitter/receiver apparatus of the third embodiment.

As shown in FIG. 8, a semiconductor laser device 311 is mounted on an optical signal transmitting region 300a of a base 300. A concave groove 301 having a trapezoidal cross section and extending in the optical axis direction is formed all through an optical fiber end supporting region 300b and an optical signal receiving region (not shown) of the base 300. A singlemode optical fiber 330 is installed in the concave groove 301. On the right hand side of the optical signal transmitting region 300a of the base 300, a notch portion 302 extending vertically to the optical axis is formed. The incident end face of the optical fiber 330 is in contact with a fiber stopper 303, which is the wall face of the notch portion 302 closer to the optical signal transmitting region 300a.

Figure 9A:
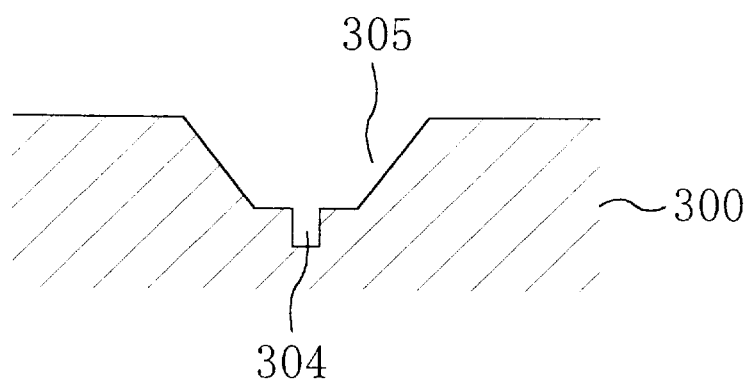
FIGS. 9(a) through 9(c) illustrate the optical transmitter/receiver apparatus of the third embodiment.

As shown in FIGS. 8 and 9(a), a pair of resin supply grooves 304 are formed in the right part of the optical fiber end supporting region 300b of the base 300. The resin supply grooves 304 extend vertically to the optical axis and communicate with the concave groove 301. Each of the grooves 304 has a bottom located at a higher level than that of the bottom of the concave groove 301. In the center portion of each resin supply groove 304, a resin supplying concave portion 305 of a trapezoidal truncated pyramid shape, having a bottom located at a higher level than that of the bottom of the resin supply groove 304, is formed. In such a structure, when a resin having low viscosity for securing the optical fiber 330 to the base 300 is supplied to the resin supply concave portions 305, the supplied resin passes through the resin supplying concave portions 305 and the resin supply grooves 304 into the concave groove 301. The resin introduced into the concave groove 301 flows between the optical fiber 330 and the walls or bottom of the concave groove 301 owing to capillary action so as to secure the optical fiber 330 to the walls or bottom of the concave groove 301.

Figure 9B:
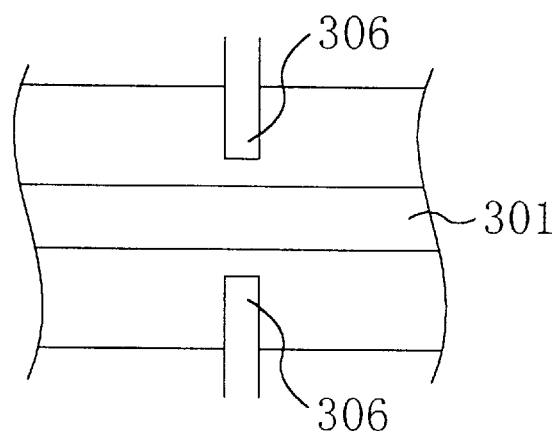
Figure 9C:
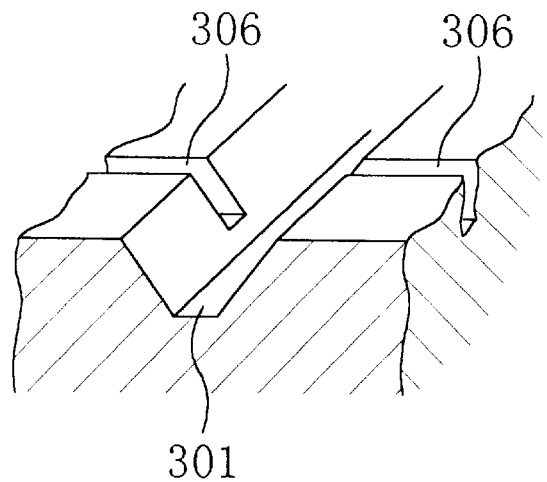

As shown in FIG. 8 and FIGS. 9(b) and 9(c), a pair of resin-draining grooves 306 are formed in the left part of the optical fiber end supporting region 300b of the base 300. The resin-draining grooves 306 extend vertically to the optical axis and communicate with the concave groove 301. Each of the grooves 306 has a bottom located at a higher level than that of the bottom of the concave groove 301. In such a structure, the residual resin other than the resin used for securing the optical fiber 330 to the walls or bottom of the concave groove 301 is drained through the resin-draining grooves 306 to the outside. Thus, even if a great deal of resin, exceeding a required amount, is supplied, it is possible to prevent the resin from flowing through the concave groove 301 into the notch portion 302 and then into the vicinity of the semiconductor laser device 311. In addition, since a constant amount of resin is used for securing the optical fiber 330 to the walls or bottom of the concave groove 301, stable securing is realized.

It is noted that the resin supply grooves 304, the resin supplying concave portions 305 and the resin-draining grooves 306 may be provided for a fiber-pressing member, as well as the base.

Embodiment 4

Hereinafter, an optical transmitter/receiver apparatus of the fourth embodiment will be described with reference to FIGS. 10(a) and 10(b). The fourth embodiment is different from the first embodiment only in that a jacket (or an MU ferrule) 131 for the optical fiber 130 is secured to the first base 110. Thus, the same members as those of the first embodiment are identified by the same reference numerals as those used in FIG. 1(a) and the description thereof will be omitted herein.

Figure 10A:
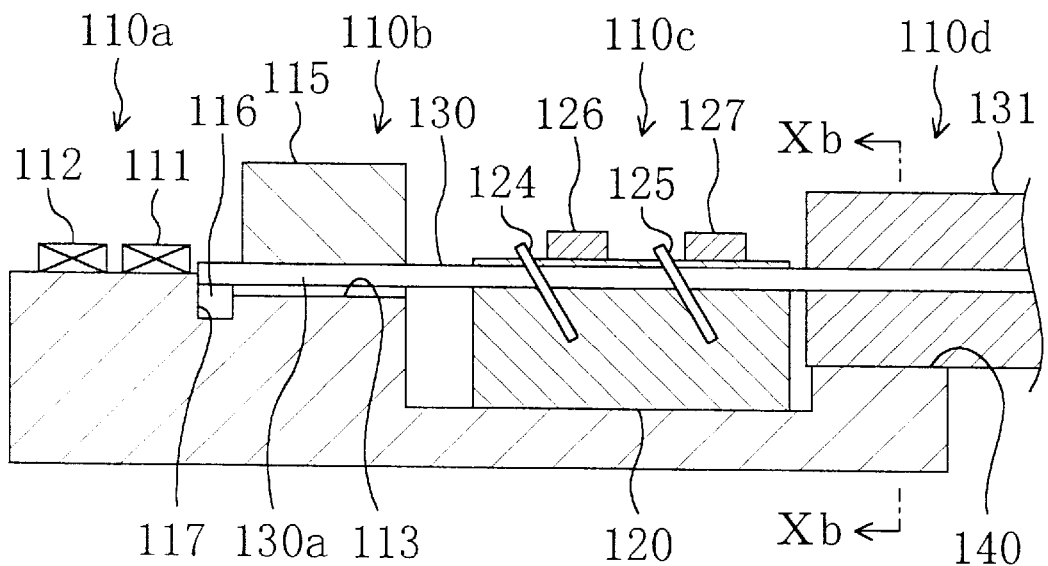
FIGS. 10(a) and 10(b) illustrate an optical transmitter/receive apparatus of the fourth embodiment.
Figure 10B:
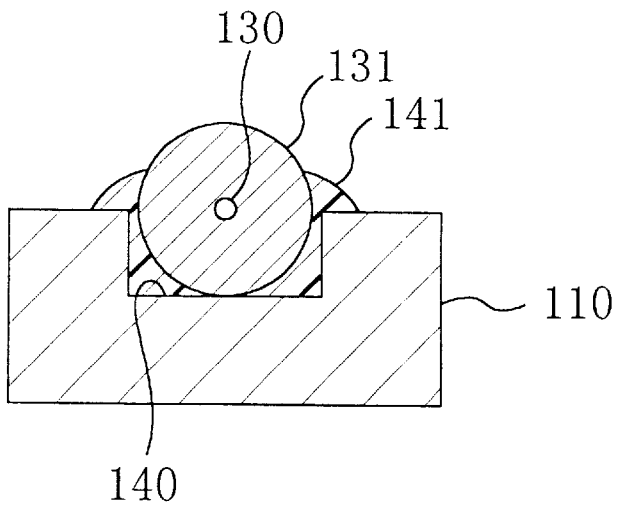

As shown in FIG. 10(a), a jacket supporting region 110d, extending from the optical signal receiving region 110c in the opposite direction away from the semiconductor laser device 111 and being located at a level higher than that of the optical signal receiving region 110cc, is provided for the first base 110. A fourth concave groove 140 having a rectangular cross section and extending in the optical axis direction is formed in the jacket supporting region 110d. The jacket (or an MU ferrule) 131 of the optical fiber 130 is installed inside the fourth concave groove 140. As shown in FIG. 10(b), the jacket (or an MU ferrule) 131 is secured to the first base 110 via a photocurable or thermosetting resin 141.

It is noted that the fourth concave groove 140 may be formed through working by the use of a dicing saw or through etching.

Also, a jacket supporting member provided separately from the first base 110 may be secured to the first base 110 to form the jacket supporting region 110d.

Embodiment 5

Figure 11A:
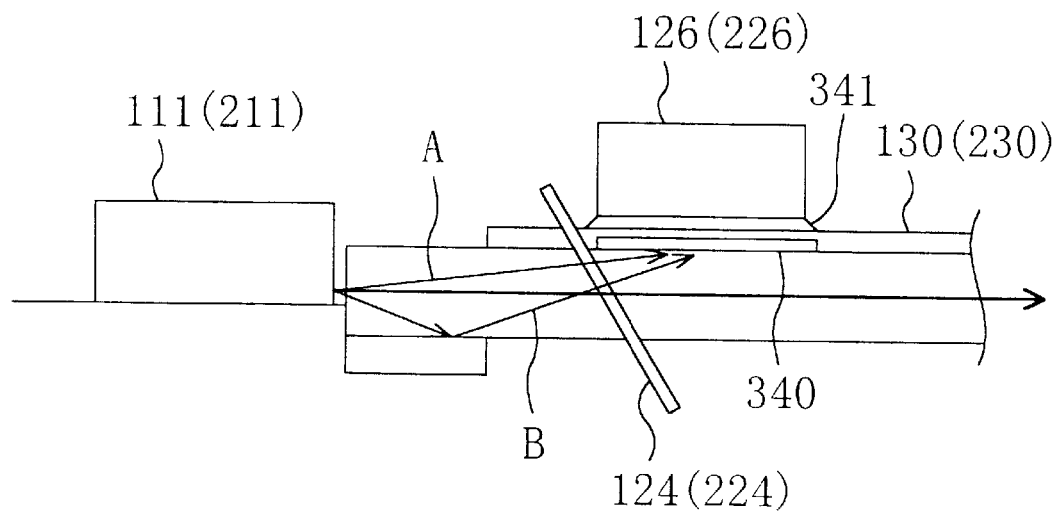
FIG. 11(a) is a partial cross-sectional view of an optical transmitter/receiver apparatus of the fifth embodiment.

Hereinafter, an optical transmitter/receiver apparatus of the fifth embodiment will be described with reference to FIG. 11(a). The fifth embodiment relates to a variation of the structure for clamping the first light-receiving device 126, 226 of the first or the second embodiment. More specifically, a filter 340 for selectively transmitting the light on the wavelength band of 1.55 μm or selectively reflecting the light on the wavelength band of 1.3 μm is provided immediately under the first light-receiving device 126, 226 and immediately above the optical fiber 130, 230. In FIG. 11(a), the reference numeral 341 denotes a refractive index matched resin for securing the first light-receiving device 126, 226 to the base.

Hereinafter, the reasons why the filter 340 is provided will be described.

In the light emitted from the semiconductor laser device 111, 211, the component impinging onto the interface between a core layer and a cladding layer of the optical fiber 130, 230 at a large incidence angle penetrates through the core layer, travels to the cladding layer and then attenuates. On the other hand, the component impinging at a small incidence angle is propagated through the core layer. Thus, in a part relatively distant from the light incident end face of the optical fiber, substantially no light component penetrates through the core layer to the cladding layer. However, in a part relatively close to the light incident end face of the optical fiber, some light components penetrate through the core layer to the cladding layer. In FIG. 11(a), the arrow A indicates the light component traveling directly from the semiconductor laser device 111, 211 toward the cladding layer, and the arrow B indicates the light component that is emitted from the semiconductor laser device 111, 211, reflected by the interface between the core layer and the cladding layer and then travels to the cladding layer. If the light component indicated by the arrow A or B passes through the half mirror 124, 224 and is incident onto the first light-receiving device 126, 226, then the light component becomes noise. However, if the filter 340 is provided immediately under the first light-receiving device 126, 226, then the component, indicated by the arrow A or B, of the light on the wavelength band of 1.3 μm that has been emitted from the semiconductor laser device 111, 211 is removed by the filter 340. Thus, the component is not incident onto the first light-receiving device 126, 226, and does not become noise. As a result, the light on the wavelength band of 1.3 μm is isolated.

Figure 11B:
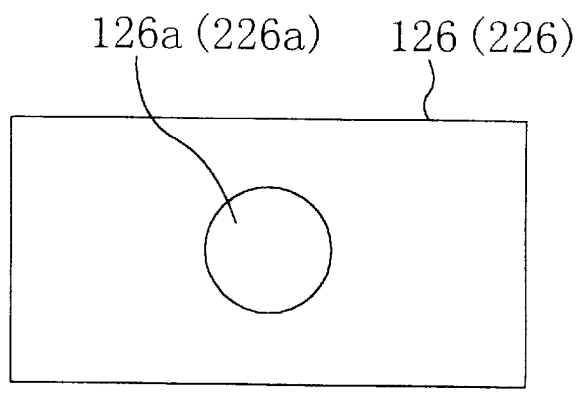
FIG. 11(b) is a plan view illustrating the light-receiving plane of a first light-receiving device of the optical transmitter/receiver apparatus o f)the fifth embodiment.

FIG. 11(b) illustrates a variation of the fifth embodiment. In FIG. 11(b), a coating layer for selectively transmitting light on the wavelength band of 1.55 μm or selectively reflecting light on the wavelength band of 1.3 μm is formed on the light-receiving plane 126a, 226a of the first light-receiving device 126, 226 instead of providing the filter 340 immediately under the first light-receiving device 126, 226.

The first to fifth embodiments have been described as being applied to an optical transmitter/receiver apparatus for multiplexing for two wavelength bands. However, if the number of WDM filters for selectively reflecting the incident light on the respective wavelength bands is increased, then an optical transmitter/receiver apparatus for multiplexing for three or more wavelength bands can be formed. An exemplary optical transmitter/receiver apparatus for multiplexing for three or more wavelength bands will be described. For example, assume case where three different types of light on three mutually different (first, second and third) wavelength bands is transmitted from a center station. A first WDM filter for reflecting upward the light on a first wavelength band and transmitting the light on second and third wavelength bands is provided at a position of an optical fiber that is closest to the center station. A second WDM filter for reflecting upward the light on the second wavelength band and transmitting the light on the third wavelength band is provided at a position of the optical fiber that is the closest to the center station but the first WDM filter. And a half mirror for reflecting upward the light on the third wavelength band, transmitted from the center station, and transmitting the light on the third wavelength band, emitted from a semiconductor laser device, is provided at a position of the optical fiber that is farthest from the center station of the three positions. In such a case, in order to increase the light to be received on a wavelength band, the length of a base should be increased by about 1 mm to about 2 mm and an additional WDM filter and an additional light-receiving device should be provided.

Method for Fabricating Optical Transmitter-Receiver Apparatus of First Embodiment Hereinafter, a method for fabricating the optical transmitter/receiver apparatus of the first embodiment will be described with reference to FIG. 12(a) through FIG. 15(c).

Figure 12A:
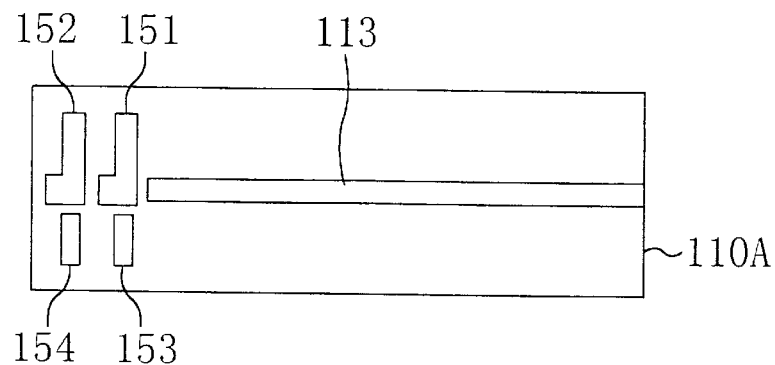
FIGS. 12(a) through 12(e) illustrate the respective process steps for fabricating the optical transmitter/receiver apparatus of the first embodiment.
Figure 12B:
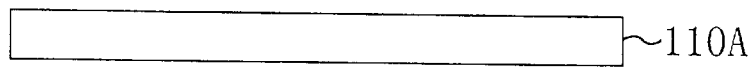
Figure 12C:

First, first and second electrode interconnections 151 and 152 and first and second top electrode pads 153 and 154 are formed on a silicon substrate 110A such as that shown in the plan view of FIG. 12(a) and the side view of FIG. 12(b). And a first concave groove 113 is formed in the optical fiber end supporting region and the optical signal receiving region of the silicon substrate 110A. Thereafter, as shown in FIG. 12(c), part of the silicon substrate 110A corresponding to the optical signal receiving region is removed with a dicing saw and a notch portion 116 is formed on the right-hand side of the optical signal transmitting region of the silicon substrate 110A. As a result, a first base 110 can be made of the silicon substrate 110A.

Figure 12D:
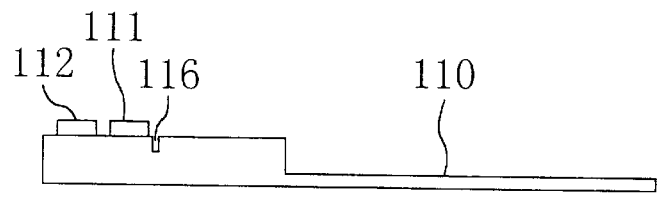
Figure 12E:
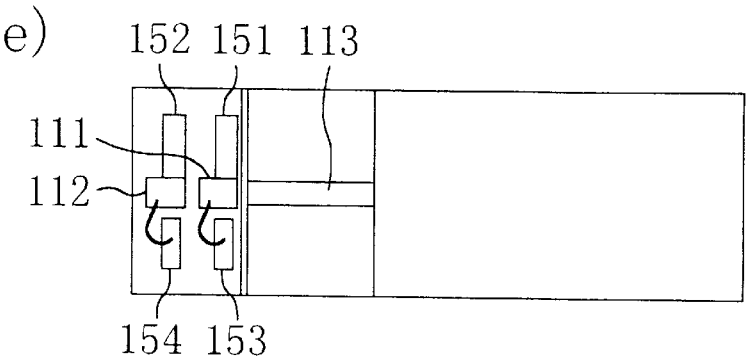

Next, as shown in FIG. 12(d), a semiconductor laser device 111 and a monitoring light-receiving device 112 are mounted on the first and second electrode interconnections 151 and 152, respectively. Thereafter, the top electrode of the semiconductor laser device 111 is wire-bonded with the first top electrode pad 153 and the top electrode of the monitoring light-receiving device 112 is wire-bonded with the second top electrode pad 154.

Figure 13A:
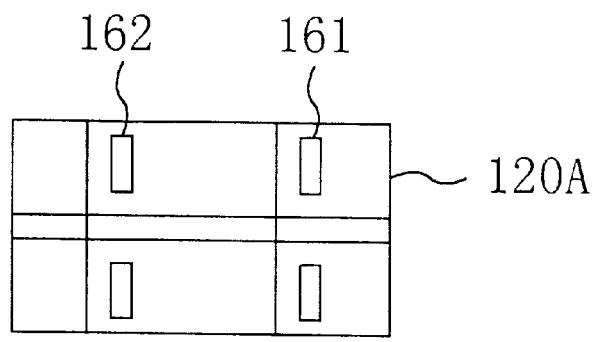
FIGS. 13(a) through 13(d) illustrate the respective process steps for fabricating the optical transmitter/receiver apparatus of the first embodiment.
Figure 13B:
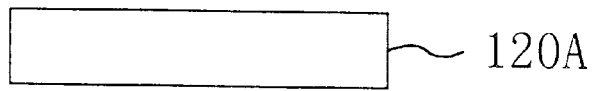
Figure 13C:
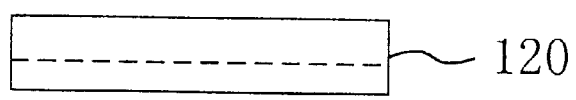
Figure 13D:
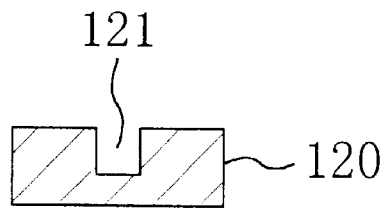

Subsequently, first and second electrode pads 161 and 162 for signal reception are formed on a GaAs substrate 120A such as that shown in the plan view of FIG. 13(a) and in the side view of FIG. 13(b). And marking lines are drawn in the regions where a third concave groove 121, a first cut recess 122 and a second cut recess 123 are to be formed. Thereafter, the third concave groove 121 is formed with a dicing saw as shown in FIGS. 13(c) and 13(d). A second base 120 is obtained in this manner.

Figure 14A:
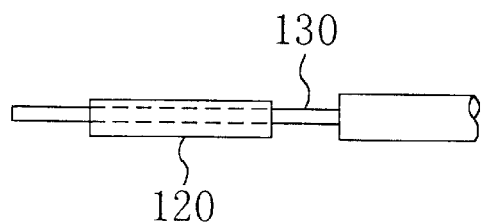
FIGS. 14(a) through 14(e) are side views illustrating the respective process steps for fabricating the optical transmitter/receiver apparatus of the first embodiment.
Figure 14B:
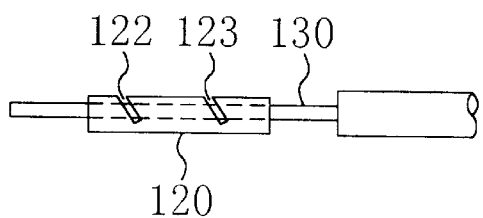
Figure 14C:
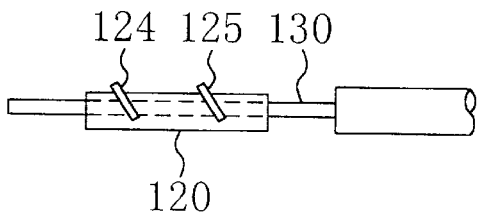

Next, as shown in FIG. 14(a), the optical fiber 130 is installed into the third concave groove 121 of the second base 120 and secured thereto with a resin. Then, as shown in FIG. 14(b), the first cut recess 122 and the second cut recess 123 are formed through the second base 120 and the optical fiber 130 with a dicing saw. Thereafter, as shown in FIG. 14(c), a half mirror 124 and a WDM filter 125 are inserted into the first cut recess 122 and the second cut recess 123, respectively, and secured thereto with a resin having a matched refractive index.

Figure 14D:
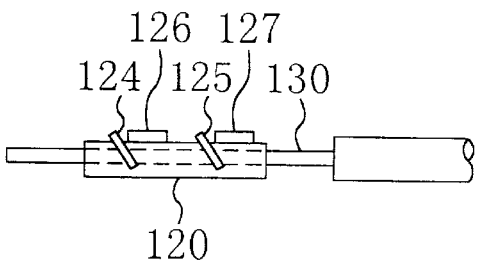
Figure 14E:
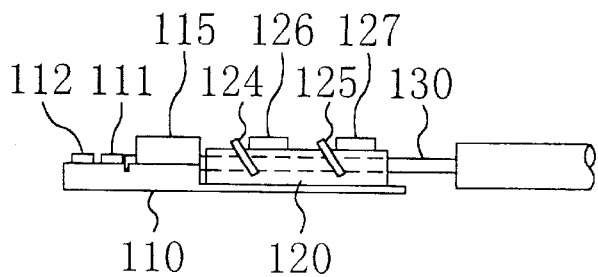

Then, as shown in FIG. 14(d), first and second light-receiving devices 126 and 127 are mounted on the second base 120. Subsequently, as shown in FIG. 14(e), the second base 120 is secured to a predetermined region on the first base 110. Thereafter, a fiber-pressing member 115 is secured to the optical fiber end supporting region of the first base 110, thereby supporting the incident portion of the optical fiber 130.

Figure 15A:
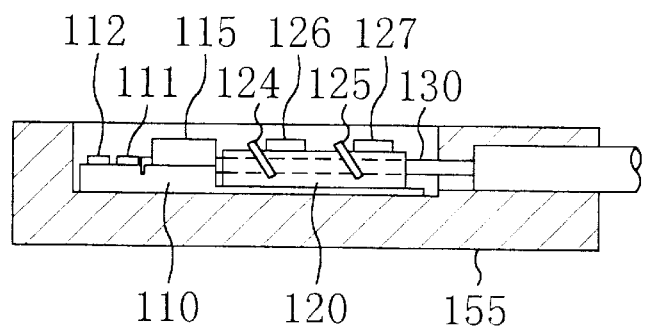
FIGS. 15(a) through 15(c) illustrate the respective process steps for fabricating the optical transmitter/receiver apparatus of the first embodiment.
Figure 15B:
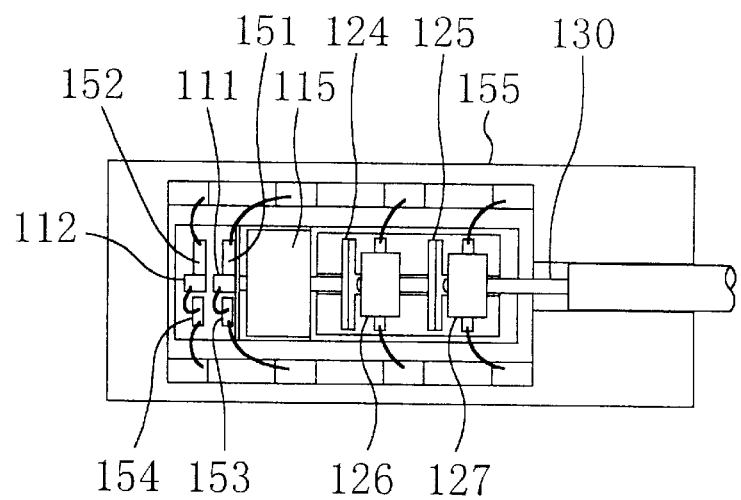

Next, as shown in FIG. 15(a), the first base 110 is secured onto a package 155 via silver paste or the like having excellent thermal conductivity and a jacket (or an MU ferrule) 131 for the optical fiber 130 is secured to the package 155 with a resin. Thereafter, as shown in FIG. 15(b), the first and second electrode interconnections 151 and 152, the first and second top electrode pads 153 and 154, and the first and second electrode pads 161 and 162 for signal reception are wire-bonded with the respective electrode pads formed in the package 155.

Figure 15C:
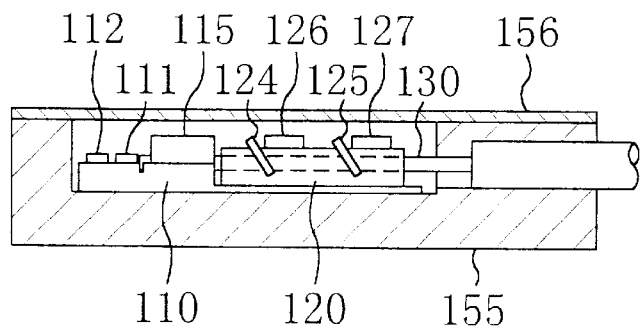

Finally, as shown in FIG. 15(c), a cap 156 is secured to the package 155 and sealed simply, thereby obtaining an optical transmitter/receiver apparatus.

Embodiment 6

Figure 17:
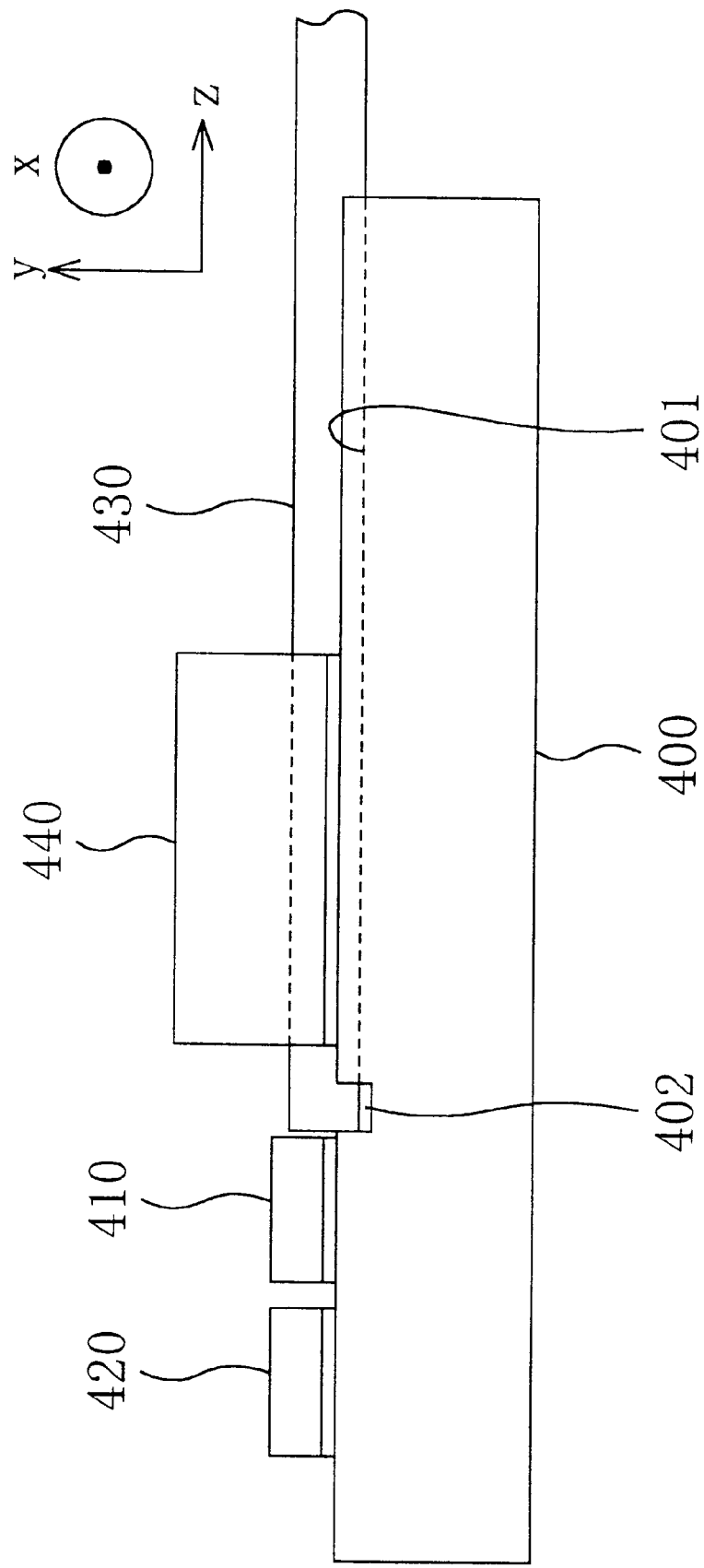
FIG. 17 is a front view of the optical semiconductor module of the sixth embodiment.
Figure 18:
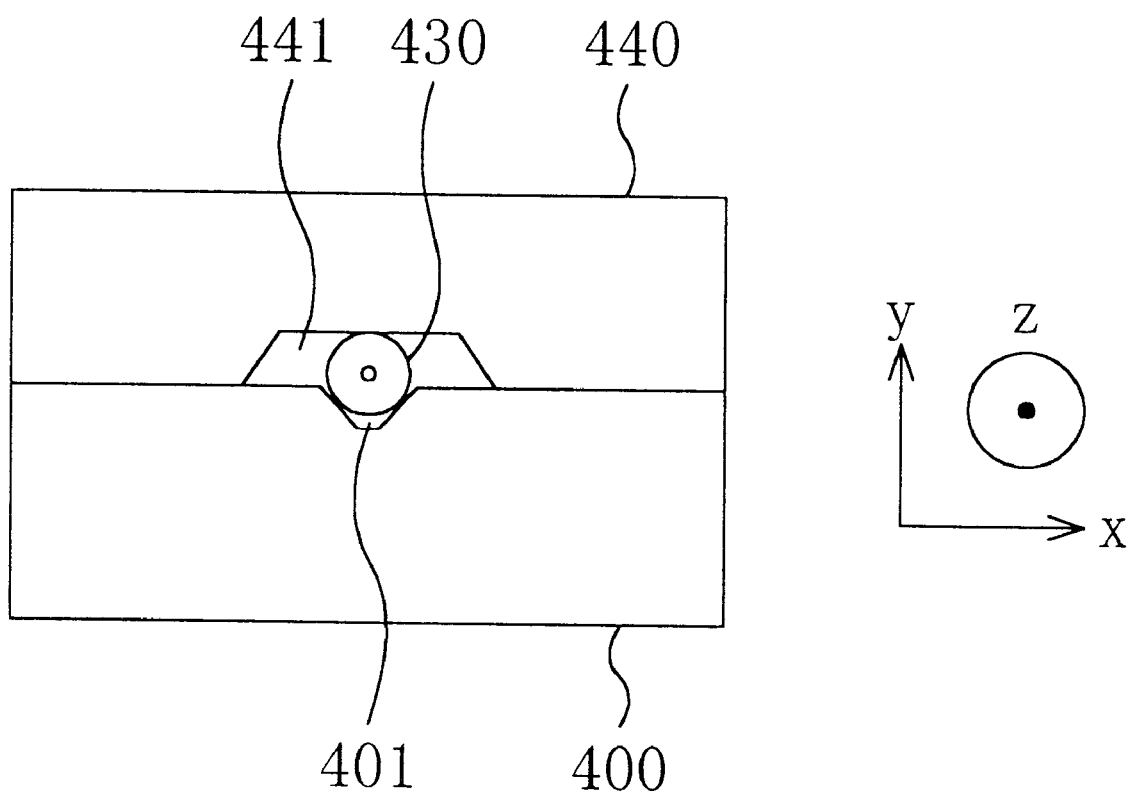
FIG. 18 is a right side view of the optical semiconductor module of the sixth embodiment.

Hereinafter, the structure of an optical semiconductor module of the sixth embodiment will be described with reference to FIGS. 16 to 18.

Figure 16:
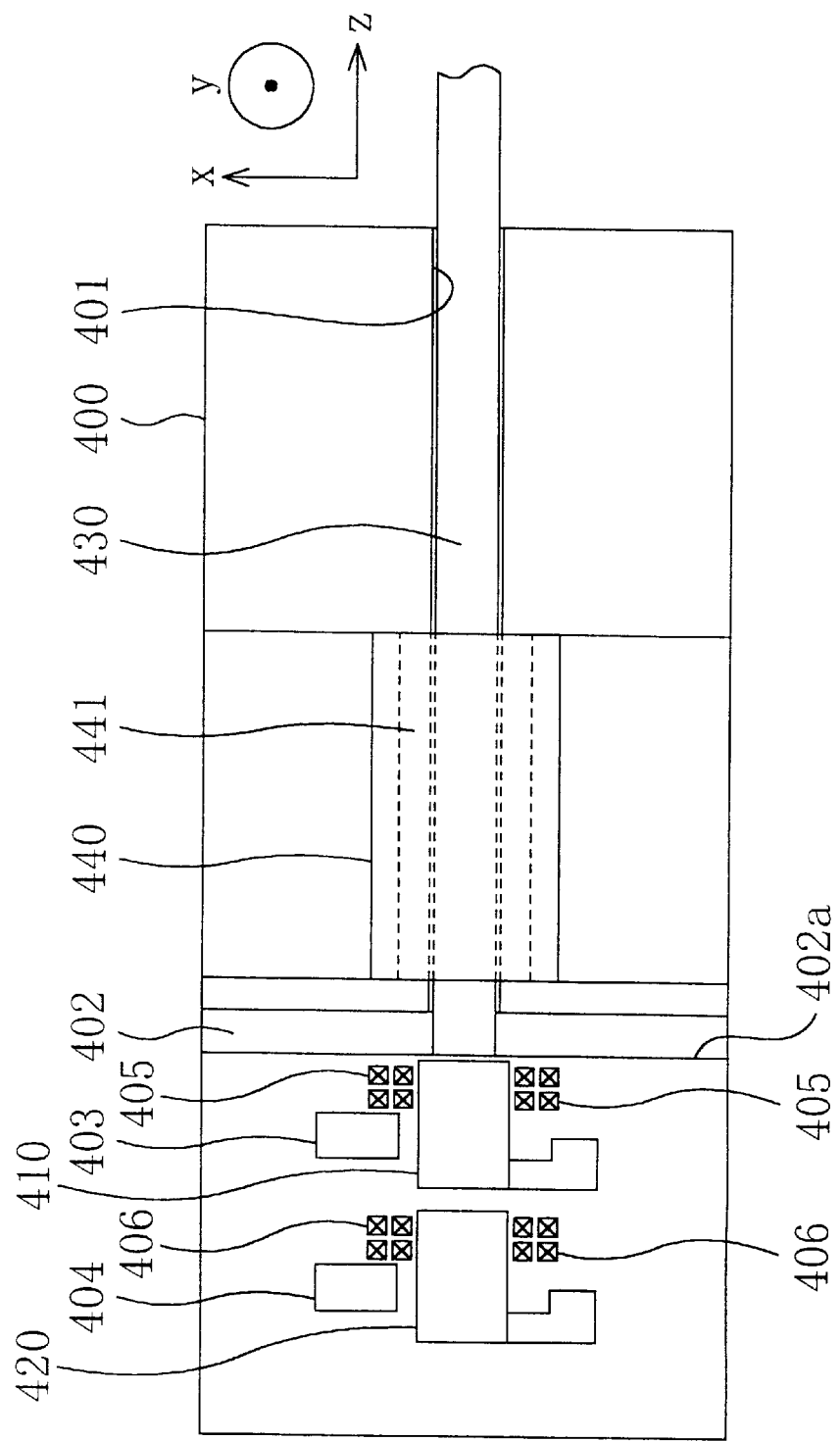
FIG. 16 is a plan view of an optical semiconductor module of the sixth embodiment.

On the left-hand side of a base 400 made of silicon shown in FIG. 16, a semiconductor laser device 410 for emitting laser light on the wavelength band of 1.3 µm, for example, and a monitoring light-receiving device 420 (e.g., a photodiode) for monitoring the intensity of the laser light emitted from the semiconductor laser device 410 are mounted. Preferably, the monitoring light-receiving device 420 is of a waveguide type and exhibits sufficiently high linear light-receiving sensitivity on the wavelength band of the laser light emitted by the semiconductor laser device 410.

A base concave groove 401, having a trapezoidal cross section, is formed by etching in the base 400 so as to extend in the optical axis direction. A cut recess 402 having a rectangular cross section is formed in the base 400 by etching and dicing so as to extend vertically to the optical axis direction. A singlemode optical fiber 430 is installed in the base concave groove 401 with the end face of the optical fiber 430 in contact with a stopper wall face 402a of the cut recess 402.

The mode field diameter of the optical fiber 430 is preferably set at an approximately equal value to the spot diameter of the semiconductor laser device 410 (enabling range is from 1.5 µm to 4.5 µm) so that the laser light emitted from the semiconductor laser device 410 couples at the incident end face of the optical fiber 430 at a high coupling efficiency. Also, the optical fiber 430 preferably has an incident end face subjected to an antireflection treatment in order to sufficiently suppress the influence of an external resonator owing to the light reflected by the semiconductor laser device 410.

A fiber-pressing member 440 for pressing the optical fiber 430 installed in the base concave groove 401 to the base 400 is provided over the center portion of the base 400. A pressing member concave groove 441, the base of which is longer than that of the base concave groove 401, is formed by etching in the fiber-pressing member 440. Thus, the optical fiber 430 is supported at three contact points, i.e., points on both wall faces of the base concave groove 401 and on the bottom of the pressing member concave groove 441. In this case, the fiber-pressing member 440 is secured to the base 400 with a photocurable or thermosetting resin having some shrinkage force. Accordingly, the optical fiber 430 receives the approaching force of the fiber-pressing member 440 toward the base 400 owing to the shrinkage force of the resin and is supported with certainty at the three points on both wall faces of the base concave groove 401 and on the bottom of the pressing member concave groove 441. Thus, the optical axis can be adjusted on the order of 0.5 µm or less through passive alignment in the direction vertical to the surface of the base 400. In addition, since the end face of the optical fiber 430 is in contact with the stopper wall face 402a of the cut recess 402, the distance between the semiconductor laser device 410 and the incident end face of the optical fiber 430 can be regulated.

Also, a laser device interconnection 403 is formed by metal vapor deposition in the vicinity of the region of the base 400 where the semiconductor laser device 410 is mounted, and a light-receiving device interconnection 404 is formed by metal vapor deposition in the vicinity of the region of the base 400 where the monitoring light-receiving device 420 is mounted.

The primary feature of the sixth embodiment lies in that a pair of first base marks 405, each mark consisting of pyramid-shaped holes, for positioning the semiconductor laser device 410 are formed at the respective positions on both sides of the region of the base 400 where the semiconductor laser device 410 is mounted so as to be symmetrical to the optical axis, and that a pair of second base marks 406, each mark consisting of pyramid-shaped holes, for positioning the monitoring light-receiving device 420 are formed at the respective positions on both sides of the region of the base 400 where the monitoring light-receiving device 420 is mounted so as to be symmetrical to the optical axis. These base marks 405 and 406 are formed by using the same photo mask as that used for the base concave groove 401 during the same etching process.

Hereinafter, a method for forming the base concave groove 401, the first base marks 405 and the second base marks 406 by using the same photo mask during the same etching process will be described with reference to FIGS. 19(a) through 19(d). In actuality, the first base marks 405 and the second base marks 406 are not located on neither side along the longitudinal direction of the base concave groove 401. However, in order to simplify the illustration, the method for forming the base concave groove 401 and the base marks will be herein described by assuming that one of the first base marks 405 and the second base marks 406 is located in the vicinity of the base concave groove 401 in FIGS. 19(a) through 19(d).

Figure 19A:
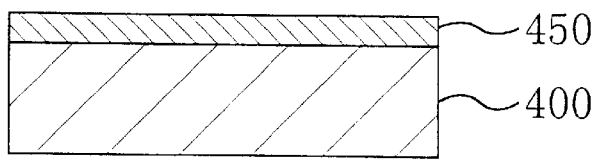
FIGS. 19(a) through 19(d) illustrate the steps of forming a base concave groove and first to third base marks in the method for fabricating the optical semiconductor module of the sixth embodiment.
Figure 19B:
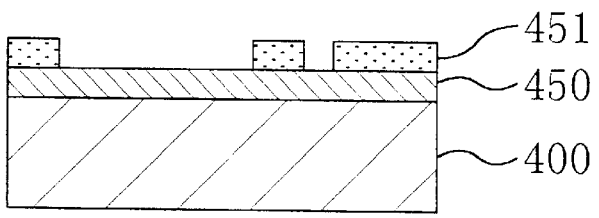

First, as shown in FIG. 19(a), an SiO₂ film 450 is deposited over the entire surface of the base 400 made of silicon. Then, as shown in FIG. 19(b), a resist pattern 451, having openings in the respective regions where the base concave groove 401 and the base mark are to be formed, is formed on the SiO₂ film 450.

Figure 19C:
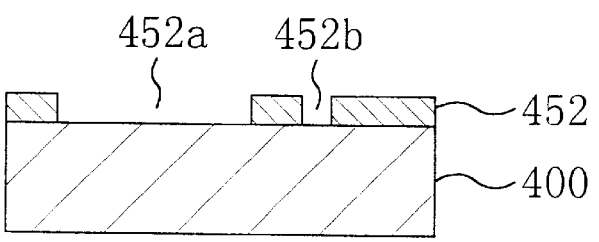

Next, as shown in FIG. 19(c), the SiO₂ film 450 is etched by using the resist pattern 451 as a mask, thereby forming a mask 452, made of the SiO₂ film 450, having a groove opening 452a in the region where the base concave groove 401 is to be formed and a mark opening 452b in the region where the base mark is to be formed. Then, the resist pattern 451 is removed.

Figure 19D:
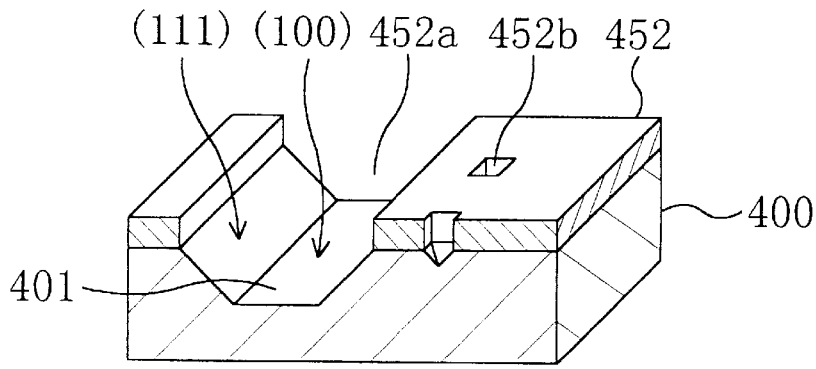

Subsequently, as shown in FIG. 19(d), the base 400 is subjected to crystal anisotropic etching using the mask 452 and a KOH group etchant. In this case, in order to accurately form the base concave groove 401 having a trapezoidal cross section, the position of the mask 452 is adjusted on the (100) plane of the base 400 made of silicon such that the longitudinal direction of the groove opening 452a of the mask 452 becomes horizontal or vertical to the <110> direction of the base 400. Then, the etching rate of the (111) plane, which is the wall face of the base concave groove 401 and the base mark becomes about 1/100 of the etching rate of the (100) plane, which is the bottom face thereof. Thus, when the (111) plane is exposed during etching, etching substantially stops. Accordingly, even if the base 400 is etched to simultaneously form the base concave groove 401 and the base mark from the groove opening 452a and the mark opening 452b of the mask 452 having mutually different sizes, a pattern can be formed accurately. That is to say, the base concave groove 401 extending longitudinally in the optical axis direction and pyramid shaped base mark can be simultaneously formed by etching. In this case, if the width size of the groove opening 452a of the mask 452 is set at an appropriate value and etching is stopped when the depth of the base concave groove 401 reaches a desired value, then the base concave groove 401 can have a desired trapezoidal shape. Although some part of the base 400 underlying the mask 452 is over-etched to a certain degree, a very fine and accurate pattern can be formed by controlling the width size of the groove opening 452a of the mask 452 and the etching time.

According to the primary feature of the sixth embodiment, the first base marks 405 for positioning the semiconductor laser device 410 and the second base marks 406 for positioning the monitoring light-receiving device 420 can be formed by using the same photo mask as that used for the base concave groove 401 during the same etching process. Thus, no positional misalignment occurs between the first and second base marks 405 and 406 and the base concave groove 401. As a result, the semiconductor laser device 410 and the monitoring light-receiving device 420 can be mounted with an optical axis deviation of only 1 $\mu$m or less with respect to the base concave groove 401.

In addition, since the first and second base marks 405 and 406 are formed by etching, the edges thereof are sharper than these of the marks formed by metal vapor deposition. Thus, these marks can form an excellent pattern for recognizing an image.

Moreover, since the first and second base marks 405 and 406 are formed by using the same photo mask as that used for the base concave groove 401 during the same etching process, no extra process is especially required for forming these marks and this embodiment is also cost effective.

In the case of forming the first and second base marks 405 and 406 so as to have a width size of about 1 to 2 $\mu$m or a size of 1 $\mu$m or less, a desired pattern cannot be obtained through etching only by setting the width size of the mark openings 452a of the mask 452 at about 1 to 2 $\mu$m or 1 $\mu$m or less. The reasons are as follows. Even when the line widths of the first and second base marks 405 and 406 are designed at about 1 to 2 $\mu$m or 1 $\mu$m or less, the first and second base marks 405 and 406 are likely to be over-etched during etching the base concave groove 401, because the width size of the base concave groove 401 is as large as about 400 to 200 $\mu$m. As a result, the line widths of the first and second base marks 405 and 406 become larger than the widths of the mark openings 452b of the mask 452 by several $\mu$m.

Furthermore, if the width of the mark openings 452b of the mask 452 is set at 5 $\mu$m or less, the mark openings 452b are possibly clogged with bubbles generated during etching. Since some regions are etched but others are not because of this phenomenon, the resulting pattern is sometimes deformed. Thus, it is extremely difficult to form the first and second base marks 405 and 406 with a width size of 5 $\mu$m or less by etching.

Figure 20A:
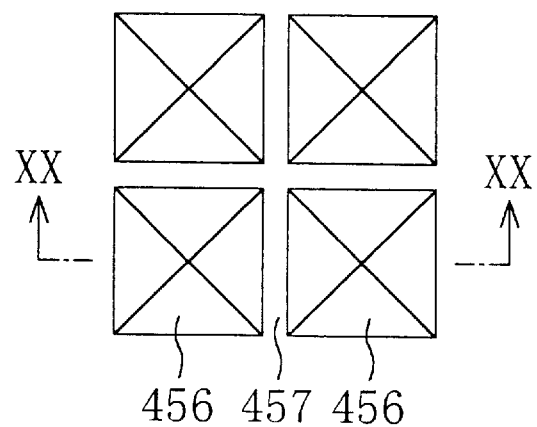
FIGS. 20(a) through 20(c) illustrate V-shaped grooves and pyramid shaped pit serving as the first to third base marks in the optical semiconductor module of the sixth embodiment.
Figure 20B:
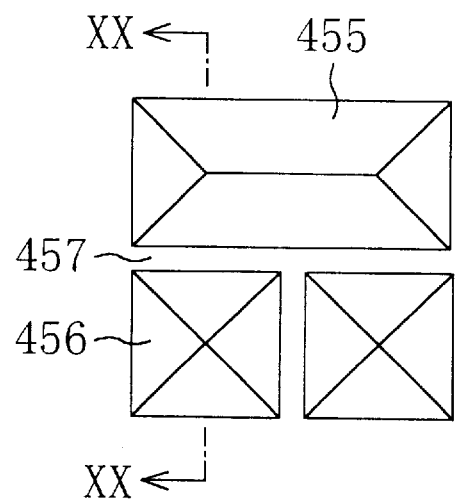
Figure 20C:
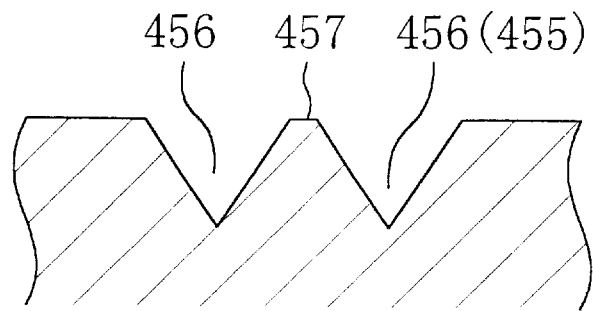
Figure 21:
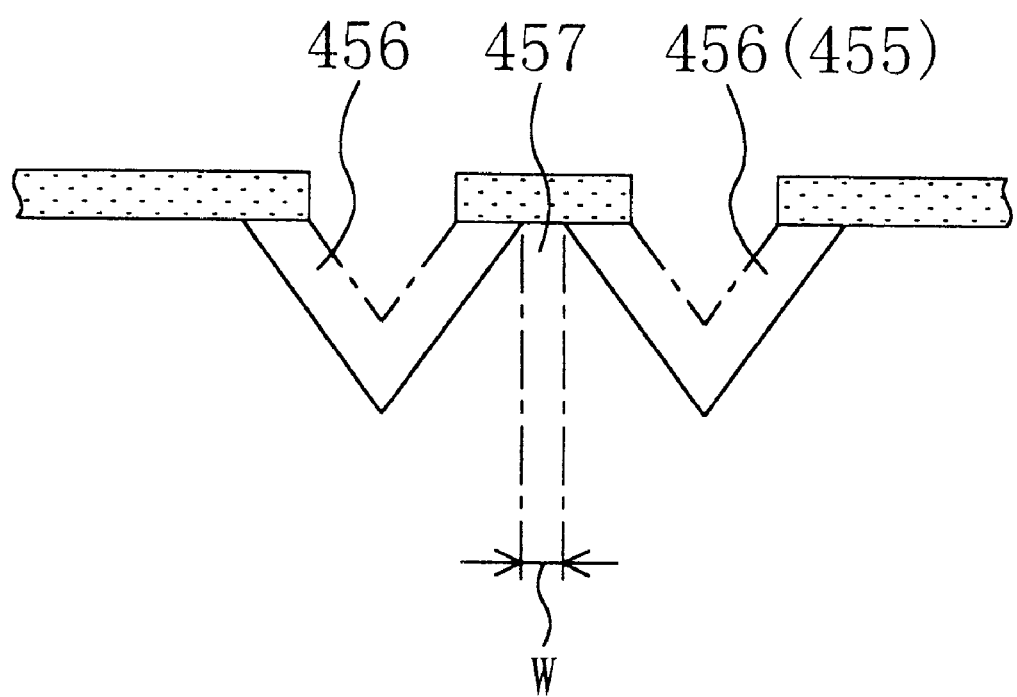
FIG. 21 is a cross-sectional view illustrating how the V-shaped grooves and pyramid shaped pit serving as the first to third base marks are formed in the optical semiconductor module of the sixth embodiment.

Thus, as shown in FIGS. 20(a) through 20(c), the first and second base marks 405 and 406 can be formed by forming a plurality of V-shaped grooves 455 or pyramid-shaped pits 456 so that these grooves and pits are adjacent to each other and by using the non-etched regions 457 between these V-shaped grooves 455 and pyramid-shaped pits 456. It is noted that FIG. 20(c) is a cross-sectional view taken along the line XX—XX of FIGS. 20(a) and 20(b). In this case, by utilizing over-etching as shown in FIG. 21, a mark pattern can be easily formed of the non-etched region 457 having a width w of about 1 to about 2 $\mu$m. Also, if the amount of over-etching is controlled precisely, a mark pattern having a width of 1 $\mu$m or less can be formed.

Figure 22:
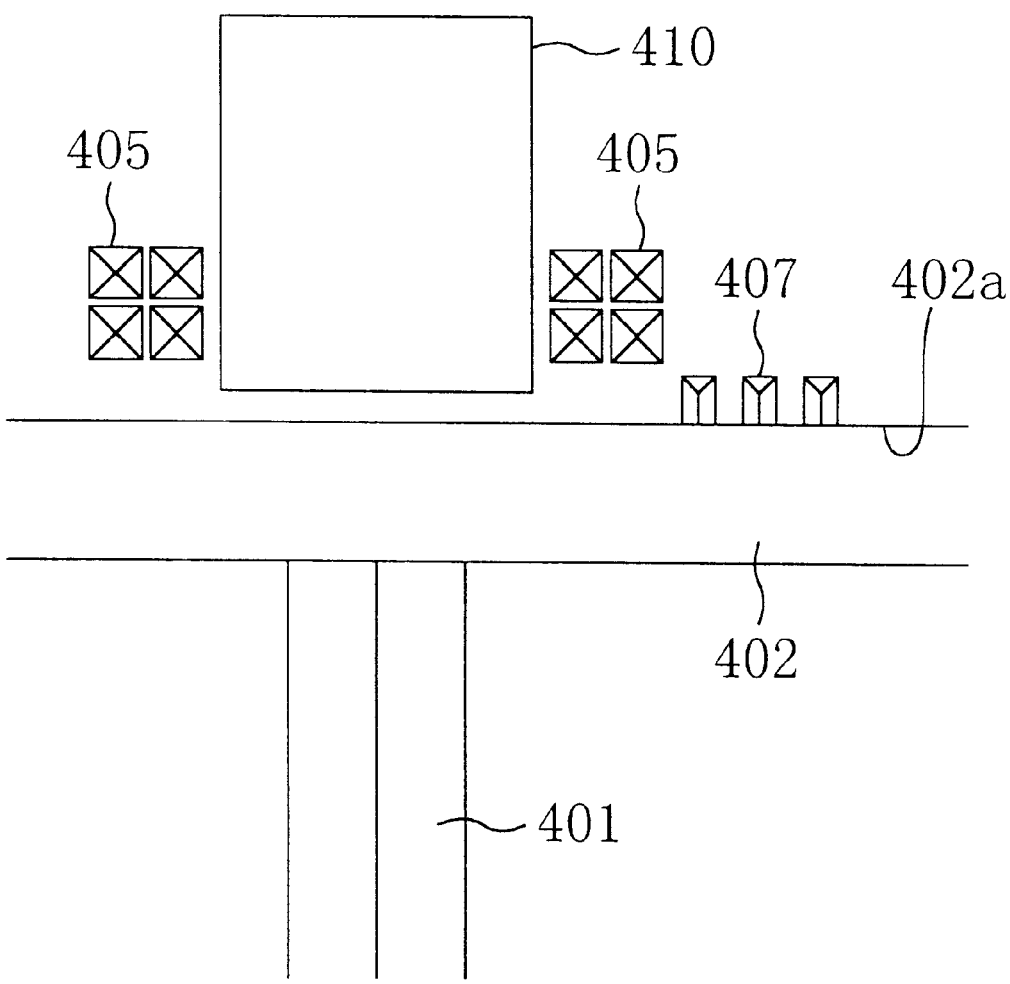
FIG. 22 is a plan view illustrating part of the optical semiconductor module of the sixth embodiment.
Figure 23:
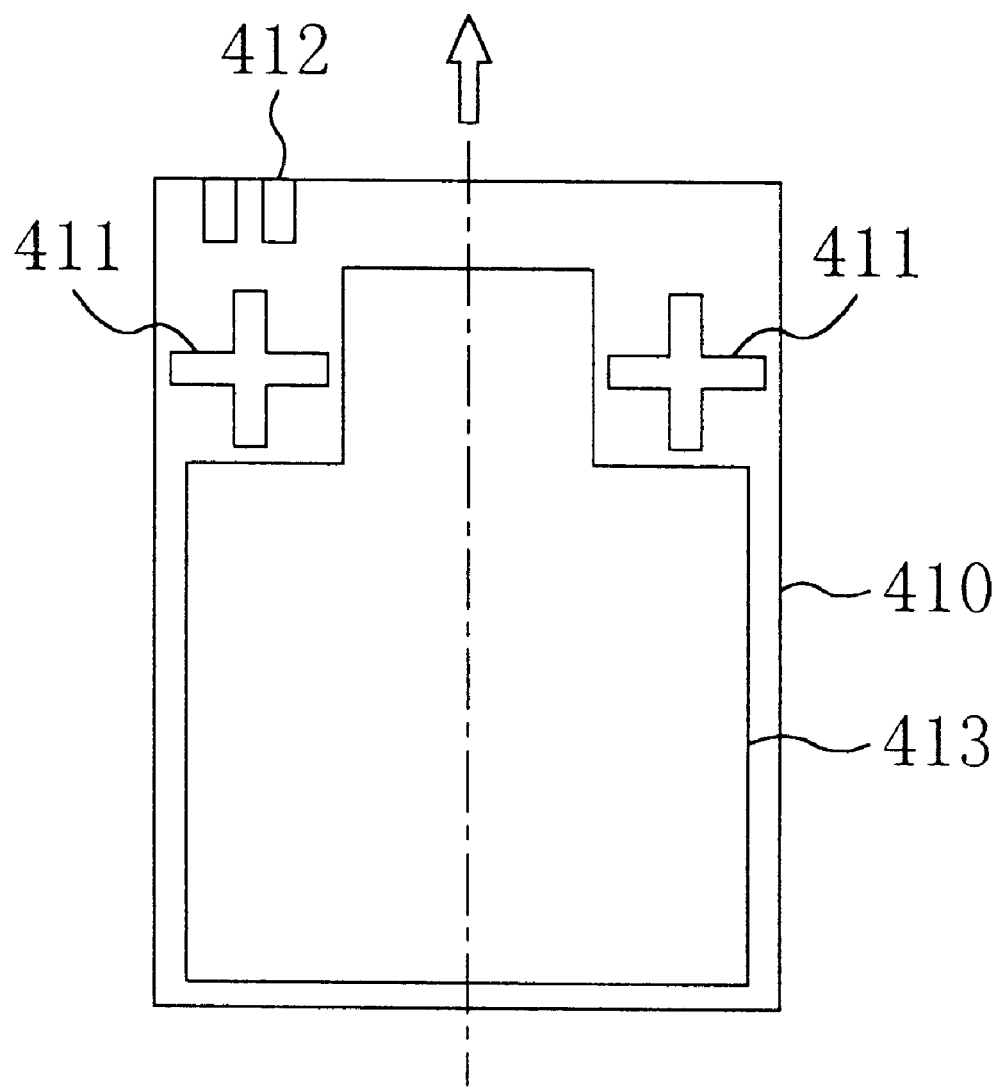
FIG. 23 is a bottom view of the semiconductor laser device in the optical semiconductor module of the sixth embodiment.

The second feature of the sixth embodiment lies in that a third base mark 407 for positioning the semiconductor laser device 410 in the optical axis direction is formed in the edge portion of the stopper wall face 402a of the cut recess 402 of the base 400 as shown in FIG. 22. The second feature of the sixth embodiment also lies in that a pair of cross-shaped first laser marks 411 are formed on both sides of an active region (indicated by the one-dot-chain) on the reverse surface of the semiconductor laser device 410 at the positions symmetric to the active region, and a second laser mark 412 is further formed in an edge portion on the reverse surface of the semiconductor laser device 410 closer to the laser light emission end face as shown in FIG. 23. In FIG. 23, the reference numeral 413 denotes a metal electrode formed on the reverse surface of the semiconductor laser device 410.

Figure 24:
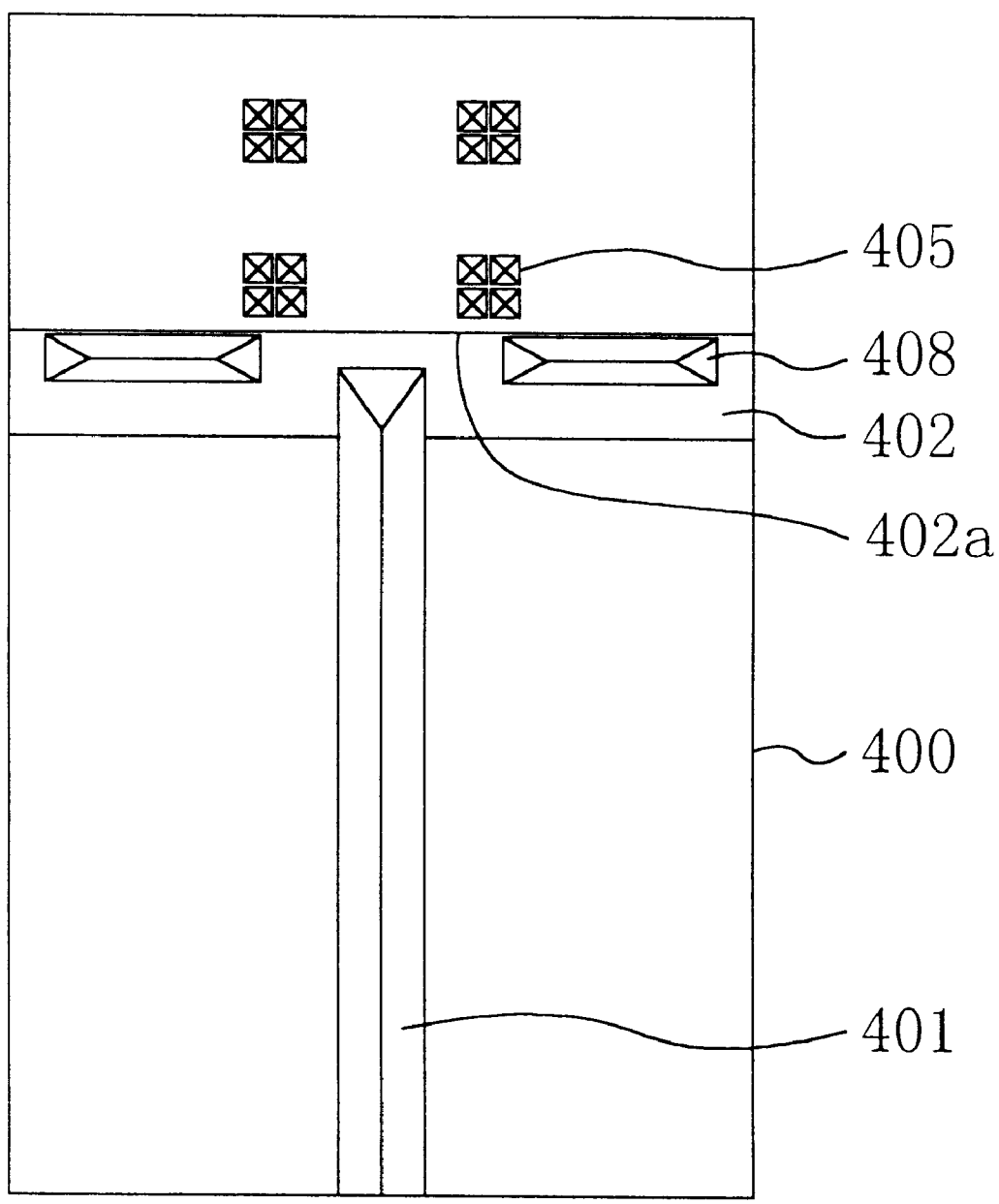
FIG. 24 is a plan view of the base in the optical semiconductor module of the sixth embodiment.

Since the third base mark 407 for positioning the semiconductor laser device 410 in the optical axis direction is formed in the edge portion of the stopper wall face 402a of the cut recess 402 of the base 400, the cut recess 402 needs to be diced with high accuracy with respect to the position of the semiconductor laser device 410 in the optical axis direction. Thus, as shown in FIG. 24, groove forming marks 408 are formed in the edge portion on the bottom of the cut recess 402 of the base 400 closer to the stopper wall face 402a.

Embodiment 7

Hereinafter, a process step of mounting the semiconductor laser device 410 onto the base 400 in the method for fabricating the optical semiconductor module of the sixth embodiment will be described as the seventh embodiment with reference to FIGS. 25 to 27.

Figure 25:
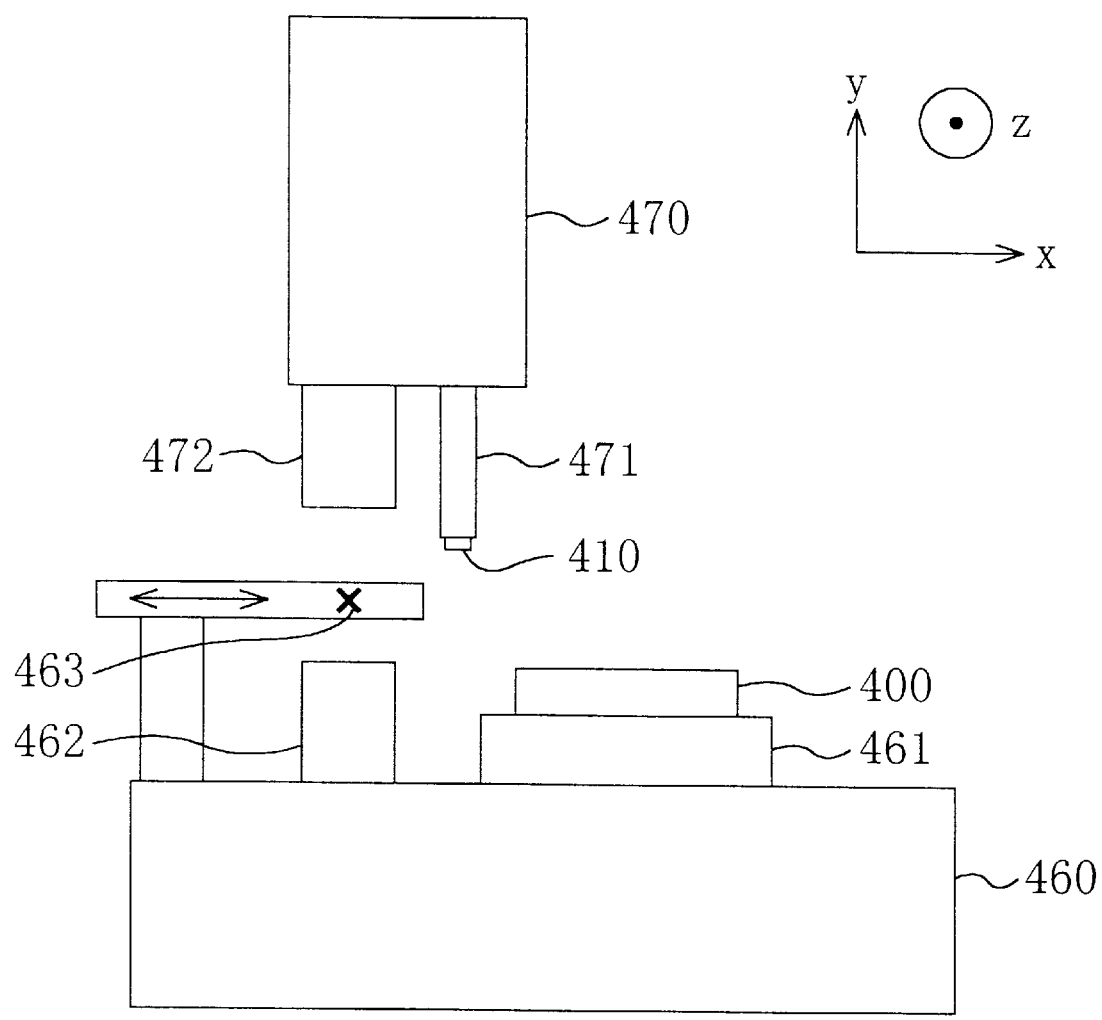
FIG. 25 is a schematic representation of a mounting apparatus used in a method for fabricating an optical semiconductor module in the seventh embodiment.

FIG. 25 is a schematic representation of a mounting apparatus for mounting the semiconductor laser device 410 onto the base 400. A lower stage 460 is movable in any of the X-axis, Y-axis and Z-axis directions. On the lower stage 460, a substrate heater 461 for supporting the base 400 and for heating the base 400 supported thereon, a lower CCD camera 462 having a coaxial white light source and a stage calibration marker 463 are provided. An upper stage 470 movable in the Y-axis direction is disposed above the lower stage 460. On the upper stage 470, a securing tool 471 for supporting the semiconductor laser device 410 and for securing the supported semiconductor laser device 410 to the base 400, and an upper CCD camera 472 having a coaxial white light source are provided. The stage calibration marker 463 is provided for calibrating the relative positions (i.e., matching the positions of the origins) of the lower stage 460 and the upper stage 470.

FIG. 26 is a schematic representation illustrating the process step of mounting the semiconductor laser device 410 onto the base 400. In FIG. 26, the reference numeral 464 denotes a lower monitor for displaying an image recognized by the lower CCD camera 462 thereon. 474 denotes an upper monitor for displaying an image recognized by the upper CCD camera 472 thereon. 480 denotes a controller for receiving the images recognized by the lower CCD camera 462 and the upper CCD camera 472 as inputs and thereby driving the lower and upper stages 460 and 470.

Also, the stage calibration marker 463 is observed by the lower and upper CCD cameras 462 and 472 simultaneously, thereby recognizing the relative positions of the lower and upper stages 460 and 470.

Next, the lower CCD camera 462 recognizes the pair of first laser marks 411 and the second laser mark 412 of the semiconductor laser device 410 as images, thereby obtaining and storing the information about the position of the semiconductor laser device 410 in the X-axis direction, the position of the laser device in the Z-axis direction and the offset angle $\theta$ with respect to the X-axis.

Hereinafter, it will be described how the lower CCD camera 462 recognizes the pair of first laser marks 411 and the second laser mark 412 of the semiconductor laser device 410 as images to obtain the information about the position of the semiconductor laser device 410 in the X-axis direction, the position of the laser device in the Z-axis direction and the offset angle θ with respect to the-X axis with reference to FIG. 23 and FIGS. 25 through 27.

Figure 27A:
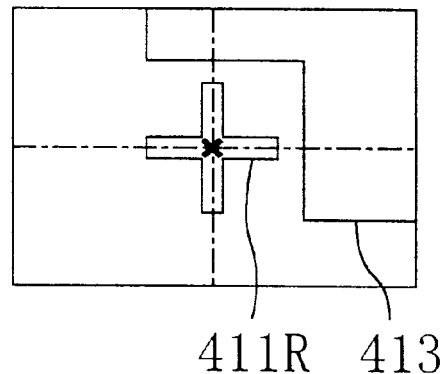
FIGS. 27(a) through 27(c) are partial plan views of the semiconductor laser device illustrating how the semiconductor laser device is aligned with the base in the method for fabricating the optical semiconductor module in the seventh embodiment.
Figure 27B:
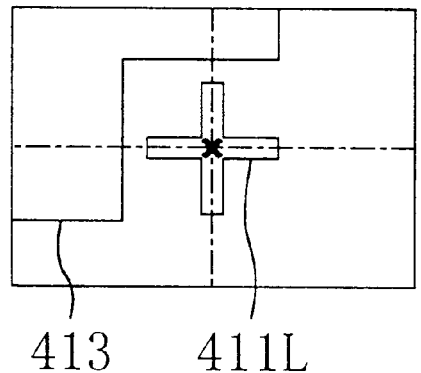

First, as shown in FIG. 27(a), the center of the right laser mark 411R of the pair of first laser marks 411 is recognized and stored as an image and then the lower stage 460 is moved. Next, as shown in FIG. 27(b), the center of the left laser mark 411L of the pair of first laser marks 411 is recognized and stored as an image.

Then, the position of the semiconductor laser device 410 in the X-axis direction and the offset angle θ with respect to the X-axis are recognized based on the positions of the centers of the right and left laser marks 411R and 411L, and the X coordinate of the semiconductor laser device 410 on the X-Z plane and the offset angle θ with respect to the X-axis are stored.

Figure 27C:
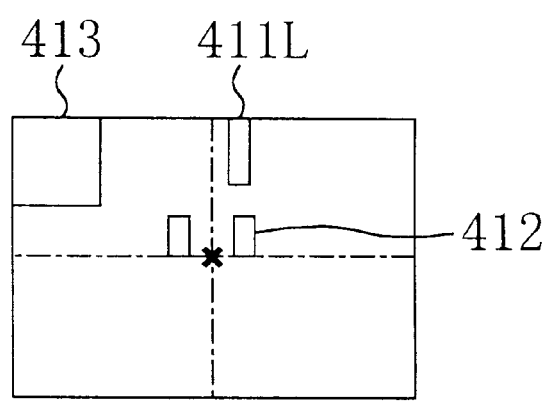

Subsequently, the lower stage 460 is moved and the center of the second laser mark 412 is recognized as an image as shown in FIG. 27(c) and the Z coordinate of the semiconductor laser device 410 on the X-Z plane is stored.

Next, the upper CCD camera 472 recognizes the first base marks 405 and the third base marks 407 of the base 400 as images, thereby obtaining the information about the position of the base 400 in the X-axis direction, the position thereof in the Z-axis direction and the offset angle θ with respect to the X-axis in the same way.

Then, the controller 480 rotates the lower stage 460 such that the offset angle θ of the base 400 with respect to the X-axis becomes equal to the offset angle θ of the semiconductor laser device 400 with respect to the X-axis. Thereafter, the controller 480 moves the lower stage 460 in the X-axis and Z-axis directions such that the X and Z coordinates of the semiconductor laser device 410 become equal to those of the base 400.

Finally, the controller 480 moves the upper stage 470 in the Y-axis direction such that the Y coordinate of the semiconductor laser device 410 becomes equal to that of the base 400, and the securing tool 471 secures the semiconductor laser device 410 to the base 400.

In the seventh embodiment, the stage calibration marker 463 is observed by the lower and upper CCD cameras 462 and 472 simultaneously, and the relative positions of the lower and upper stages 460 and 470 are recognized. Then, the lower CCD camera 462 recognizes the respective marks of the semiconductor laser device 410 and the upper CCD camera 472 recognizes the respective marks of the base 400. Thus, the relative positions of the semiconductor laser device 410 and the base 400 can be determined very precisely. In addition, since the lower CCD camera 462 recognizes the respective marks of the semiconductor laser device 410 and the upper CCD camera 472 recognizes the respective marks of the base 400, a single CCD camera is not required to recognize the respective marks of the semiconductor laser device 410 and the base 400, which are located far away from each other. Thus, the marks of either the semiconductor laser device 410 or the base 400 are not defocused and the resulting images are not blurred.

Thus, in the seventh embodiment, it is possible to mount the semiconductor laser device 410 onto the base 400 while satisfying the precision of 1 μm or less in the direction vertical to the optical axis on the plane parallel to the surface of the base 400 (i.e., the X-axis direction) and the precision of about 1 to about 2 μm in the optical axis direction (i.e., the Z-axis direction). In accordance with conventional methods, the distance between the emission side face of the semiconductor laser device 410 and the incidence end face of the optical fiber 430 is variable to a large degree. However, in this embodiment, since the distance can be controlled precisely, the variation in distance in the optical axis direction can be reduced from several to ten-odd μm (conventional methods) to about 1 μm to about 2 μm.

Moreover, in the seventh embodiment, since the distance between the emission side face of the semiconductor laser device 410 and the incidence end face of the optical fiber 430 can be reduced to about 1 μm to about 2 μm, the laser light emitted from the semiconductor laser device 410 can be coupled to the incidence end face of the optical fiber 430 with high coupling efficiency. The reasons why the laser light emitted from the semiconductor laser device 410 can be coupled to the incidence end face of the optical fiber 430 with high coupling efficiency by shortening the distance between the emission side face of the semiconductor laser device 410 and the incidence end face of the optical fiber 430 will be described later.

Though the description thereof has been omitted herein, the monitoring light-receiving device 420 is also secured to the base 400 in the same way as in the semiconductor laser device 410.

Embodiment 8

Hereinafter, a process step of mounting the optical fiber onto the base in the method for fabricating the optical semiconductor module will be described as the eighth embodiment with reference to FIG. 28 and FIGS. 29(a) and 29(b).

Figure 28:
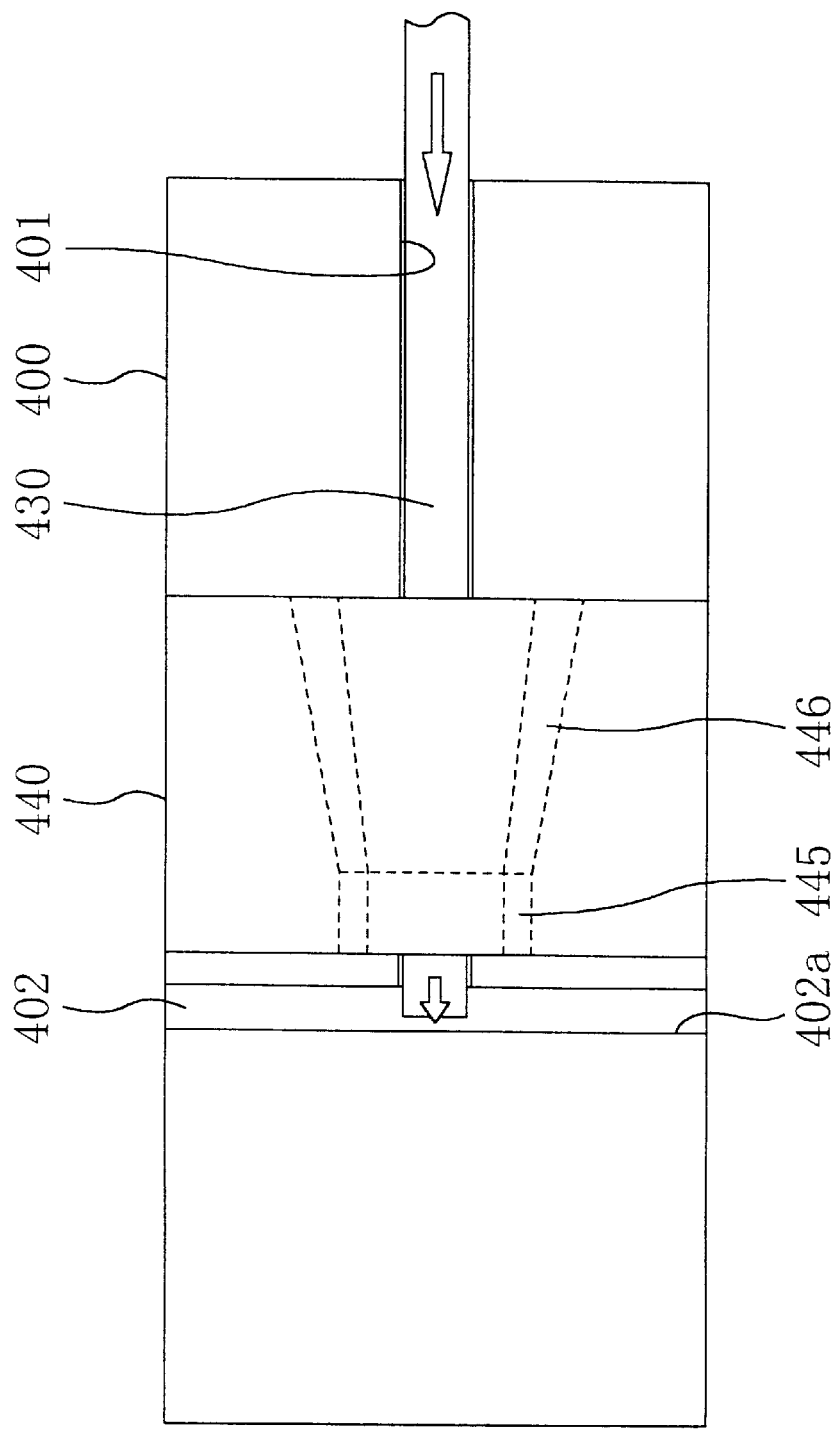
FIG. 28 is a plan view illustrating a step of mounting the optical fiber onto the base in the method for fabricating the optical semiconductor module in the eighth embodiment.
Figure 29A:
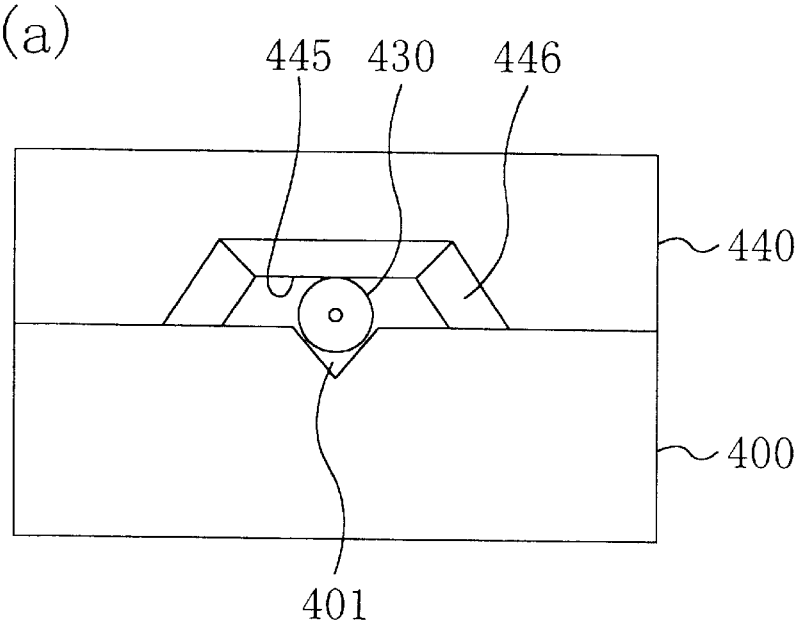
FIGS. 29(a) and 29(b) illustrate a step of mounting the optical fiber onto the bas in the method for fabricating the optical semiconductor module in the eighth embodiment.
Figure 29B:
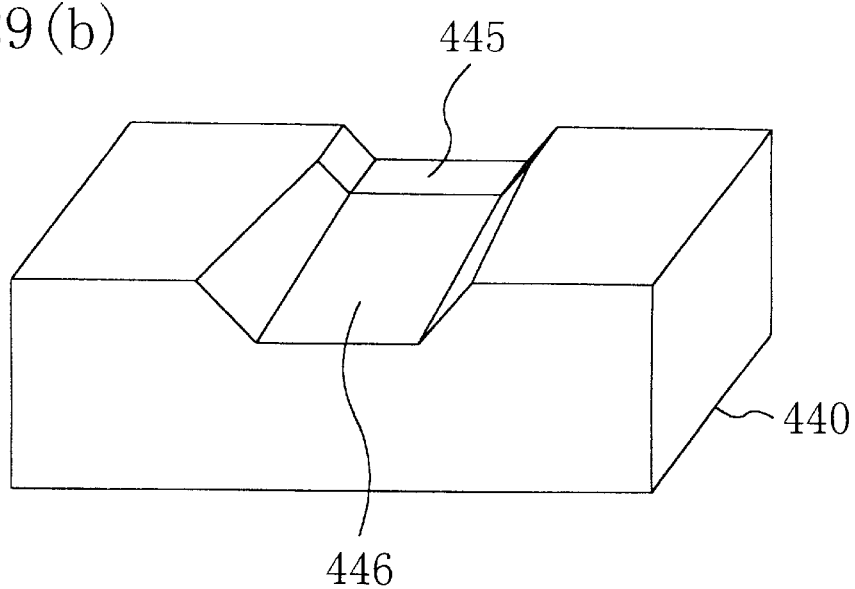

In the same way as in the sixth embodiment, the semiconductor laser device and the monitoring light-receiving device are mounted on the left part of the base 400 shown in FIG. 28, but the illustration thereof is omitted. As shown in FIG. 28 and FIGS. 29(a) and 29(b), a base concave groove 401, having a trapezoidal cross section, is formed by etching in the base 400 so as to extend in the optical axis direction. A cut recess 402 having a rectangular cross section is formed in the base 400 by etching and dicing so as to extend vertically to the optical axis direction. A singlemode optical fiber 430 is installed in the base concave groove 401 with the end face of the optical fiber 430 in contact with the stopper wall face 402a of the cut recess 402. A fiber-pressing member 440 for pressing the optical fiber 430 installed in the base concave groove 401 to the base 400 is provided over the center portion of the base 400.

The eighth embodiment is characterized in that the fiber-pressing member 440 includes: a pressing concave groove 445, having a base longer than that of the base concave groove 401 and a constant cross-sectional area, for pressing the optical fiber 430 to the base 400; and an introducing concave groove 446, which is formed continuously with the pressing concave groove 445 and has a cross-sectional area increasing from left to right in FIG. 28 just like a taper, for introducing the optical fiber 430.

In the eighth embodiment, the end of the optical fiber 430 closer to the laser is inserted into an introducing portion formed by the base concave groove 401 and the introducing concave groove 446 of the fiber-pressing member 440, and pushed toward the laser device to reach a pressing portion formed by the base concave groove 401 and the pressing concave groove 445 of the fiber-pressing member 440. In such a configuration, the optical axis can be adjusted within the precision of 1 μm through passive alignment.

Embodiment 9

Hereinafter, a method for connecting optical fibers with each other will be described as the ninth embodiment.

Figure 30:
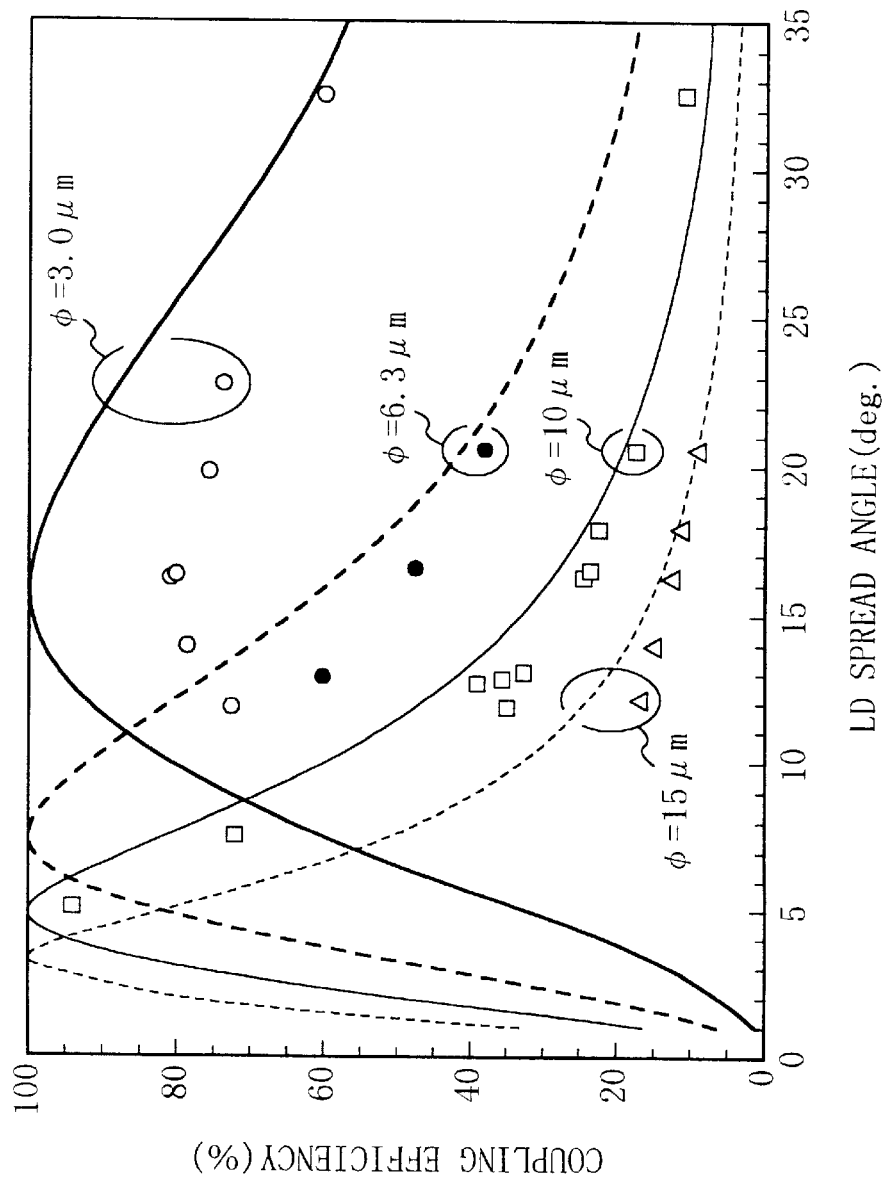
FIG. 30 is a characteristic diagram representing the relationship between the emission angle of the semiconductor laser device and the coupling efficiency of the optical fibers using mode field diameters of the optical fibers as parameters in order to illustrate how the optical fibers are connected to each other in the ninth embodiment.

FIG. 30 illustrates the calculation results (indicated by lines) and experiment results (indicated by points) of the coupling efficiency of a singlemode optical fiber with respect to the emission angle of a semiconductor laser device using the mode field diameter of the singlemode optical fiber as a parameter. When these calculations are performed, the distance between the semiconductor laser device and the optical fiber is assumed to be 0 μm.

As can be understood from FIG. 30, if the mode field diameter φ of the optical fiber used as a parameter is 15 μm, 10μm, 6.3 μm or 3.0 μm, the coupling efficiency of the optical fiber reaches 100% theoretically in the region where the emission angle of the semiconductor laser device is in the range from 0 degrees to 30 degrees, irrespective of the mode field diameter.

This means that very high coupling efficiency, nearly 100%, can be attained by optimizing the emission angle of the semiconductor laser device and the mode field diameter of the optical fiber without using any lens system.

Also, as indicated by the experimental results, if the emission angle of the semiconductor laser device and the mode field diameter of the optical fiber are set at respectively quasi-optimum values in combination, coupling efficiency as high as over 70% can be attained. In this experiment, the coupling efficiency is at most about 70 to about 80%. This is presumably because the mode field pattern of a singlemode optical fiber is almost completely Gaussian, whereas the emission angles of the semiconductor laser device trace a pattern that cannot be called Gaussian.

Figure 31:
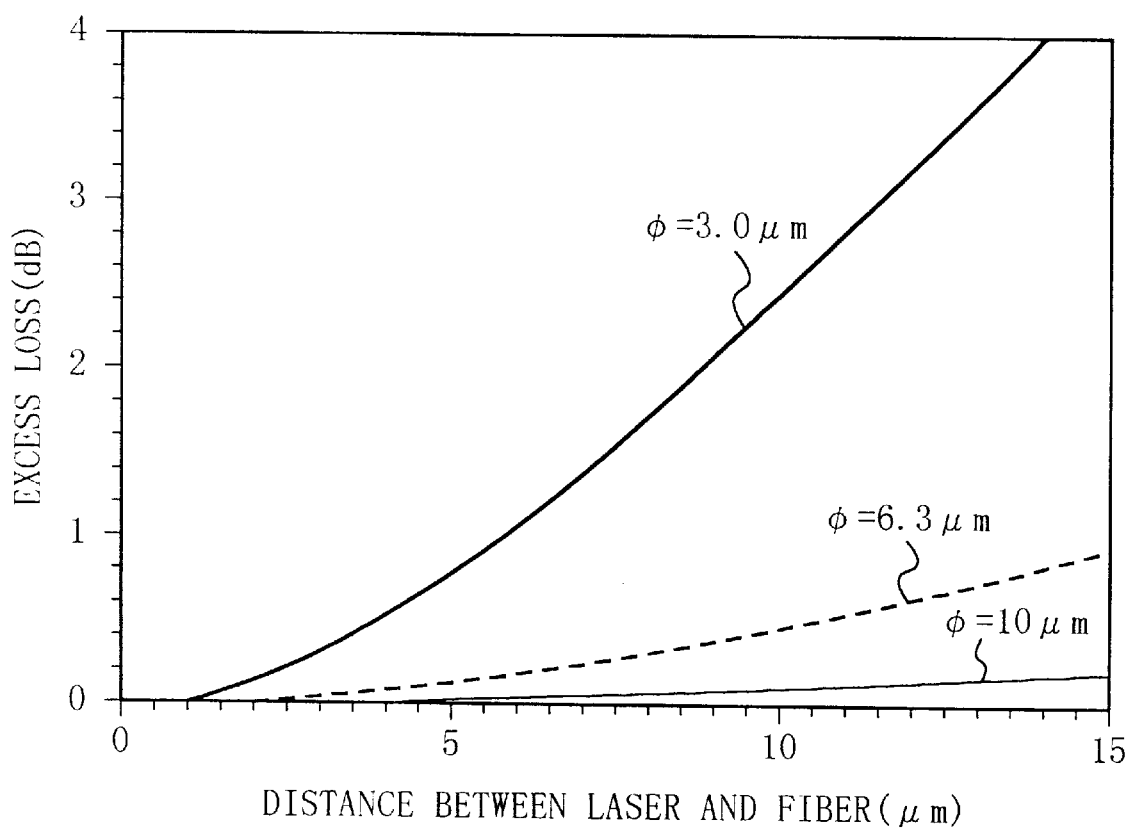
FIG. 31 is a characteristic diagram representing the relationship between the distance from the semiconductor laser device to the optical fiber and the excess loss using mode field diameters of the optical fibers as parameters in order to illustrate how the optical fibers are connected to each other in the ninth embodiment.

FIG. 31 illustrates the calculation results of the excess loss with respect to the distance between the incidence end face of an optical fiber, having a mode field diameter φ of 10 μm, 6.3 μm or 3.0 μm, and the emission side face of the semiconductor laser device having an emission angle of 15 degrees. As can be understood from FIG. 31, even if the distance is the same, the smaller the mode field diameter of the optical fiber is, the more drastically the coupling efficiency decreases.

However, in the vicinity of the domain where the distance in the Z-axis direction is 0 μm, the excess loss of the coupling efficiency is small in any optical fiber. Thus, it can be understood that the shorter the distance between the semiconductor laser device and the optical fiber is, the more drastically the excess loss can be reduced and the higher the coupling efficiency is.

Figure 32:
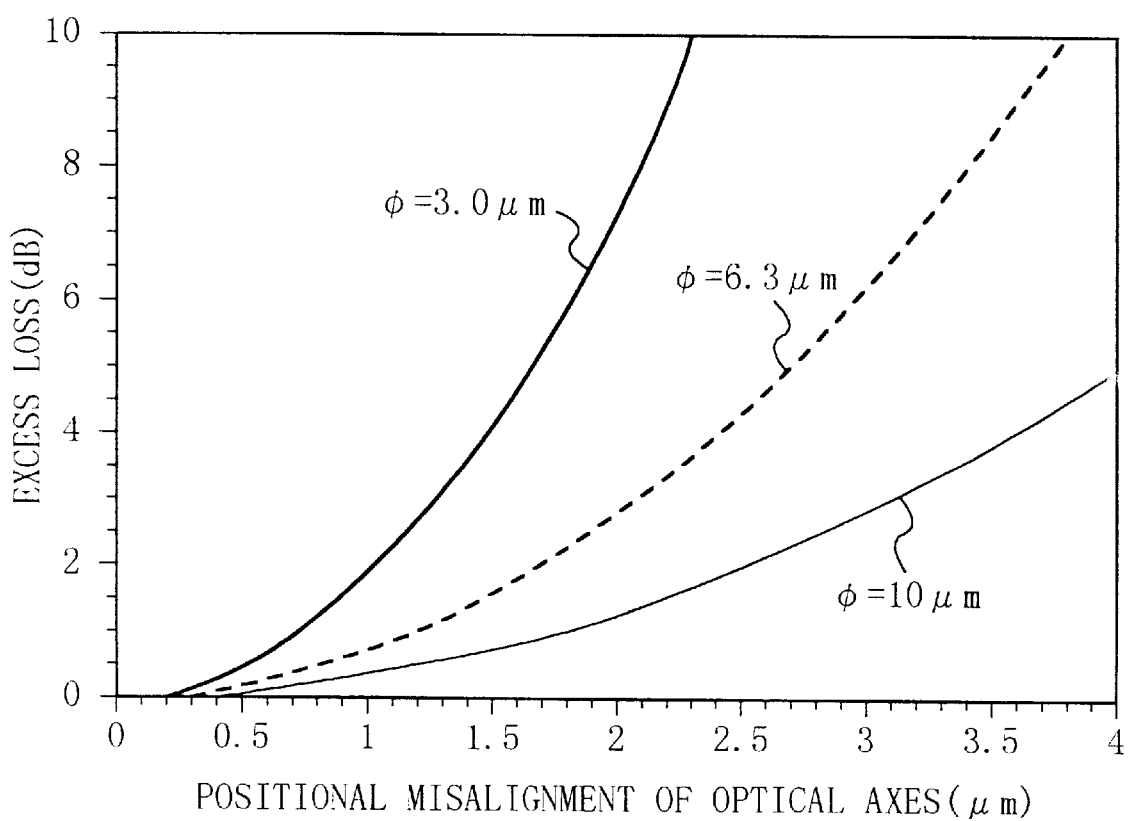
FIG. 32 is a characteristic diagram representing the relationship between the positional misalignment length of the optical axes of the semiconductor laser device and the optical fiber and the excess loss using mode field diameters of the optical fibers as parameters in order to illustrate how the optical fibers are connected to each other in the ninth embodiment.

FIG. 32 illustrates the relationship between the positional misalignment of the optical axes of the semiconductor laser device and a singlemode optical fiber, having a mode field diameter φ of 10 μm, 6.3 μm or 3.0 μm, and the excess loss.

In the sixth and seventh embodiments, the positioning accuracy between the semiconductor laser device and the optical fiber in the directions vertical to the optical axis (i.e., the X- and Y-axis directions) is about 0.8 μm on average, while the positioning accuracy between the semiconductor laser device and the optical fiber in the optical axis direction (i.e., the Z-axis direction) is about 1.5 μm on average. Thus, if the mode field diameter φ of the optical fiber is 6.3 μm, the coupling loss resulting from the positional misalignment can be suppressed to 2.0 dB or less. On the other hand, if the mode field diameter φ of the optical fiber is 3.0 μm, the coupling loss resulting from the positional misalignment can be suppressed to 2.0 dB or less.

First, assume a case where a semiconductor laser device having an emission angle of 15 degrees is used and the positional misalignment between the semiconductor laser device and the optical fiber is zero. Then, if the mode field diameter φ of the optical fiber is 6.3 μm, the coupling efficiency between the semiconductor laser device and the optical fiber is superior to the case where the mode field diameter φ of the optical fiber is 10 μm by about 3 dB.

Thus, if the sum of the coupling loss and the connection loss is equal to or smaller than 1.5 dB, some superiority is supposedly attained. In the sixth and seventh embodiments, if the mode field diameter φ of the optical fiber is 6.3 μm, the coupling loss resulting from the positional misalignment can be suppressed to 0.8 dB. Thus, if the connection loss of the fiber is suppressed to 0.7 dB or less, then some superiority can be attained.

Next, also assume a case where a semiconductor laser device having an emission angle of 15 degrees is used and the positional misalignment between the semiconductor laser device and the optical fiber is zero. Then, if the mode field diameter φ of the optical fiber is 3.0 μm, the coupling efficiency between the semiconductor laser device and the optical fiber is superior to the case where the mode field diameter φ of the optical fiber is 10 μm by about 2.0 dB.

Thus, if the sum of the coupling loss and the connection loss is equal to or smaller than 2.5 dB, some superiority is supposedly attained. In the sixth and seventh embodiments, if the mode field diameter φ of the optical fiber is 3.0 μm, the coupling loss resulting from the positional misalignment can be suppressed to 2.0 dB. Thus, if the connection loss of the fiber is suppressed to 0.5 dB or less, then some superiority can be attained.

First, a case where an optical fiber having a core diameter of 3.0 μm is connected to an optical fiber having a core diameter of 10 μm will be described.

When the mode field diameters are different from each other by 120%, the connection loss during the connection of optical fibers corresponds to coupling efficiency of about 95% (−0.2 dB).

The ratio of the core diameter of 3.0 μm to the core diameter of 10 μm is about 330%. Thus, if a simple connection method is employed and the difference between adjacent cores is set at 120%, 6-stage buffering optical fibers are required to connect an optical fiber having a core diameter of 3.0 μm to an optical fiber having a core diameter of 10μm. In such a case, the coupling loss reaches as high as 1.4 dB.

Thus, it is preferable to connect the optical fibers with each other through fusion bonding. In the case of connecting the optical fibers by fusion bonding, if the core diameter ratio is 160%, then the connection loss can be suppressed to about 0.5 dB. If the core diameter ratio is 150%, then the connection loss can be suppressed to about 0.3 dB. If the core diameter ratio is 140%, then the connection loss can be suppressed to about 0.2 dB. And if the core diameter ratio is 130%, then the connection loss can be suppressed to about 0.1 dB.

If the optical fibers are connected with each other by fusion bonding and the difference between core diameters is 130%, only four-stage buffering optical fibers are required to connect an optical fiber having a core diameter of 3.0 μm and an optical fiber having a core diameter of 10 μm. In such a case, the coupling loss can be suppressed to 0.6 dB.

Next, a case where an optical fiber having a core diameter of 6.3 μm is connected to an optical fiber having a core diameter of 10 μm will be described.

The ratio of the core diameter of 6.3 μm to the core diameter of 10 μm is about 160%. Thus, if a simple connection method is employed and the difference between core diameters is set at 120%, only one-stage buffering optical fiber is required to connect the optical fiber having a core diameter of 6.3 μm to the optical fiber having a core diameter of 10 μm. In such a case, the coupling loss can be suppressed to about 0.2 dB. It is noted that, in this case, even if these fibers are directly connected with each other, the resulting loss is not more than 0.5 dB.

Embodiment 10

Hereinafter, a method for mounting a semiconductor laser device having a double channel structure will be described as the tenth embodiment.

Figure 35:
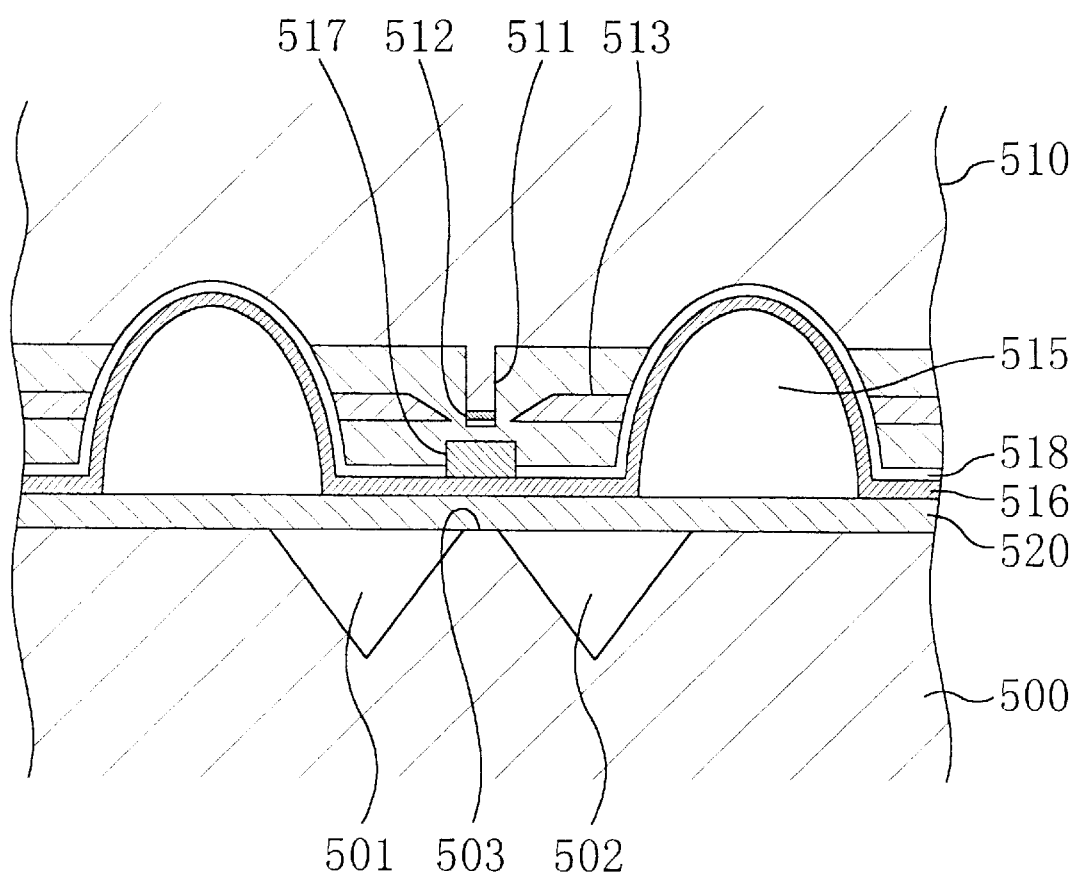
FIG. 35 is a cross-sectional view illustrating part of an optical semiconductor module of the tenth embodiment.
Figure 36:
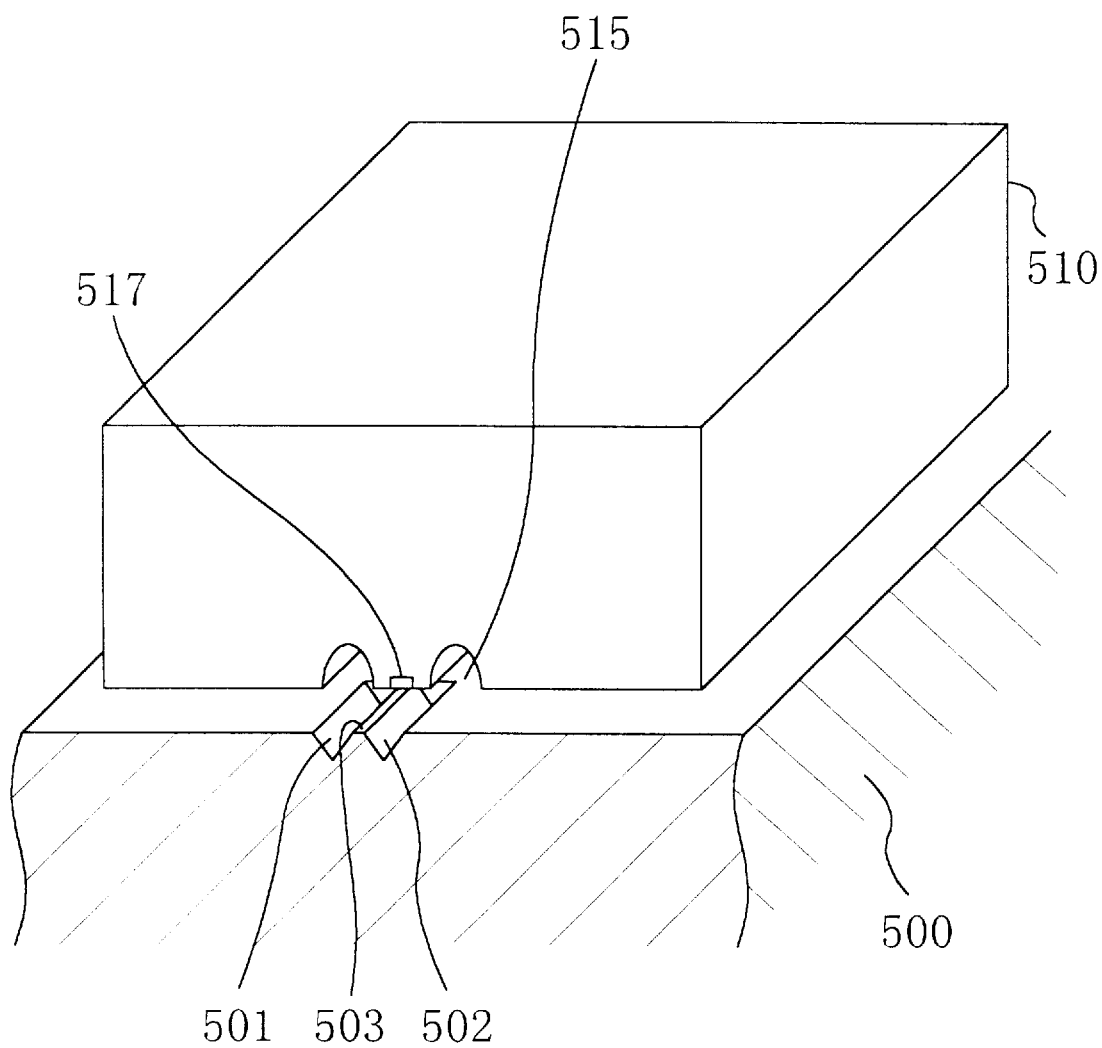
FIG. 36 is a perspective view illustrating part of the optical semiconductor module of the tenth embodiment.

FIGS. 35 and 36 illustrate an optical laser module in which a semiconductor laser device 510 having a double channel structure is mounted on a base 500.

As shown in FIG. 35, the semiconductor laser device 510 is secured to the surface of the base 500 via solder 520. In the body of the semiconductor laser device 510, a mesa-shaped stripe region 511, an active layer 512 and a current blocking layer 513 are formed. On the bottom of the semiconductor laser device 510, a pair of concave portions 515 are formed so as to sandwich the active layer 512 therebetween. A metal film 516 is formed over the entire bottom surface of the semiconductor laser device 510 as well as over the concave portions 515. An electrode 517 is formed over the metal film 516 and under the active layer 512. An insulating film 518 is formed between the metal film 516 and the body of the semiconductor laser device 510.

On the other hand, in the upper surface of the base 500, first and second V-shaped grooves 501 and 502, each having a V-shaped cross section, are formed on both sides of the active layer 512 of the semiconductor laser device 510 by using the same mask as that used for the base concave groove 101 shown in FIG. 1 and by performing the same etching process. Thus, a convex portion 503 having a trapezoidal cross section is residual in the non-etched region between the first and second V-shaped grooves 501 and 502 on the upper surface of the base 500. The first and second V-shaped grooves 501 and 502 are preferably formed by the method described with reference to FIGS. 19 and 20, in particular the method utilizing over-etching. In such a case, the convex portion 503 can have an extremely fine width size, e.g., 1 μm or less.

In the tenth embodiment, the convex portion 503 is formed by using the same mask as that used for the concave grooves of the base for installing the optical fibers therein and by performing the same etching process. Thus, no positional misalignment is caused between the convex portion 503 and any of the concave grooves for installing the optical fibers therein. Accordingly, if the semiconductor laser device 510 is secured to the base 500 while aligning the center line of the semiconductor laser device 510 with the convex portion 503, the semiconductor laser device 510 can be mounted onto the base 500 without causing any positional misalignment in the direction vertical to the optical axis. In aligning the positions of the center line of the semiconductor laser device 510 with the convex portion 503 of the base 500, the positional relationship therebetween can be confirmed easily by enlarging them with a stereoscopic microscope or the like.

What is claimed is:

1. A method of manufacturing an optical semiconductor module which comprises: a base; a semiconductor laser device on the base, for emitting semiconductor laser light; and an optical fiber for transmitting the laser light emitted by the semiconductor laser device therethrough, the method comprising the steps of:

forming a concave groove and an alignment mark in the base by the same etching process on the base;

aligning a position of the semiconductor laser device with a position of the base using the alignment mark, and thereafter securing the semiconductor laser device to the base; and installing the optical fiber in the concave groove of the base;

wherein the base further includes a cut recess extending in a direction vertical to an optical axis direction, and the alignment mark comprises a base edge alignment mark formed on an edge portion of the wall of the cut recess of the base, the wall being closer to the semiconductor laser device.

2. A method of manufacturing an optical semiconductor module which comprises: a base; a semiconductor laser device on the base, for emitting semiconductor laser light; and an optical fiber for transmitting the laser light emitted by the semiconductor laser device therethrough, the method comprising the steps of:

forming a concave groove and an alignment mark in the base by the same etching process on the base;

aligning a position of the semiconductor laser device with a position of the base using the alignment mark, and thereafter securing the semiconductor laser device to the base; and installing the optical fiber in the concave groove of the base;

wherein the base further includes a cut recess extending in a direction vertical to an optical axis direction, and the alignment mark comprises:

a pair of side alignment marks formed on both sides of a region of the base, to which region the semiconductor laser device is secured, so as to be symmetrically disposed with respect to the optical axis; and a base edge alignment mark formed on an edge portion of the wall of the cut recess of the base, the wall being closer to the semiconductor laser device.

3. A method of manufacturing an optical semiconductor module which comprises: a base; a semiconductor laser device on the base, for emitting semiconductor laser light; and an optical fiber for transmitting the laser light emitted by the semiconductor laser device therethrough, the method comprising the steps of:

forming a concave groove and an alignment mark in the base by the same etching process on the base;

aligning a position of the semiconductor laser device with a position of the base using the alignment mark, and thereafter securing the semiconductor laser device to the base; and installing the optical fiber in the concave groove of the base;

wherein the position of the semiconductor laser device is aligned with the position of the base also using a laser edge alignment mark formed on an edge portion of a bottom surface of the semiconductor laser device, the edge portion of the bottom surface being closer to the optical fiber.

4. The method of manufacturing an optical semiconductor module of claim 3, wherein:

the base further includes a cut recess extending in a direction vertical to an optical axis direction, and the alignment mark comprises a base edge alignment mark formed on an edge portion of the wall of the cut recess of the base, the wall being closer to the semiconductor laser device.

* * * * *